US011111352B2

(12) United States Patent
Zhou et al.

(10) Patent No.: US 11,111,352 B2
(45) Date of Patent: Sep. 7, 2021

(54) METHODS OF PRODUCING ORGANOSILICA MATERIALS AND USES THEREOF

(71) Applicant: ExxonMobil Research and Engineering Company, Annandale, NJ (US)

(72) Inventors: Huaxing Zhou, Furlong, PA (US); Quanchang Li, Dayton, NJ (US); David C. Calabro, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 155 days.

(21) Appl. No.: 16/190,433

(22) Filed: Nov. 14, 2018

(65) Prior Publication Data
US 2019/0194414 A1  Jun. 27, 2019

Related U.S. Application Data

(60) Provisional application No. 62/608,709, filed on Dec. 21, 2017.

(51) Int. Cl.
| *B01J 20/10* | (2006.01) |
| *C08J 9/28* | (2006.01) |
| *B01J 20/28* | (2006.01) |
| *B01J 20/30* | (2006.01) |
| *B01J 31/12* | (2006.01) |
| *B01J 35/10* | (2006.01) |
| *B01J 37/04* | (2006.01) |
| *B01J 37/10* | (2006.01) |
| *B01J 20/26* | (2006.01) |
| *C01B 33/12* | (2006.01) |
| *C01B 37/02* | (2006.01) |

(52) U.S. Cl.
CPC ............... *C08J 9/28* (2013.01); *B01J 20/103* (2013.01); *B01J 20/262* (2013.01); *B01J 20/28045* (2013.01); *B01J 20/28057* (2013.01); *B01J 20/28059* (2013.01); *B01J 20/28061* (2013.01); *B01J 20/28064* (2013.01); *B01J 20/28066* (2013.01); *B01J 20/28071* (2013.01); *B01J 20/28073* (2013.01); *B01J 20/28076* (2013.01); *B01J 20/28083* (2013.01); *B01J 20/28092* (2013.01); *B01J 20/305* (2013.01); *B01J 20/3085* (2013.01); *B01J 31/127* (2013.01); *B01J 35/109* (2013.01); *B01J 35/1014* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 35/1061* (2013.01); *B01J 37/04* (2013.01); *B01J 37/10* (2013.01); *C01B 33/12* (2013.01); *C01B 37/02* (2013.01); *B01J 2231/005* (2013.01); *B01J 2531/002* (2013.01); *C01P 2006/12* (2013.01); *C01P 2006/14* (2013.01); *C01P 2006/16* (2013.01); *C08J 2201/0504* (2013.01); *C08J 2383/04* (2013.01)

(58) Field of Classification Search
CPC ............... B01J 20/103; B01J 20/28054; B01J 20/28059; B01J 20/28061; B01J 20/20864; B01J 20/20866; B01J 20/28092; B01J 20/2808; B01J 20/28083
See application file for complete search history.

(56) References Cited

U.S. PATENT DOCUMENTS

| 3,178,392 | A | 4/1965 | Kriner |
| 4,218,308 | A | 8/1980 | Itoh et al. |
| 5,365,003 | A | 11/1994 | Chang et al. |
| 5,630,937 | A | 5/1997 | Betz et al. |
| 5,719,322 | A | 2/1998 | Lansbarkis et al. |
| 7,300,905 | B2 | 11/2007 | Keefer et al. |
| 7,497,965 | B2 | 3/2009 | Wariishi et al. |
| 7,538,065 | B2 | 5/2009 | McCarthy et al. |
| 7,682,502 | B2 | 3/2010 | McCarthy et al. |

(Continued)

FOREIGN PATENT DOCUMENTS

| CN | 101804335 B | 6/2012 |
| CN | 103157362 A | 6/2013 |

(Continued)

OTHER PUBLICATIONS

Topchiev et al., "Preparation of hexa alkoxy derivatives of cyclotrimethylenesilane", Doklady Akademii Nauk SSSR, 1955, pp. 95-96. vol. 103.
Kriner, "The preparation of cyclic siliconmethylene compounds", Journal of Organic Chemistry, 1964-06, pp. 1601-1606, vol. 29.
Kuivila et al., "Trimethylsilyl-substituted norbornenes, norbornanes, and nortricyclene", Journal of Organic Chemistry, 1964-10, pp. 2845-2851, vol. 29.
Vidal-Madjar et al., "Fast Analysis of Geometrical Isomers of Complex Compounds by Gas-Solid Chromatography", Gas Chromatography, Sep. 28, 1970-Oct. 2, 1970, pp. 381-386.
Shinji et al., "Novel Mesoporous Materials with a Uniform Distribution of Organic Groups and Inorganic Oxide in Their Frameworks", Journal of the American Chemical Society, Oct. 4, 1999, pp. 9611-9614, vol. 121.

(Continued)

*Primary Examiner* — Margaret G Moore

(57) ABSTRACT

Methods of preparing organosilica materials using a starting material mixture comprising at least one compound of Formula [(RO)$_2$SiCH$_2$]$_3$ (Ia) and at least one compound of Formula [R'ROSiCH$_2$]$_3$ (Ib), wherein each R' independently represents an RO—, an R group, or an (RO)$_3$Si—CH$_2$— group, at least one R' being (RO)$_3$Si—CH$_2$—; and R represents a C$_1$-C$_4$ alkyl group, in the absence of a structure directing agent and/or porogen are provided herein. Processes of using the organosilica materials, e.g., for gas separation, etc., are also provided herein.

14 Claims, 6 Drawing Sheets

(56) References Cited

U.S. PATENT DOCUMENTS

| | | | |
|---|---|---|---|
| 7,705,062 B2 | 4/2010 | Markowitz et al. |
| 7,754,330 B2 | 7/2010 | Hamada et al. |
| 7,767,620 B2 | 8/2010 | Whitnall et al. |
| 7,947,799 B2 | 5/2011 | Martin et al. |
| 8,110,692 B2 | 2/2012 | Bellussi et al. |
| 8,211,498 B2 | 7/2012 | Ku et al. |
| 8,277,600 B2 | 10/2012 | Hamada et al. |
| 8,277,661 B2 | 10/2012 | Sah et al. |
| 8,425,762 B2 | 4/2013 | McCarthy et al. |
| 8,441,006 B2 | 5/2013 | Michalak et al. |
| 8,470,074 B2 | 6/2013 | Baugh et al. |
| 8,545,694 B2 | 10/2013 | McCarthy et al. |
| 8,562,856 B2 | 10/2013 | Giannantonio et al. |
| 8,568,520 B2 | 10/2013 | Ohashi et al. |
| 8,598,070 B1 | 12/2013 | Baugh et al. |
| 8,598,071 B1 | 12/2013 | Baugh et al. |
| 8,809,561 B2 | 8/2014 | Bellussi et al. |
| 8,968,864 B2 | 3/2015 | Goethals et al. |
| 9,181,282 B2 | 11/2015 | Ide et al. |
| 2003/0188991 A1 | 10/2003 | Shan et al. |
| 2005/0093189 A1 | 5/2005 | Vo |
| 2006/0058565 A1 | 3/2006 | De Wild |
| 2006/0070917 A1 | 4/2006 | McCarthy et al. |
| 2006/0165574 A1 | 7/2006 | Sayari |
| 2007/0003492 A1 | 1/2007 | Kitahata et al. |
| 2007/0034992 A1 | 2/2007 | Wariishi et al. |
| 2007/0054136 A1 | 3/2007 | Takahashi et al. |
| 2007/0112242 A1 | 5/2007 | Edmiston |
| 2007/0173401 A1 | 7/2007 | Landskron et al. |
| 2009/0130412 A1 | 5/2009 | Hatton et al. |
| 2009/0215612 A1 | 8/2009 | McCarthy et al. |
| 2009/0294922 A1 | 12/2009 | Hamada et al. |
| 2010/0155302 A1 | 6/2010 | Kaminsky et al. |
| 2010/0233482 A1 | 9/2010 | Hamada et al. |
| 2011/0139685 A1 | 6/2011 | McCarthy et al. |
| 2012/0059181 A1 | 3/2012 | Bellussi et al. |
| 2012/0160742 A1 | 6/2012 | Sohn et al. |
| 2013/0075876 A1 | 3/2013 | Goethals et al. |
| 2013/0078172 A1 | 3/2013 | Bingbing et al. |
| 2013/0249049 A1 | 9/2013 | Michalak et al. |
| 2014/0004358 A1 | 1/2014 | Blackwell et al. |
| 2014/0186246 A1 | 7/2014 | Calabro et al. |
| 2014/0208753 A1 | 7/2014 | Liu et al. |
| 2015/0005525 A1 | 1/2015 | Ide et al. |
| 2015/0011787 A1 | 1/2015 | Bellussi et al. |
| 2016/0167015 A1 | 6/2016 | Podsiadlo et al. |
| 2016/0167016 A1 | 6/2016 | Li et al. |
| 2016/0167032 A1 | 6/2016 | Podsiadlo et al. |
| 2016/0168171 A1 | 6/2016 | Li et al. |
| 2016/0168172 A1 | 6/2016 | Li et al. |
| 2016/0168173 A1 | 6/2016 | Li et al. |
| 2016/0168174 A1 | 6/2016 | Li et al. |
| 2016/0168333 A1 | 6/2016 | Podsiadlo et al. |
| 2016/0168484 A1 | 6/2016 | Weigel et al. |
| 2016/0168485 A1 | 6/2016 | Li et al. |
| 2016/0229959 A1* | 8/2016 | Li ..................... B01J 20/3238 |
| 2017/0306068 A1 | 10/2017 | Holtcamp et al. |
| 2017/0313791 A1 | 11/2017 | Mertens et al. |
| 2017/0320971 A1 | 11/2017 | Holtcamp et al. |
| 2017/0320977 A1 | 11/2017 | Holtcamp et al. |
| 2017/0327604 A1 | 11/2017 | Holtcamp et al. |
| 2017/0354961 A1 | 12/2017 | Podsiadlo et al. |
| 2017/0355822 A1 | 12/2017 | Calabro et al. |
| 2017/0355823 A1 | 12/2017 | Peterson et al. |
| 2018/0142066 A1 | 5/2018 | Falkowski et al. |
| 2018/0179310 A1 | 6/2018 | Holtcamp et al. |

FOREIGN PATENT DOCUMENTS

| | | |
|---|---|---|
| CN | 101980013 B | 7/2013 |
| CN | 102643429 B | 4/2014 |
| CN | 103495340 B | 11/2015 |
| CN | 103613975 B | 2/2016 |
| CN | 104117343 B | 2/2016 |
| CN | 102052713 B | 6/2016 |
| EP | 1995214 A2 | 5/2009 |
| JP | H110151343 A | 6/1998 |
| JP | H111295284 A | 10/1999 |
| JP | 2006083311 A | 3/2006 |
| JP | 2007070520 A | 3/2007 |
| JP | 2007238761 A | 9/2007 |
| JP | 2006095512 A | 12/2007 |
| JP | 2010100492 A | 5/2010 |
| JP | 2011025201 A | 2/2011 |
| JP | 2008045060 A | 6/2012 |
| JP | 2014057941 A | 4/2014 |
| JP | 5544672 B1 | 7/2014 |
| JP | 2012149138 A | 5/2015 |
| JP | 2008062138 A | 9/2019 |
| RU | 2291878 C1 | 1/2007 |
| WO | 9610537 A1 | 4/1996 |
| WO | 2006032140 A1 | 3/2006 |
| WO | 2007081212 A1 | 7/2007 |
| WO | 2011145933 A1 | 11/2011 |
| WO | 2013093022 A1 | 6/2013 |
| WO | 2014010512 A1 | 1/2014 |
| WO | 2014090757 A1 | 6/2014 |
| WO | 2015100198 A1 | 7/2015 |
| WO | 2016094784 A1 | 6/2016 |
| WO | 2016094803 A1 | 6/2016 |

OTHER PUBLICATIONS

Melde et al., "Mesoporous Sieves with Unified Hybrid Inorganic/Organic Frameworks", Chemistry of Materials, Oct. 9, 1999, pp. 3302-3308, vol. 11.

Grudzien et al., "Cage-like ordered mesoporous organosilicas with isocyanurate bridging groups: Synthesis, template removal and structural properties", Microporous and Mesoporous Materials, pp. 68-77, vol. 118, No. 1-3.

Walcarius et al., "Mesoporous organosilica adsorbents: nanoengineered materials for removal of organic and inorganic pollutants", Journal of Materials Chemistry, Jan. 1, 2010, pp. 4478-4511, vol. 20, No. 22.

"Vidal et al., ""Adsorption of polycyclic aromatic hydrocarbons from aqueous solutions by modified periodic mesoporous organosilica"", Journal of Colloid and Interface Science, Feb. 3, 2011, pp. 466-473, vol. 357, No. 2."

Grudzien et al., "Cage-like mesoporous organosilicas with isocyanurate bridging groups synthesized by soft templating with poly(ethylene oxide)-poly(butylene oxide)-poly(ethylene oxide) block copolymer", Journal of Colloid and Interface Science, May 1, 2009, pp. 354-362, vol. 333, No. 1, Elsevier.

Grudzien et al., "Periodic Mesoporous Organosilicas with Im3m Symmetry and Large Isocyanurate Bridging Groups", The Journal of Physical Chemistry B, Feb. 1, 2006, pp. 2972-2975, vol. 110, No. 7, ACS Publications.

Olkhovyk et al., "Periodic Mesoporous Organosilica with Large Heterocyclic Bridging Groups", Journal of American Chemical Society, Jan. 1, 2005, pp. 60-61, vol. 127, No. 1, ACS Publications.

"Poli et al., ""Different Routes for Preparing Mesoporous Organosilicas Containing the Troger 's Base and Their Textural and Catalytic Implications"", The Journal of Physical Chemistry C,Apr. 21, 2011, pp. 7573-7585, vol. 115, No. 15, ACS Publications."

PCT/US2015/065208 International Search Report and Written Opinion dated May 17, 2016.

PCT/US2015/065200 Partial International Search Report and Written Opinion dated May 23, 2016.

"Diaz et al., ""Hybrid organic-inorganic catalytic porous materials synthesized at neutral pH in absence of structural directing agents"", Journal of Materials Chemistry, Jan. 1, 2009, pp. 5970-5979, vol. 19, No. 33, Royal Society of Chemistry."

Reale et al., "A fluoride-catalyzed sol-gel route to catalytically active non-ordered mesoporous silica materials in the absence of surfactants", Journal of Materials Chemistry, Jan. 1, 2005, pp. 1742-1754, vol. 15, No. 17, Royal Society of Chemistry.

PCT/US2015/065200 Partial International Search Report and Written Opinion dated Jul. 18, 2016.

(56) References Cited

OTHER PUBLICATIONS

Goethals et al., "Ultra-low-k cyclic carbon-bridged PMO films with a high chemical resistance", Journal of Materials Chemistry, Feb. 21, 2012, pp. 8281-8286, vol. 22.
PCT/US2015/065258 Partial International Search Report and Written Opinion dated Mar. 16, 2016.
PCT/US2015/065194 International Search Report and Written Opinion dated Mar. 29, 2016.
PCT/US2015/065191 International Search Report and Written Opinion dated Mar. 29, 2016.
PCT/US2015/065306 International Search Report and Written Opinion dated Mar. 29, 2016.
PCT/US2015/065219 International Search Report and Written Opinion dated Apr. 5, 2016.
PCT/US2015/065283 International Search Report and Written Opinion dated Apr. 6, 2016.
PCT/US2015/065199 International Search Report and Written Opinion dated Apr. 8, 2016.
PCT/US2015/065204 International Search Report and Written Opinion dated Apr. 8, 2016.
PCT/US2015/065225 International Search Report and Written Opinion dated Apr. 8, 2016.
Harlick et al., "Applications of Pore-Expanded Mesoporous Silica. 5. Triamine Grafted Material with Exceptional CO2 Dynamic and Equilibrium Adsorption Performance", Industrial & Engineering Chemistry Research, Dec. 20, 2006, pp. 446-458 vol. 46.
Niemeyer et al., "Effects of CO2 Sorption on the Rotational Reorientation Dynamics of a Model Solute Dissolved in Molten Poly(dimethylsiloxane)", Macromolecules, Jan. 13, 1998, pp. 77-85, vol. 31.
Eliseeva et al., "Antifoaming additive for alkaline absorption solutions for removal of carbon dioxide from synthesis gas", Khimicheskaya Promyshlennost, 1999, pp. 632-633, vol. 10.
Gilman et al., "Reactions of triphenylsilyllithium with some dichloropropenes", Journal of Organometallic Chemistry, Apr. 13, 2001, pp. 293-303, vol. 2.
Goethals et al., "Sealed ultra low-k organosilica films with improved electrical, mechanical and chemical properties", Journal of Materials Chemistry C, 2013, vol. 1, No. 25, Royal Society of Chemistry.
Goethals et al., "Hydrophobic high quality ring PMOs with an extremely high stability", Journal of Materials Chemistry, 2010, pp. 1709-1716, vol. 20, No. 9, Royal Society of Chemistry.
Landskron et al., "Periodic Mesoporous Organosilicas: Self-Assembly from Bridged Cyclic Silsesquioxane Precursors", Angewandte Chemie, International Edition, 2005, pp. 2107-2109, vol. 44, No. 14, Wiley-VCH Verlag GmbH & Co. KgaA.
Bahuley et al., "One-pot synthesis of spherical periodic mesoporous organosilica supported catalyst bearing Ni(II) α-diimine comple1es for ethylene polymerization", Catalysis Communications, 2009, pp. 252-256, vol. 11.
O'Brien et al., "ExAFS analysis of a chiral alkene polymerization catalyst incorporated in the mesoporous silicate MCM-41" Chem. Comm. 1905-1906 (1997).
The International Search Report and Written Opinion of PCT/US2018/060925 dated Feb. 11, 2019.
Landskron et al., "Periodic Mesoporous Organosilicas Containing Interconnected [Si(CH2)]3 Rings", Science, Oct. 10, 2003, pp. 266-269, vol. 302.
Brondani et al., "Polyfunctional carbosilanes and organosilicon compounds. Synthesis via Grignard reactions", Tetrahedron Letters, Mar. 2, 2001, pp. 2111-2114, vol. 34.
Goethals, et al., "A new procedure to seal the pores of mesoporous low-k films with precondensed organosilica oligomers", Chemical Communications, 2012, pp. 2797-2799, vol. 48, No. 22, Royal Society of Chemistry.

\* cited by examiner

METHODS OF PRODUCING ORGANOSILICA MATERIALS AND USES THEREOF

CROSS-REFERENCE TO RELATED APPLICATIONS

This application claims priority to U.S. Provisional Application No. 62/608,709 filed Dec. 21, 2017, which is herein incorporated by reference in its entirety.

TECHNICAL FIELD

The present disclosure relates to a method of producing organosilica materials.

BACKGROUND

Porous inorganic solids have found great utility as catalysts and separation media for industrial application. In particular, mesoporous materials, such as silicas and aluminas, having a to periodic arrangement of mesopores are attractive materials for use in adsorption, separation and catalysis processes due to their uniform and tunable pores, high surface areas and large pore volumes. The pore structure of such mesoporous materials is large enough to absorb large molecules and the pore wall structure can be as thin as about 1 nm. Further, these mesoporous materials are known to have large specific surface areas (e.g., 1000 $m^2/g$) and large pore volumes (e.g., 1 $cm^3/g$). For these reasons, these mesoporous materials enable reactive catalysts, adsorbents composed of a functional organic compound, and other molecules to rapidly diffuse into the pores and therefore, can be advantageous over zeolites, which have smaller pore sizes. Consequently, such mesoporous materials can be useful not only for catalysis of high-speed catalytic reactions, but also as large capacity adsorbents.

It was further discovered that the inclusion of some organic groups in the mesoporous framework can provide adjustable reactive surfaces and also contributes to uniformity in pore size, higher mechanical strength, and hydrothermal stability of the material. Thus, mesoporous organosilica materials can exhibit unique properties compared to mesoporous silica such as enhanced hydrothermal stability, chemical stability, and mechanical properties. Organic groups can be incorporated using bridged silsesquioxane precursors of the form Si—Z—Si to form mesoporous organosilicas, where Z is an organic group.

Mesoporous organosilicas are conventionally formed by the self-assembly of the silsequioxane precursor in the presence of a structure directing agent, a porogen and/or a framework element. The precursor is hydrolysable and condenses around the structure directing agent. These materials have been referred to as Periodic Mesoporous Organosilicates (PMOs), due to the presence of periodic arrays of parallel aligned mesoscale channels. For example, Landskron, K., et al. [*Science*, 302:266-269 (2003)] report the self-assembly of 1,3,5-tris[diethoxysila]cylcohexane [$(EtO)_2SiCH_2]_3$ in the presence of a base and the structure directing agent, cetyltrimethylammonium bromide to form PMOs that are bridged organosilicas with a periodic mesoporous framework, which consist of $SiO_3Z$ or $SiO_2Z_2$ building blocks, where Z is a bridging organic group. In PMOs, the organic groups can be homogenously distributed in the pore walls. U.S. Pat. Pub. No. 2012/0059181 reports the preparation of a crystalline hybrid organic-inorganic silicate formed from 1,1,3,3,5,5 hexaethoxy-1,3,5 trisilyl cyclohexane in the presence of $NaAlO_2$ and base. U.S. Patent Application Publication No. 2007/003492 reports preparation of a composition formed from 1,1,3,3,5,5 hexaethoxy-1,3,5 trisilyl cyclohexane in the presence of propylene glycol monomethyl ether.

The use of a structure directing agent in the preparation of an organosilica material (e.g. a PMO) requires a complicated, energy intensive process to eliminate the structure directing agent at the end of the preparation process. This limits the ability to scale-up the process for industrial applications. Furthermore, starting material compounds, such as 1,1,3,3,5,5 hexaethoxy-1,3,5 trisilacyclohexane, are typically used in substantially pure form (for example, the starting material compound comprises at least about 99 weight percent (wt. %), at least about 99.5 wt. %, or 100 wt. % 1,1,3,3,5,5 hexaethoxy-1,3,5 trisilacyclohexane, based on weight of the starting material compound) to prepare the organosilica materials. However, the pure forms are expensive to use. Preparation of starting material compounds, such as 1,1,3,3,5,5 hexaethoxy-1,3,5 trisilacyclohexane, typically produce a mixture of compounds, for example, 1,1,3,3,5,5 hexaethoxy-1,3,5 trisilacyclohexane, 1,1,3,3,5-pentaethoxy-5-((triethoxysilyl)methyl)-1,3,5-trisilacyclohexane, and impurities, as opposed to a substantially pure form of 1,1,3,3,5,5 hexaethoxy-1,3,5 trisilacyclohexane. See Brondani, D. et al. *Tetrahedron Letters*, 34(13):2111-2114. Thus, further processing at an additional cost is required to arrive at a substantially pure starting material compound from such mixtures. Therefore, there is a need for a method to prepare organosilica materials without a structure directing agent and without using a substantially pure form starting material compound. Furthermore, a method is needed that has these characteristics and still results in an organosilica material having a desirable pore diameter, pore volume and surface area.

SUMMARY

It has been discovered that a starting material mixture comprising at least two compounds, such as 1,1,3,3,5,5 hexaethoxy-1,3,5 trisilacyclohexane, and 1,1,3,3,5-pentaethoxy-5-((triethoxysilyl)methyl)-1,3,5-trisilacyclohexane, instead of a starting material comprising a single compound, such as 1,1,3,3,5,5 hexaethoxy-1,3,5 trisilacyclohexane, can be used to successfully prepare an organosilica material with desirable pore diameter, pore volume, and surface area without the need for a structure directing agent, a porogen or surfactant.

Thus, in one aspect, the present disclosure provides a method for preparing an organosilica material, the method comprising: (a) providing a starting material mixture comprising at least one compound of Formula $[(RO)_2SiCH_2]_3$ (Ia) and at least one compound of Formula $[R'ROSiCH_2]_3$ (Ib), wherein each R' independently represents an RO— group, an R group, or an $(RO)_3Si$—$CH_2$— group, at least one R' being $(RO)_3Si$—$CH_2$—; and R represents a $C_1$-$C_4$ alkyl group; (b) adding the starting material mixture into an acidic or basic aqueous mixture such that the resulting solution contains essentially no structure directing agent; (c) curing the solution to produce a pre-product; and (c) drying the pre-product to obtain the organosilica material which is a polymer comprising independent siloxane units of Formula $[R^1R^2SiCH_2]_3$ (I), wherein each $R^1$ represents a hydroxyl group, a $C_1$-$C_4$ alkoxy group, or an oxygen atom bonded to a silicon atom of another siloxane unit and each $R^2$ represents a hydroxyl group, a $C_1$-$C_4$ alkoxy group, a $C_1$-$C_4$ alkyl group, or an oxygen atom bonded to a silicon atom of another siloxane, wherein the organosilica material has an average pore diameter greater than about 1.0 nm.

In still another aspect, the present disclosure provides an organosilica material made according to the methods described herein.

In still another aspect, of the present disclosure provides a use of the organosilica material made according to the methods described herein for reducing impurities in a liquid hydrocarbon product; for improving color of a diesel fuel product; for gas separation; or as a catalyst support material for use in an aromatics hydrogenation process, olefin polymerization, hydrocarbon cracking, isomerization or alkylation.

Other embodiments, including particular aspects of the embodiments summarized above, will be evident from the detailed description that follows.

DETAILED DESCRIPTION

Figure 1:
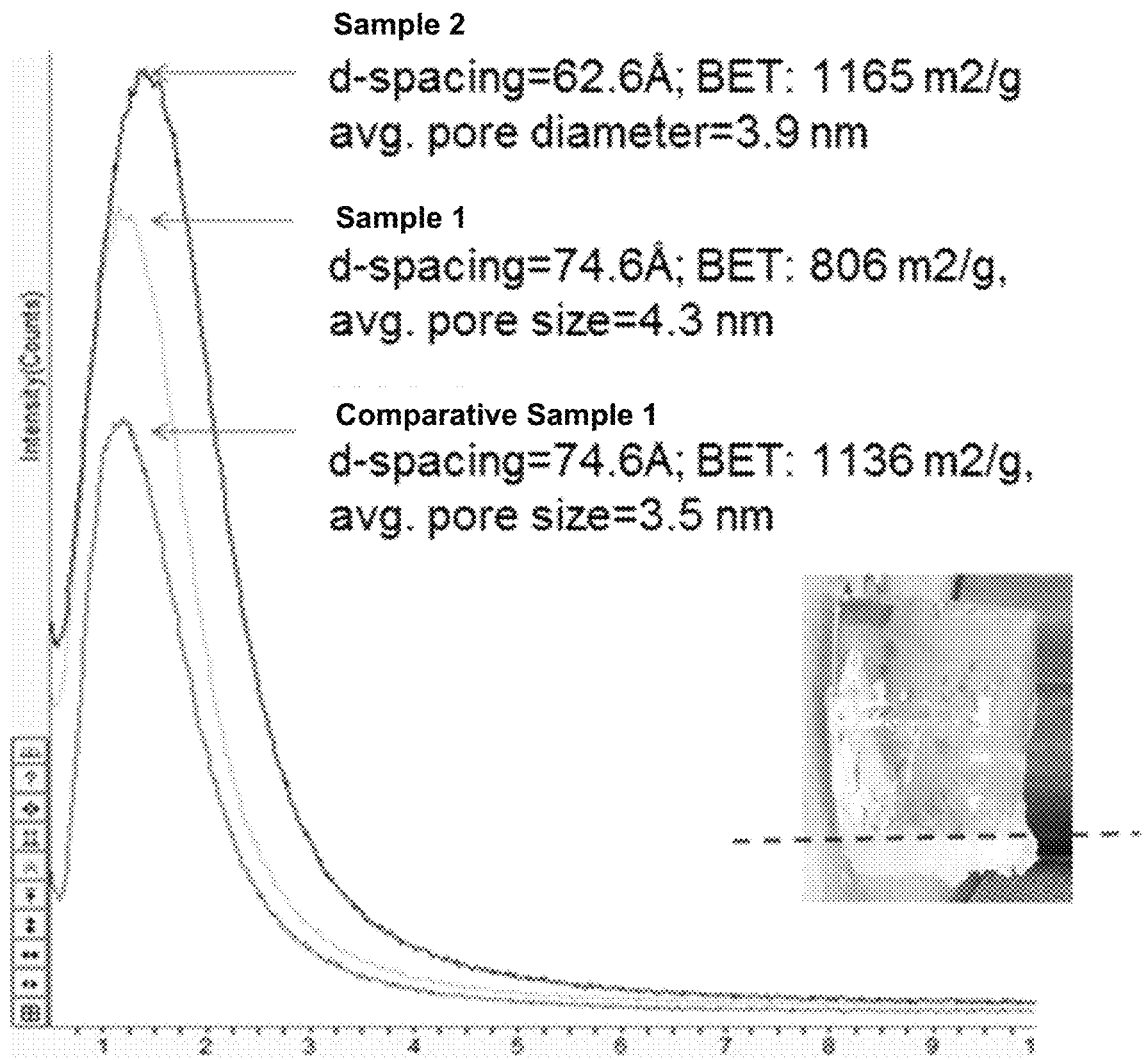
FIG. 1 illustrates an X-Ray Diffraction (XRD) spectrum for Sample 1, Sample 2 and Comparative Sample 1.

In various aspects of the present disclosure, organosilica materials, methods for preparing organosilica materials and gas and liquid separation processes using the organosilica materials are provided.

I. Definitions

For purposes of this disclosure and the claims hereto, the numbering scheme for the Periodic Table Groups is according to the IUPAC Periodic Table of Elements.

The term "and/or" as used in a phrase such as "A and/or B" herein is intended to include "A and B", "A or B", "A", and "B".

The terms "substituent", "radical", "group", and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "alkyl" refers to a saturated hydrocarbon radical having from 1 to 12 carbon atoms (i.e. $C_1$-$C_{12}$ alkyl), particularly from 1 to 8 carbon atoms (i.e. $C_1$-$C_8$ alkyl), particularly from 1 to 6 carbon atoms (i.e. $C_1$-$C_6$ alkyl), and particularly from 1 to 4 carbon atoms (i.e. $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—CH$_3$), "$C_2$ alkyl" refers to ethyl (—CH$_2$CH$_3$), "$C_3$ alkyl" refers to propyl (—CH$_2$CH$_2$CH$_3$) and "$C_4$ alkyl" refers to butyl (e.g. —CH$_2$CH$_2$CH$_2$CH$_3$, —(CH$_3$)CHCH$_2$CH$_3$, —CH$_2$CH (CH$_3$)$_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e. $C_1$-$C_{12}$ alkylene) in length and meaning the alkylene moiety is attached to the rest of the molecule at both ends of the alkyl unit. For example, alkylenes include, but are not limited to, —CH$_2$—, —CH$_2$CH$_2$—, —CH(CH$_3$)CH$_2$—, —CH$_2$CH$_2$CH$_2$—, etc. The alkylene group may be linear or branched.

As used herein, and unless otherwise specified, the term "nitrogen-containing alkyl" refers to an alkyl group as defined herein wherein one or more carbon atoms in the alkyl group is substituted with a nitrogen atom or a nitrogen-containing cyclic hydrocarbon having from 2 to 10 carbon atoms (i.e., a nitrogen-containing cyclic $C_2$-$C_{10}$ hydrocarbon), particularly having from 2 to 5 carbon atoms (i.e., a nitrogen-containing cyclic $C_2$-$C_5$ hydrocarbon), and particularly having from 2 to 5 carbon atoms (i.e., a nitrogen-containing cyclic $C_2$-$C_5$ hydrocarbon). The nitrogen-containing cyclic hydrocarbon may have one or more nitrogen atoms. The nitrogen atom(s) may optionally be substituted with one or two $C_1$-$C_6$ alkyl groups. The nitrogen-containing alkyl can have from 1 to 12 carbon atoms (i.e. $C_1$-$C_{12}$ nitrogen-containing alkyl), particularly from 1 to 10 carbon atoms (i.e. $C_1$-$C_{10}$ nitrogen-containing alkyl), particularly from 2 to 10 carbon atoms (i.e. $C_2$-$C_{10}$ nitrogen-containing alkyl), particularly from 3 to 10 carbon atoms (i.e. $C_3$-$C_{10}$ nitrogen-containing alkyl), and particularly from 3 to 8 carbon atoms (i.e. $C_1$-$C_{10}$ nitrogen-containing alkyl). Examples of nitrogen-containing alkyls include, but are not limited to,

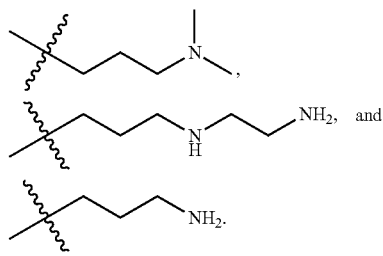

As used herein, and unless otherwise specified, the term "nitrogen-containing alkylene" refers to an alkylene group as defined herein wherein one or more carbon atoms in the alkyl group is substituted with a nitrogen atom. The nitrogen atom(s) may optionally be substituted with one or two $C_1$-$C_6$ alkyl groups. The nitrogen-containing alkylene can have from 1 to 12 carbon atoms (i.e. $C_1$-$C_{12}$ nitrogen-containing alkylene), particularly from 2 to 10 carbon atoms (i.e. $C_2$-$C_{10}$ nitrogen-containing alkylene), particularly from 3 to 10 carbon atoms (i.e. $C_3$-$C_{10}$ nitrogen-containing alkylene), particularly from 4 to 10 carbon atoms (i.e. $C_4$-$C_{10}$ nitrogen-containing alkylene), and particularly from 3 to 8 carbon atoms (i.e. $C_3$-$C_8$ nitrogen-containing alkyl). Examples of nitrogen-containing alkylenes include, but are not limited to,

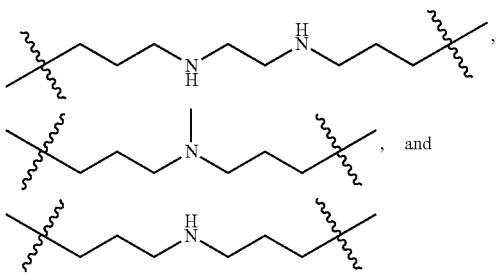

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e. $C_2$-$C_{12}$ alkenylene) in length and meaning that the alkylene moiety is attached to the rest of the molecule at both ends of the alkyl unit. For example, alkenylenes include, but are not limited to, —CH═CH—, —CH═CHCH$_2$—, —CH═CH═CH—, —CH$_2$CH$_2$CH═CHCH$_2$—, etc. —CH$_2$CH$_2$—, —CH(CH$_3$)CH$_2$—, —CH$_2$CH$_2$CH$_2$—, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompassses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e. $C_2$-$C_{12}$ alkenylene) in length and meaning that the alkylene moiety is attached to the rest of the molecule at both ends of the alkyl unit. For example, alkenylenes include, but are not limited to, —C≡C—, —C≡CCH$_2$—, —C≡CCH$_2$C≡C—, —CH$_2$CH$_2$C≡CCH$_2$—, etc. —CH$_2$CH$_2$—, —CH(CH$_3$)CH$_2$—, —CH$_2$CH$_2$CH$_2$—, etc. The alkynlene group may be linear or branched.

As used herein, and unless otherwise specified, the term "alkoxy" refers to —O-alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. Additionally, the aromatic may comprise one or more heteroatoms. Examples of heteroatoms include, but are not limited to, nitrogen, oxygen, and/or sulfur. Aromatics with one or more heteroatom include, but are not limited to furan, benzofuran, thiophene, benzothiophene, oxazole, thiazole and the like, and combinations thereof. The aromatic may comprise monocyclic, bicyclic, tricyclic, and/or polycyclic rings (in some embodiments, at least monocyclic rings, only monocyclic and bicyclic rings, or only monocyclic rings) and may be fused rings.

As used herein, and unless otherwise specified, the term "aryl" refers to any monocyclic or polycyclic cyclized carbon radical containing 6 to 14 carbon ring atoms, wherein at least one ring is an aromatic hydrocarbon. Examples of aryls include, but are not limited to phenyl, naphthyl, pyridinyl, and indolyl.

As used herein, and unless otherwise specified, the term "aralkyl" refers to an alkyl group substituted with an aryl group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of aralkyl groups include, but are not limited to phenymethyl, phenylethyl, and naphthylmethyl. The aralkyl may comprise one or more heteroatoms and be referred to as a "heteroaralkyl." Examples of heteroatoms include, but are not limited to, nitrogen (i.e., nitrogen-containing heteroaralkyl), oxygen (i.e., oxygen-containing heteroaralkyl), and/or sulfur (i.e., sulfur-containing heteroaralkyl). Examples of heteroaralkyl groups include, but are not limited to, pyridinylethyl, indolylmethyl, furylethyl, and quinolinylpropyl.

As used herein, and unless otherwise specified, the term "heterocyclo" refers to fully saturated, partially saturated or unsaturated or polycyclic cyclized carbon radical containing from 4 to 20 carbon ring atoms and containing one or more heteroatoms atoms. Examples of heteroatoms include, but are not limited to, nitrogen (i.e., nitrogen-containing heterocyclo), oxygen (i.e., oxygen-containing heterocyclo), and/or sulfur (i.e., sulfur-containing heterocyclo). Examples of heterocyclo groups include, but are not limited to, thienyl, furyl, pyrrolyl, piperazinyl, pyridyl, benzoxazolyl, quinolinyl, imidazolyl, pyrrolidinyl, and piperidinyl.

As used herein, and unless otherwise specified, the term "heterocycloalkyl" refers to an alkyl group substituted with heterocyclo group. The alkyl group may be a $C_1$-$C_{10}$ alkyl group, particularly a $C_1$-$C_6$, particularly a $C_1$-$C_4$ alkyl group, and particularly a $C_1$-$C_3$ alkyl group. Examples of heterocycloalkyl groups include, but are not limited to thienylmethyl, furylethyl, pyrrolylmethyl, piperazinylethyl, pyridylmethyl, benzoxazolylethyl, quinolinylpropyl, and imidazolylpropyl.

As used herein, the term "hydroxyl" refers to an —OH group.

As used herein, the term "mesoporous" refers to solid materials having pores that have a diameter within the range of from about 2 nm to about 50 nm.

As used herein, the term "organosilica" refers to an organosiloxane compound that comprises one or more organic groups bound to two or more Si atoms.

As used herein, the term "silanol" refers to a Si—OH group.

As used herein, the term "silanol content" refers to the percent of the Si—OH groups in a compound and can be calculated by standard methods, such as NMR.

As used herein, the terms "structure directing agent," "SDA," "surfactant," and/or "porogen" refer to one or more compounds added to the synthesis media to aid in and/or guide the polymerization and/or polycondensing and/or organization of the building blocks that form the organosilica material framework. Further, a "porogen" is understood to be a compound capable of forming voids or pores in the resultant organosilica material framework. As used herein, the term "structure directing agent" encompasses and is synonymous and interchangeable with the terms "templating agent" and "template."

As used herein, and unless otherwise specified, the term "adsorption" includes physisorption, chemisorption, and condensation onto a solid material and combinations thereof.

II. Methods of Producing Organosilica Material

The present disclosure relates to methods of producing an organosilica material. In a first embodiment, the method comprises:

(a) providing a starting material mixture comprising at least one compound of Formula $[(RO)_2SiCH_2]_3$ (Ia) and at least one compound of Formula $[R'ROSiCH_2]_3$ (Ib), wherein each R' independently represents an RO—, an R group, or an $(RO)_3Si$—$CH_2$— group, at least one R' being $(RO)_3Si$—$CH_2$—; and R represents a $C_1$-$C_4$ alkyl group;

(b) adding the starting mixture into an acidic or basic aqueous mixture such that the resulting solution contains essentially no structure directing agent;

(c) curing the solution to produce a pre-product; and (d) drying the pre-product to obtain the organosilica material which is a polymer comprising independent siloxane units of Formula $[R'R^2SiCH_2]_3$ (I), wherein each $R^1$ represents a hydroxyl group, a $C_1$-$C_4$ alkoxy group, or an oxygen atom bonded to a silicon atom of another siloxane unit and each $R^2$ represents a hydroxyl group, a $C_1$-$C_4$ alkoxy group, a $C_1$-$C_4$ alkyl group, or an oxygen atom bonded to a silicon atom of another siloxane.

As used herein, and unless otherwise specified, "oxygen atom bonded to a silicon atom of another siloxane" means that the oxygen atom can advantageously displace a moiety (particularly an oxygen-containing moiety such as a hydroxyl, an alkoxy or the like), if present, on a silicon atom of another siloxane so the oxygen atom may be bonded directly to the silicon atom of another siloxane thereby connecting the two siloxanes, e.g., via a Si—O—Si linkage. For clarity, in this bonding scenario, the "another siloxane" can be a siloxane of the same type or a siloxane of a different type.

II.A. Acidic or Basic Aqueous Mixture

The acidic or basic aqueous mixture contains essentially no added structure directing agent and/or no added porogen.

As used herein, "essentially no added structure directing agent," and "essentially no added porogen" means either (i) there is no such component intentionally added to the reaction mixture used in the synthesis of the organosilica material; or (ii) such component is present in the synthesis of the organosilica material in a minor, or a non-substantial, or a negligible amount (for example, such component is present in an amount less than 1.0 wt. %, 0.10 wt. % or less, or 0.010 wt. % or less, based on the weight of the reaction mixture) such that the component cannot be said to aid in and/or guide the polymerization and/or polycondensing and/or organization of the building blocks that form the framework of the organosilica material. Further, "essentially no added structure directing agent" is synonymous with "essentially no added template" and "essentially no added templating agent."

Although the acidic or basic mixture is described herein as containing essentially no added structure directing agent and/or no added porogen, in other alternative embodiments, the acidic or basic aqueous mixture may comprise a structure directing agent and/or a porogen.

1. Structure Directing Agent

Examples of a structure directing agent can include, but are not limited to, non-ionic surfactants, ionic surfactants, cationic surfactants, silicon surfactants, amphoteric surfactants, polyalkylene oxide surfactants, fluorosurfactants, colloidal crystals, polymers, hyper branched molecules, star-shaped molecules, macromolecules, dendrimers, and combinations thereof. Additionally or alternatively, the surface directing agent can comprise or be a poloxamer, a triblock polymer, a tetraalkylammonium salt, a nonionic polyoxyethylene alkyl, a Gemini surfactant, or a mixture thereof. Examples of a tetraalkylammonium salt can include, but are not limited to, cetyltrimethylammonium halides, such as cetyltrimethylammonium chloride (CTAC), cetyltrimethylammonium bromide (CTAB), and octadecyltrimethylammonium chloride. Other exemplary surface directing agents can additionally or alternatively include hexadecyltrimethylammonium chloride and/or cetylpyridinium bromide.

Poloxamers are block copolymers of ethylene oxide and propylene oxide, more particularly nonionic triblock copolymers composed of a central hydrophobic chain of polyoxypropylene (poly(propylene oxide)) flanked by two hydrophilic chains of polyoxyethylene (poly(ethylene oxide)). Specifically, the term "poloxamer" refers to a polymer having the formula $HO(C_2H_4))a(C_3H_6O)_b(C_2H_4O)_aH$ in which "a" and "b" denote the number of polyoxyethylene and polyoxypropylene units, respectively. Poloxamers are also known by the trade name Pluronic®, for example Pluronic® 123 and Pluronic® F127. An additional triblock polymer is B50-6600.

Nonionic polyoxyethylene alkyl ethers are known by the trade name Brij®, for example Brij® 56, Brij® 58, Brij® 76, Brij® 78. Gemini surfactants are compounds having at least two hydrophobic groups and at least one or optionally two hydrophilic groups per molecule have been introduced.

2. Porogen

A porogen material is capable of forming domains, discrete regions, voids and/or pores in the organosilica material. As used herein, porogen does not include water. An example of a porogen is a block copolymer (e.g., a di-block polymer). Examples of polymer porogens can include, but are not limited to, polyvinyl aromatics, such as polystyrenes, polyvinylpyridines, hydrogenated polyvinyl aromatics, polyacrylonitriles, polyalkylene oxides, such as polyethylene oxides and polypropylene oxides, polyethylenes, polylactic acids, polysiloxanes, polycaprolactones, polycaprolactams, polyurethanes, polymethacrylates, such as polymethylmethacrylate or polymethacrylic acid, polyacrylates, such as polymethylacrylate and polyacrylic acid, polydienes such as polybutadienes and polyisoprenes, polyvinyl chlorides, polyacetals, and amine-capped alkylene oxides, as well as combinations thereof.

Additionally or alternatively, porogens can be thermoplastic homopolymers and random (as opposed to block) copolymers. As used herein, "homopolymer" means compounds comprising repeating units from a single monomer. Suitable thermoplastic materials can include, but are not limited to, homopolymers or copolymers of polystyrenes, polyacrylates, polymethacrylates, polybutadienes, polyisoprenes, polyphenylene oxides, polypropylene oxides, polyethylene oxides, poly(dimethylsiloxanes), polytetrahydrofurans, polyethylenes, polycyclohexylethylenes, polyethyloxazolines, polyvinylpyridines, polycaprolactones, polylactic acids, copolymers of these materials and mixtures of these materials. Examples of polystyrene include, but are not limited to anionic polymerized polystyrene, syndiotactic polystyrene, unsubstituted and substituted polystyrenes (for example, poly($\alpha$-methyl styrene)). The thermoplastic materials may be linear, branched, hyperbranched, dendritic, or star like in nature.

Additionally or alternatively, the porogen can be a solvent. Examples of solvents can include, but are not limited to, ketones (e.g., cyclohexanone, cyclopentanone, 2-heptanone, cycloheptanone, cyclooctanone, cyclohexylpyrrolidinone, methyl isobutyl ketone, methyl ethyl ketone, acetone), carbonate compounds (e.g., ethylene carbonate, propylene carbonate), heterocyclic compounds (e.g., 3-methyl-2-oxazolidinone, dirnethylimidazolidinope, N-methylpyrrolidone, pyridine), cyclic ethers (e.g., dioxane, tetrahydrofuran), chain ethers (e.g., diethyl ether, ethylene glycol dimethyl ether, propylene glycol dimethyl ether, tetraethylene glycol dimethyl ether, polyethylene glycol dimethyl ether, ethylene glycol monomethyl ether, ethylene glycol monoethyl ether, propylene glycol monomethyl ether (PGME), triethylene glycol monobutyl ether, propylene glycol monopropyl ether, triethylene glycol monomethyl ether, diethylene glycol ethyl ether, diethylene glycol methyl ether, dipropylene glycol methyl ether, dipropylene glycol dimethyl ether, propylene glycol phenyl ether, tripropylene glycol methyl ether), alcohols (e.g., methanol, ethanol), polyhydric alcohols (e.g., ethylene glycol, propylene glycol, polyethylene glycol, polypropylene glycol, glycerin, dipropylene glycol), nitrile compounds (e.g., acetonitrile, glutarodinitrile, methoxyacetonitrile, propionitrile, benzonitrile), esters (e.g., ethyl acetate, butyl acetate, methyl lactate, ethyl lactate, methyl methoxypropionate, ethyl ethoxypropionate, methyl pyruvate, ethyl pyruvate, propyl pyruvate, 2-methoxyethyl acetate, ethylene glycol monoethyl ether acetate, propylene glycol monomethyl ether acetate (PGMEA), butyrolactone, phosphoric acid ester, phosphonic acid ester), aprotic polar substances (e.g., dimethyl sulfoxide, sulfolane, dimethylformamide, dimethylacetamide), nonpolar solvents (e.g., toluene, xylene, mesitylene), chlorine-based solvents (e.g., methylene dichloride, ethylene dichloride), benzene, dichlorobenzene, naphthalene, diphenyl ether, diisopropylbenzene, triethylamine, methyl benzoate, ethyl benzoate, butyl benzoate, monomethyl ether acetate hydroxy ethers such as dibenzylethers, diglyme, triglyme, and mixtures thereof.

3. Base/Acid

In various embodiments, the acidic or basic aqueous mixture used in methods provided herein can comprise a base and/or an acid.

In certain embodiments where the basic aqueous mixture comprises a base, the aqueous mixture can have a pH from about 8 to about 15, about 8 to about 14.5, about 8 to about 14, about 8 to about 13.5, about 8 to about 13, about 8 to about 12.5, about 8 to about 12, about 8 to about 11.5, about 8 to about 11, about 8 to about 10.5, about 8 to about 10, about 8 to about 9.5, about 8 to about 9, about 8 to about 8.5, about 8.5 to about 15, about 8.5 to about 14.5, about 8.5 to about 14, about 8.5 to about 13.5, about 8.5 to about 13, about 8.5 to about 12.5, about 8.5 to about 12, about 8.5 to about 11.5, about 8.5 to about 11, about 8.5 to about 10.5, about 8.5 to about 10, about 8.5 to about 9.5, about 8.5 to about 9, about 9 to about 15, about 9 to about 14.5, about 9 to about 14, about 9 to about 13.5, about 9 to about 13, about 9 to about 12.5, about 9 to about 12, about 9 to about 11.5, about 9 to about 11, about 9 to about 10.5, about 9 to about 10, about 9 to about 9.5, about 9.5 to about 15, about 9.5 to about 14.5, about 9.5 to about 14, about 9.5 to about 13.5, about 9.5 to about 13, about 9.5 to about 12.5, about 9.5 to about 12, about 9.5 to about 11.5, about 9.5 to about 11, about 9.5 to about 10.5, about 9.5 to about 10, about 10 to about 15, about 10 to about 14.5, about 10 to about 14, about 10 to about 13.5, about 10 to about 13, about 10 to about 12.5, about 10 to about 12, about 10 to about 11.5, about 10 to about 11, about 10 to about 10.5, about 10.5 to about 15, about 10.5 to about 14.5, about 10.5 to about 14, about 10.5 to about 13.5, about 10.5 to about 13, about 10.5 to about 12.5, about 10.5 to about 12, about 10.5 to about 11.5, about 10.5 to about 11, about 11 to about 15, about 11 to about 14.5, about 11 to about 14, about 11 to about 13.5, about 11 to about 13, about 11 to about 12.5, about 11 to about 12, about 11 to about 11.5, about 11.5 to about 15, about 11.5 to about 14.5, about 11.5 to about 14, about 11.5 to about 13.5, about 11.5 to about 13, about 11.5 to about 12.5, about 11.5 to about 12, about 12 to about 15, about 12 to about 14.5, about 12 to about 14, about 12 to about 13.5, about 12 to about 13, about 12 to about 12.5, about 12.5 to about 15, about 12.5 to about 14.5, about 12.5 to about 14, about 12.5 to about 13.5, about 12.5 to about 13, about 12.5 to about 15, about 12.5 to about 14.5, about 12.5 to about 14, about 12.5 to about 13.5, about 12.5 to about 13, about 13 to about 15, about 13 to about 14.5, about 13 to about 14, about 13 to about 13.5, about 13.5 to about 15, about 13.5 to about 14.5, about 13.5 to about 14, about 14 to about 15, about 14 to about 14.5, and about 14.5 to about 15.

In an embodiment comprising a base, the pH can be from about 9 to about 15, about 9 to about 14 or about 8 to about 14.

Exemplary bases can include, but are not limited to, sodium hydroxide, potassium hydroxide, lithium hydroxide, pyridine, pyrrole, piperazine, pyrrolidine, piperidine, picoline, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, tetraethylammonium hydroxide, tetrapropylammonium hydroxide, tetrabutylammonium hydroxide, ammonia, ammonium hydroxide, methylamine, ethylamine, propylamine, butylamine, pentylamine, hexylamine, octylamine, nonylamine, decylamine, N,N-dimethylamine, N,N-diethylamine, N,N-dipropylamine, N,N-dibutylamine, trimethylamine, triethylamine, tripropylamine, tributylamine, cyclohexylamine, trimethylimidine, 1-amino-3-methylbutane, dimethylglycine, 3-amino-3-methylamine, and the like. These bases may be used either singly or in combination. In an embodiment, the base can comprise or be sodium hydroxide and/or ammonium hydroxide.

In certain embodiments where the acid aqueous mixture comprises an acid, the aqueous mixture can have a pH from about 0.01 to about 6.0, about 0.01 to about 5, about 0.01 to about 4, about 0.01 to about 3, about 0.01 to about 2, about 0.01 to about 1, about 0.1 to about 6.0, about 0.1 to about 5.5, about 0.1 to about 5.0, about 0.1 to about 4.5, about 0.1 to about 4.0, about 0.1 to about 3.5, about 0.1 to about 3.0, about 0.1 to about 2.5, about 0.1 to about 2.0, about 0.1 to about 1.5, about 0.1 to about 1.0, about 0.1 to about 0.5, about 0.1 to about 0.2, about 0.2 to about 6.0, about 0.2 to about 5.5, about 0.2 to about 5.0, about 0.2 to about 4.5, about 0.2 to about 4.0, about 0.2 to about 3.5, about 0.2 to about 3.0, about 0.2 to about 2.5, about 0.2 to about 2.0, about 0.2 to about 1.5, about 0.2 to about 1.0, about 0.2 to about 0.5, about 0.5 to about 6.0, about 0.5 to about 5.5, about 0.5 to about 5.0, about 0.5 to about 4.5, about 0.5 to about 4.0, about 0.5 to about 3.5, about 0.5 to about 3.0, about 0.5 to about 2.5, about 0.5 to about 2.0, about 0.5 to about 1.5, about 0.5 to about 1.0, about 0.8 to about 6.0, about 0.8 to about 5.5, about 0.8 to about 5.0, about 0.8 to about 4.5, about 0.8 to about 4.0, about 0.8 to about 3.5, about 0.8 to about 3.0, about 0.8 to about 2.5, about 0.8 to about 2.0, about 0.8 to about 1.5, about 0.8 to about 1.0, about 1.0 to about 6.0, about 1.0 to about 5.5, about 1.0 to about 5.0, about 1.0 to about 4.5, about 1.0 to about 4.0, about 1.0 to about 3.5, about 1.0 to about 3.0, about 1.0 to about 2.5, about 1.0 to about 2.0, about 1.0 to about 1.5, about 1.5 to about 6.0, about 1.5 to about 5.5, about 1.5 to about 5.0, about 1.5 to about 4.5, about 1.5 to about 4.0, about 1.5 to about 3.5, about 1.5 to about 3.0, about 1.5 to about 2.5, about 1.5 to about 2.0, about 2.0 to about 6.0, about 2.0 to about 5.5, about 2.0 to about 5.0, about 2.0 to about 4.5, about 2.0 to about 4.0, about 2.0 to about 3.5, about 2.0 to about 3.0, about 2.0 to about 2.5, about 2.5 to about 6.0, about 2.5 to about 5.5, about 2.5 to about 5.0, about 2.5 to about 4.5, about 2.5 to about 4.0, about 2.5 to about 3.5, about 2.5 to about 3.0, about 3.0 to about 6.0, about 3.0 to about 5.5, about 3.0 to about 5.0, about 3.0 to about 4.5, about 3.0 to about 4.0, about 3.0 to about 3.5, about 3.5 to about 6.0, about 3.5 to about 5.5, about 3.5 to about 5, about 3.5 to about 4.5, about 3.5 to about 4.0, about 4.0 to about 6.0, about 4.0 to about 5.5, about 4.0 to about 5.0, about 4.0 to about 4.5, about 4.2 to about 5.0, or about 4.5 to about 5.0.

In an embodiment comprising an acid, the pH can be from about 0.01 to about 6.0, about 0.2 to about 6.0, about 0.2 to about 5.0 or about 0.2 to about 4.5.

Exemplary acids can include, but are not limited to, inorganic acids such as hydrochloric acid, nitric acid, sulfuric acid, hydrofluoric acid, phosphoric acid, boric acid and oxalic acid; and organic acids such as acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linoleic acid, linolenic acid, salicylic acid, benzoic acid, p-amino-benzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, succinic acid, itaconic acid, mesaconic acid, citraconic acid, malic acid, a hydrolysate of glutaric acid, a hydrolysate of maleic anhydride, a hydrolysate of phthalic anhydride, and the like. These acids may be used either singly or in combination. In an embodiment, the acid can comprise or be hydrochloric acid.

In various aspects, adjusting the pH of the aqueous mixture can affect the total surface area, microporous surface area and pore volume of the organosilica material made. Thus, the porosity of the organosilica material may be adjusted by adjusting the pH of the aqueous mixture.

II.B. Compounds of Formula (Ia) and Formula (Ib)

The methods provided herein comprise the step of providing a starting material mixture comprising at least one compound of Formula $[(RO)_2SiCH_2]_3$ (Ia) and at least one compound of Formula $[R'ROSiCH_2]_3$ (Ib), wherein each R' independently represents an RO— group, an R group, or an $(RO)_3Si$—$CH_2$— group, at least one R' being $(RO)_3Si$—$CH_2$—; and R represents a $C_1$-$C_4$ alkyl group. The starting material mixture is then added into the acidic or basic aqueous mixture to form a solution.

In various embodiments, each R independently can be a $C_1$-$C_3$ alkyl group, a methyl or ethyl group, or an ethyl group.

In various embodiments where each R' can be an RO— group, each R can be a $C_1$-$C_3$ alkyl group, a methyl or ethyl group, or an ethyl group.

In various embodiments where each R' can be an R group, each R can be a $C_1$-$C_3$ alkyl group, a methyl or ethyl group, or an ethyl group.

In some embodiments, at least one, two, or three of the R' can be an $(RO)_3Si$—$CH_2$— group. In particular, at least one of the R' can be an $(RO)_3Si$—$CH_2$— group.

In various embodiments where R' can be an $(RO)_3Si$—$CH_2$— group, each R can be a $C_1$-$C_3$ alkyl group, a methyl or ethyl group, or an ethyl group.

In an embodiment, the compound corresponding to Formula (Ia) can be 1,1,3,3,5,5-hexaethoxy-1,3,5-trisilacyclohexane, $[(EtO)_2SiCH_2]_3$, and the compound corresponding to Formula (Ib) can be 1,1,3,3,5-pentaethoxy-5-((triethoxysilyl)methyl)-1,3,5-trisilacyclohexane.

In another embodiment, a compound corresponding to Formula (Ia) can be 1,3,5-trimethyl-1,3,5-triethoxy-1,3,5-trisilacyclohexane, $[EtOCH_3SiCH_2]_3$.

In some embodiments, more than one compound of Formula (Ia) (e.g., at least two different compounds of Formula (Ia)), more than one compound of Formula (Ib) (e.g., at least two different compounds of Formula (I(b)), and/or other compounds may be added to the acidic or basic aqueous mixture to form a solution. For example, a further compound of Formula (Ia) can be added, wherein each $Z^1$ can be a $C_1$-$C_2$ alkoxy group and each $Z^2$ can be a $C_1$-$C_2$ alkyl group, such as $[EtOCH_3SiCH_2]_3$. For example, $[(EtO)_2SiCH_2]_3$ and $[EtOCH_3SiCH_2]_3$ may both be added to the acidic or basic aqueous mixture to form a solution.

In various embodiments, the ratio between a Formula (Ia) compound and a Formula (Ib) compound may be at least about 1:20, at least about 1:10, at least about 1:5, at least about 1:1, at least about 2:1, at least about 3:1, at least about 4:1, at least about 6:1, or at least about 7:1. Additionally or alternatively, the ratio between a Formula (Ia) compound and a Formula (Ib) compound may be from about 1:10 to about 20:1, about 1:5 to about 20:1, about 1:1 to about 20:1, about 1:1 to about 16:1, about 1:1 to about 10:1, about 1:1 to about 8:1, about 2:1 to about 10:1 or about 2:1 to about 8:1.

II.C. Compounds of Formula (IIa)

In additional embodiments, the methods provided herein can further comprise adding to the acidic or basic aqueous mixture at least one cyclic compound of Formula

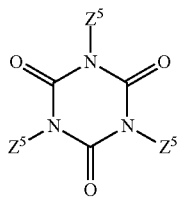

(IIa)

into the acidic or basic aqueous mixture, wherein each $Z^5$ independently can be an $X^3OX^4X^5SiX^6$ group, wherein each $X^3$ can be a $C_1$-$C_4$ alkyl group; $X^4$ and $X^5$ each independently can be a $C_1$-$C_4$ alkyl group, or a $C_1$-$C_4$ alkoxy group; and each $X^6$ can be a $C_1$-$C_8$ alkylene group bonded to a nitrogen atom of the cyclic compound In various embodiments, each $X^3$ can be a $C_1$-$C_4$ alkyl, a $C_1$-$C_3$ alkyl, a $C_1$-$C_2$ alkyl, or methyl group.

Additionally or alternatively, each $X^4$ and $X^5$ independently can be a $C_1$-$C_4$ alkyl group, a $C_1$-$C_3$ alkyl group, a $C_1$-$C_2$ alkyl group, or a methyl group.

Additionally or alternatively, each $X^4$ and $X^5$ independently can be a $C_1$-$C_4$ alkoxy group, a $C_1$-$C_3$ alkoxy group, a $C_1$-$C_2$ alkoxy group, or a methoxy group.

Additionally or alternatively, each $X^4$ and $X^5$ independently can be a $C_1$-$C_2$ alkyl group, or a $C_1$-$C_2$ alkoxy group.

Additionally or alternatively, each $X^3$ can be $C_1$-$C_2$ alkyl group; $X^4$ and $X^5$ each independently can be a $C_1$-$C_2$ alkyl group, or a $C_1$-$C_2$ alkoxy group.

Additionally or alternatively, each $X^6$ can be a $C_1$-$C_7$ alkylene group bonded to a nitrogen atom of the cyclic compound, a $C_1$-$C_7$ alkylene group bonded to a nitrogen atom of the cyclic compound, a $C_1$-$C_6$ alkylene group bonded to a nitrogen atom of the cyclic compound, a $C_1$-$C_4$ alkylene group bonded to a nitrogen atom of the cyclic compound, a $C_1$-$C_3$ alkylene group bonded to a nitrogen atom of the cyclic compound, a $C_1$-$C_2$ alkylene group bonded to a nitrogen atom of the cyclic compound, or —$CH_2$— bonded to a nitrogen atom of the cyclic compound.

Additionally or alternatively, each $X^3$ can be a $C_1$-$C_2$ alkyl group; $X^4$ and $X^5$ each independently can be a $C_1$-$C_2$ alkyl group, or a $C_1$-$C_2$ alkoxy group; and $X^6$ can be a $C_1$-$C_4$ alkylene group bonded to a nitrogen atom of the cyclic compound.

In an embodiment, a compound corresponding to Formula (IIa) can be tris(3-trimethoxysilylpropyl)isocyanurate.

II.D. Compounds of Formula (IIIa)

In additional embodiments, the methods provided herein can further comprise adding to the acidic or basic aqueous mixture a compound of Formula $Z^6OZ^7Z^8Z^9Si$ (IIIa), wherein each $Z^6$ can be a hydrogen atom or a $C_1$-$C_6$ alkyl group, and $Z^7$, $Z^8$ and $Z^9$ each independently can be selected from the group consisting of a hydrogen atom, a $C_1$-$C_6$ alkyl group, a $C_1$-$C_6$ alkoxy group, a nitrogen-containing $C_1$-$C_{10}$ alkyl group, a nitrogen-containing heteroaralkyl group, and a nitrogen-containing optionally substituted heterocycloalkyl group.

In one embodiment, each $Z^6$ can be a $C_1$-$C_5$ alkyl group, a $C_1$-$C_4$ alkyl group, a $C_1$-$C_3$ alkyl group, a $C_1$-$C_2$ alkyl group, or methyl. In particular, each $Z^6$ can be a methyl or ethyl group.

Additionally or alternatively, $Z^7$, $Z^8$ and $Z^9$ can be each independently a $C_1$-$C_5$ alkyl group, a $C_1$-$C_4$ alkyl group, a $C_1$-$C_3$ alkyl group, a $C_1$-$C_2$ alkyl group, or a methyl group.

Additionally or alternatively, each $Z^6$ can be a $C_1$-$C_2$ alkyl group and $Z^7$, $Z^8$ and $Z^9$ can be each independently a $C_1$-$C_2$ alkyl group.

Additionally or alternatively, $Z^7$, $Z^8$ and $Z^9$ can be each independently a $C_1$-$C_5$ alkoxy group, a $C_1$-$C_4$ alkoxy group, a $C_1$-$C_3$ alkoxy group, a $C_1$-$C_2$ alkoxy group, or a methoxy group.

Additionally or alternatively, each $Z^6$ can be a $C_1$-$C_2$ alkyl group and $Z^7$, $Z^8$ and $Z^9$ can be each independently a $C_1$-$C_2$ alkoxy group.

Additionally or alternatively, each $Z^6$ can be a $C_1$-$C_2$ alkyl group and $Z^7$, $Z^8$ and $Z^9$ can be each independently a $C_1$-$C_2$ alkyl group, or a $C_1$-$C_2$ alkoxy group.

Additionally or alternatively, $Z^7$, $Z^8$ and $Z^9$ can be each independently a nitrogen-containing $C_1$-$C_9$ alkyl group, a nitrogen-containing $C_1$-$C_8$ alkyl group, a nitrogen-containing $C_1$-$C_7$ alkyl group, a nitrogen-containing $C_1$-$C_6$ alkyl group, a nitrogen-containing $C_1$-$C_5$ alkyl group, a nitrogen-containing $C_1$-$C_4$ alkyl group, a nitrogen-containing $C_1$-$C_3$ alkyl group, a nitrogen-containing $C_1$-$C_2$ alkyl group, or a methylamine. In particular, $Z^7$, $Z^8$ and $Z^9$ can be each independently a nitrogen-containing $C_2$-$C_{10}$ alkyl group, a nitrogen-containing $C_3$-$C_{10}$ alkyl group, a nitrogen-containing $C_3$-$C_9$ alkyl group, or a nitrogen-containing $C_3$-$C_8$ alkyl group. The aforementioned nitrogen-containing alkyl groups may have one or more nitrogen atoms (e.g., 2, 3, etc.). Examples of nitrogen-containing $C_1$-$C_{10}$ alkyl groups include, but are not limited to,

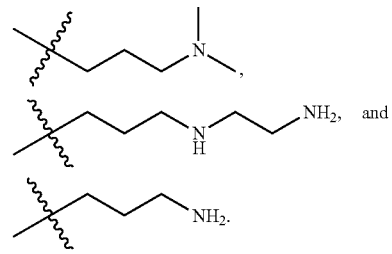

Additionally or alternatively, each $Z^6$ can be a $C_1$-$C_2$ alkyl group and $Z^7$, $Z^8$ and $Z^9$ can be each independently a nitrogen-containing $C_3$-$C_8$ alkyl group.

Additionally or alternatively, each $Z^6$ can be a $C_1$-$C_2$ alkyl group and $Z^7$, $Z^8$ and $Z^9$ can be each independently a $C_1$-$C_2$ alkyl group, a $C_1$-$C_2$ alkoxy group, or a nitrogen-containing $C_3$-$C_8$ alkyl group.

Additionally or alternatively, $Z^7$, $Z^8$ and $Z^9$ can be each independently a nitrogen-containing heteroaralkyl group. The nitrogen-containing heteroaralkyl group can be a nitrogen-containing $C_4$-$C_{12}$ heteroaralkyl group, a nitrogen-containing $C_4$-$C_{10}$ heteroaralkyl group, or a nitrogen-containing $C_4$-$C_8$ heteroaralkyl group. Examples of nitrogen-containing heteroaralkyl groups include but are not limited to pyridinylethyl, pyridinylpropyl, pyridinylmethyl, indolylmethyl, pyrazinylethyl, and pyrazinylpropyl. The aforementioned nitrogen-containing heteroaralkyl groups may have one or more nitrogen atoms (e.g., 2, 3, etc.).

Additionally or alternatively, each $Z^6$ can be a $C_1$-$C_2$ alkyl group and $Z^7$, $Z^8$ and $Z^9$ can be each independently a nitrogen-containing heteroaralkyl group.

Additionally or alternatively, each $Z^6$ can be a $C_1$-$C_2$ alkyl group and $Z^7$, $Z^8$ and $Z^9$ can be each independently a $C_1$-$C_2$ alkyl group, a $C_1$-$C_2$ alkoxy group, a nitrogen-containing $C_3$-$C_8$ alkyl group, or a nitrogen-containing heteroaralkyl group.

Additionally or alternatively, $Z^7$, $Z^8$ and $Z^9$ can be each independently a nitrogen-containing heterocycloalkyl group, wherein the heterocycloalkyl group may be optionally substituted with a $C_1$-$C_6$ alkyl group, particularly a $C_1$-$C_4$ alkyl group. The nitrogen-containing heterocycloalkyl group can be a nitrogen-containing $C_4$-$C_{12}$ heterocycloalkyl group, a nitrogen-containing $C_4$-$C_{10}$ heterocycloalkyl group, or a nitrogen-containing $C_4$-$C_8$ heterocycloalkyl group. Examples of nitrogen-containing heterocycloalkyl groups include but are not limited to piperazinylethyl, piperazinylpropyl, piperidinylethyl, piperidinylpropyl. The aforementioned nitrogen-containing heterocycloalkyl groups may have one or more nitrogen atoms (e.g., 2, 3, etc.).

Additionally or alternatively, each $Z^6$ can be a $C_1$-$C_2$ alkyl group and $Z^7$, $Z^8$ and $Z^9$ can be each independently a nitrogen-containing optionally substituted heterocycloalkyl group.

Additionally or alternatively, each $Z^6$ can be a $C_1$-$C_2$ alkyl group and $Z^7$, $Z^8$ and $Z^9$ can be each independently a $C_1$-$C_2$ alkyl group, a $C_1$-$C_2$ alkoxy group, a nitrogen-containing $C_3$-$C_8$ alkyl group, a nitrogen-containing heteroaralkyl group, or a nitrogen-containing optionally substituted heterocycloalkyl group.

Additionally or alternatively, each $Z^6$ can be a $C_1$-$C_2$ alkyl group and $Z^7$, $Z^8$ and $Z^9$ can be each independently a $C_1$-$C_2$ alkyl group, $C_1$-$C_2$ alkoxy group, a nitrogen-containing $C_3$-$C_{10}$ alkyl group, a nitrogen-containing $C_4$-$C_{10}$ heteroaralkyl group, or a nitrogen-containing optionally substituted $C_4$-$C_{10}$ heterocycloalkyl group.

In an embodiment, a compound corresponding to Formula (IIIa) can be selected from the group consisting of tetraethyl orthosilicate (TEOS) $((EtO)_4Si)$, methyltriethoxysilane (MTES) $((EtO)_3CH_3Si)$, (3-aminopropyl)triethoxysilane $(H_2N(CH_2)_3(EtO)_3Si)$, (N,N-dimethylaminopropyl)trimethoxysilane $(((CH_3)_2N(CH_2)_3)(MeO)_3Si)$, (N-(2-aminoethyl)-3-aminopropyltriethoxysilane $((H_2N(CH_2)_2NH(CH_2)_3)(EtO)_2Si)$, 4-methyl-1-(3-triethoxysilylpropyl)-piperazine, 4-(2-(triethoxysily)ethyl)pyridine, and 1-(3-(triethoxysilyl)propyl)-4,5-dihydro-1H-imidazole.

II.E. Compounds of Formula (IVa)

In additional embodiments, the methods provided herein can further comprise adding to the acidic or basic aqueous mixture a compound of Formula $Z^{10}Z^{11}Z^{12}Si$—$Z^1$—$SiZ^{10}Z^{11}Z^{12}$ (IVa), wherein each $Z^{10}$ independently can be a $C_1$-$C_4$ alkoxy group; $Z^{11}$ and $Z^{12}$ each independently can be a $C_1$-$C_4$ alkoxy group, or a $C_1$-$C_4$ alkyl group; and each $Z^1$ can be selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl group, and an optionally substituted $C_4$-$C_{20}$ heterocycloalkyl group.

In one embodiment, each $Z^{10}$ can be a $C_1$-$C_3$ alkoxy group, a $C_1$-$C_2$ alkoxy group, or a to methoxy group.

Additionally or alternatively, $Z^{11}$ and $Z^{12}$ each independently can be a $C_1$-$C_3$ alkoxy group, a $C_1$-$C_2$ alkoxy group, or a methoxy group.

Additionally or alternatively, each $Z^{10}$ can be a $C_1$-$C_2$ alkoxy group and $Z^{11}$ and $Z^{12}$ each independently can be a $C_1$-$C_2$ alkoxy group.

Additionally or alternatively, $Z^{11}$ and $Z^{12}$ each independently can be a $C_1$-$C_3$ alkyl group, a $C_1$-$C_2$ alkyl group, or a methyl group.

Additionally or alternatively, each $Z^{10}$ can be a $C_1$-$C_2$ alkoxy group and $Z^{11}$ and $Z^{12}$ each independently can be a $C_1$-$C_2$ alkyl group.

Additionally or alternatively, each $Z^{10}$ can be a $C_1$-$C_2$ alkoxy group and $Z^{11}$ and $Z^{12}$ each independently can be a $C_1$-$C_2$ alkoxy group, or a $C_1$-$C_2$ alkyl group.

Additionally or alternatively, each $Z^1$ can be a $C_1$-$C_7$ alkylene group, a $C_1$-$C_6$ alkylene group, a $C_1$-$C_5$ alkylene group, a $C_1$-$C_4$ alkylene group, a $C_1$-$C_3$ alkylene group, a $C_1$-$C_2$ alkylene group, or —$CH_2$—.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_1$-$C_2$ alkylene group.

Additionally or alternatively, each $Z^{10}$ can be a $C_2$-$C_7$ alkenylene group, a $C_1$-$C_6$ alkenylene group, a $C_2$-$C_5$ alkenylene group, a $C_2$-$C_4$ a alkenylene group, a $C_2$-$C_3$ alkenylene group, or —CH=CH—.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_1$-$C_2$ alkenylene group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_1$-$C_2$ alkylene group, or a $C_1$-$C_2$ alkenylene group.

Additionally or alternatively, each $Z^1$ can be a $C_2$-$C_7$ alkynylene group, a $C_1$-$C_6$ alkynylene group, a $C_2$-$C_5$ alkynylene group, a $C_2$-$C_4$ alkynylene group, a $C_2$-$C_3$ alkynylene group, or —C≡C—.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_2$-$C_4$ alkynylene group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_2$-$C_4$ alkylene group, a $C_2$-$C_4$ alkenylene group, or a $C_2$-$C_4$ alkynylene group.

Additionally or alternatively, each $Z^1$ can be a nitrogen-containing $C_2$-$C_{10}$ alkylene group, a nitrogen-containing $C_3$-$C_{10}$ alkylene group, a nitrogen-containing $C_4$-$C_{10}$ alkylene group, a nitrogen-containing $C_4$-$C_9$ alkylene group, a nitrogen-containing $C_4$-$C_8$ alkylene group, or nitrogen containing $C_3$-$C_8$ alkylene group. The aforementioned nitrogen-containing alkylene groups may have one or more nitrogen atoms (e.g., 2, 3, etc.). Examples of nitrogen-containing alkylene groups include, but are not limited to,

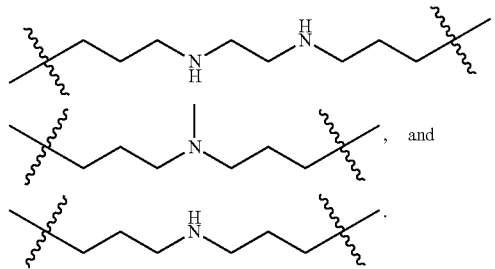

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a nitrogen-containing $C_4$-$C_{10}$ alkylene group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_2$-$C_4$ alkylene group, a $C_2$-$C_4$ alkenylene group, a $C_2$-$C_4$ alkynylene group, or a nitrogen-containing $C_4$-$C_{10}$ alkylene group.

Additionally or alternatively, each $Z^1$ can be an optionally substituted $C_6$-$C_{20}$ aralkyl, an optionally substituted $C_6$-$C_{14}$ aralkyl, or an optionally substituted $C_6$-$C_{10}$ aralkyl. Examples of $C_6$-$C_{20}$ aralkyls include, but are not limited to, phenymethyl, phenylethyl, and naphthylmethyl. The aralkyl may be optionally substituted with a $C_1$-$C_6$ alkyl group, particularly a $C_1$-$C_4$ alkyl group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be an optionally substituted $C_6$-$C_{10}$ aralkyl.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_2$-$C_4$ alkylene group, a $C_2$-$C_4$ alkenylene group, a $C_2$-$C_4$ alkynylene group, a nitrogen-containing $C_4$-$C_{10}$ alkylene group, or an optionally substituted $C_6$-$C_{10}$ aralkyl.

Additionally or alternatively, each $Z^1$ can be an optionally substituted $C_4$-$C_{20}$ heterocycloalkyl group, an optionally substituted $C_4$-$C_{16}$ heterocycloalkyl group, an optionally substituted $C_4$-$C_{12}$ heterocycloalkyl group, or an optionally substituted $C_4$-$C_{10}$ heterocycloalkyl group. Examples of $C_4$-$C_{20}$ heterocycloalkyl groups include, but are not limited to, thienylmethyl, furylethyl, pyrrolylmethyl, piperazinylethyl, pyridylmethyl, benzoxazolylethyl, quinolinylpropyl, and imidazolylpropyl. The heterocycloalkyl may be optionally substituted with a $C_1$-$C_6$ alkyl group, particularly a $C_1$-$C_4$ alkyl group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be an optionally substituted $C_4$-$C_{12}$ heterocycloalkyl group.

Additionally or alternatively, each $Z^{10}$ can be a $C_1$-$C_2$ alkoxy group; $Z^{11}$ and $Z^{12}$ each independently can be a $C_1$-$C_2$ alkoxy group, or a $C_1$-$C_2$ alkyl group; and each $Z^1$ can be a $C_2$-$C_4$ alkylene group, a $C_2$-$C_4$ alkenylene group, a $C_2$-$C_4$ alkynylene group, a nitrogen-containing $C_4$-$C_{10}$ alkylene group, an optionally substituted $C_6$-$C_{10}$ aralkyl, or an optionally substituted $C_4$-$C_{12}$ heterocycloalkyl group.

In an embodiment, a compound corresponding to Formula (IVa) can be selected from the group consisting of 1,2-bis(methyldiethoxysilyl)ethane ($CH_3(EtO)_2Si$—$CH_2CH_2$—$Si(EtO)_2CH_3$), bis(triethoxysilyl)methane (($EtO)_3Si$—$CH_2$—$Si(EtO)_3$), 1,2-bis(triethoxysilyl)ethylene (($EtO)_3Si$—$HC$=$CH$—$Si(EtO)_3$), N,N-bis[(3-trimethoxysilyl)propyl]ethylenediamine, bis[(methyldiethoxysilyl)propyl]amine, and bis[(methyldimethoxysilyl)propyl]-N-methylamine.

II.F. Trivalent Metal Oxide Sources

In additional embodiments, the methods provided herein can further comprise adding to the acidic or basic aqueous mixture sources of a trivalent metal oxide.

Sources of trivalent metal oxides can include, but are not limited to, corresponding salts, alkoxides, oxides, and/or hydroxides of the trivalent metal, e.g., aluminum sulphate, aluminum nitrate, colloidal alumina, aluminum trihydroxide, hydroxylated alumina, $Al_2O_3$, aluminum halides (e.g., $AlCl_3$), $NaAlO_2$, boron nitride, $B_2O_3$ and/or $H_3BO_3$.

In various aspects, the source of trivalent metal oxide may be a compound of Formula $M^1(OZ^{13})_3$ (Va), wherein $M^1$ can be a Group 13 metal and each $Z^{13}$ independently can be a $C_1$-$C_6$ alkyl group.

In one embodiment, $M^1$ can be B, Al, Ga, In, Il, or Uut. In particular, $M^1$ can be Al or B.

Additionally or alternatively, each $Z^{13}$ can be a $C_1$-$C_6$ alkyl group, a $C_1$-$C_5$ alkyl group, a $C_1$-$C_4$ alkyl group, a $C_1$-$C_3$ alkyl group, a $C_1$-$C_2$ alkyl group, or a methyl group. In particular, each $Z^8$ can be a methyl, ethyl, propyl or butyl group.

Additionally or alternatively, $M^1$ can be Al or B and each $Z^{13}$ can be a methyl, ethyl, propyl or butyl group.

In a particular embodiment, $M^1$ can be Al and each $Z^{13}$ can be methyl, such that compound corresponding to Formula (Va) can be aluminum trimethoxide.

In a particular embodiment, $M^1$ can be Al and each $Z^{13}$ can be ethyl, such that compound corresponding to Formula (Va) can be aluminum triethoxide.

In a particular embodiment, $M^1$ can be Al and each $Z^{13}$ can be propyl, such that compound corresponding to Formula (Va) can be aluminum isopropoxide.

In a particular embodiment, $M^1$ can be Al and each $Z^{13}$ can be butyl, such that compound corresponding to Formula (Va) can be aluminum tri-sec-butoxide.

Additionally or alternatively, the source of trivalent metal oxide may be a compound of Formula $(Z^{14}O)^2M_2$—O—$Si(OZ^{15})_3$ (VIa), wherein $M^2$ can be a Group 13 metal and $Z^{14}$ and $Z^{15}$ each independently can be a $C_1$-$C_6$ alkyl group.

In one embodiment, $M^2$ can be B, Al, Ga, In, Il, or Uut. In particular, $M^1$ can be Al or B.

Additionally or alternatively, $Z^{14}$ and $Z^{15}$ each independently can be a $C_1$-$C_6$ alkyl group, a $C_1$-$C_5$ alkyl group, a $C_1$-$C_4$ alkyl group, a $C_1$-$C_3$ alkyl group, a $C_1$-$C_2$ alkyl group, or a methyl group. In particular, $Z^{14}$ and $Z^{15}$ each independently can be a methyl, ethyl, propyl or butyl group.

Additionally or alternatively, $M^{23}$ can be Al or B and $Z^{14}$ and $Z^{15}$ each independently can be a methyl, ethyl, propyl or butyl group.

Additionally or alternatively, the source of a trivalent metal oxide may be a source of a compound of Formula (Va) (e.g., $AlCl_3$), and/or a source of a compound of Formula (VIa).

II.G. Silica-Containing Material

In additional embodiments, the methods provided herein can further comprise adding to the acidic or basic aqueous mixture a silica-containing material.

Silica-containing materials can include, but are not limited to, any commercially available colloidal silicas, such as any LUDOX® colloidal silica (e.g.,LUDOX® HS-40, LUDOX® AS-30, LUDOX® AS-40, etc.).

II.H. Metal Chelate Sources

In additional embodiments, the methods provided herein can further comprise adding to the acidic or basic aqueous mixture sources of metal chelate compounds.

Examples of metal chelate compounds, when present, can include titanium chelate compounds such as triethoxy.mono(acetylacetonato) titanium, tri-n-propoxy.mono(acetylacetonato)titanium, tri-i-propoxy.mono(acetylacetonato)titanium, tri-n-butoxy.mono(acetylacetonato)titanium, tri-sec-butoxy.mono(acetylacetonato)titanium, tri-t-butoxy.mono(acetylacetonato)titanium, diethoxy.bis(acetylacetonato)titanium, di-n-propoxy.bis(acetylacetonato)titanium, di-i-propoxy.bis(acetylacetonato)titanium, di-n-butoxy.bis(acetylacetonato)titanium, di-sec-butoxy.bis(acetylacetonato)titanium, di-t-butoxy.bis(acetylacetonato)titanium, monoethoxy.tris(acetylacetonato)titanium, mono-n-propoxy.tris(acetylacetonato) titanium, mono-i-propoxy.tris(acetylacetonato)titanium, mono-n-butoxy.tris(acetylacetonato)titanium, mono-sec-butoxy.tris(acetylacetonato)titanium, mono-t-butoxy.tris(acetylacetonato)titanium, tetrakis(acetylacetonato)titanium, triethoxy.mono(ethylacetoacetaato)titanium, tri-n- propoxy.mono(ethylacetoacetato)titanium, tri-i-propoxy.mono(ethylacetoacetato) titanium, tri-n-butoxy.mono(ethylacetoacetato) titanium, tri-sec-butoxy.mono(ethylacetoacetato) titanium, tri-t-butoxy-mono(ethylacetoacetato)titanium, diethoxy.bis(ethylacetoacetato)titanium, di-n-propoxy.bis(ethylacetoacetato)titanium, di-i-propoxy.bis(ethylacetoacetato)titanium, di-n-butoxy.bis(ethylacetoacetato)titanium, di-sec-butoxy.bis(ethylacetoacetato)titanium, di-t-butoxy.bis(ethylacetoacetato)titanium, monoethoxy.tris(ethylacetoacetato)titanium, mono-n-propoxy.tris(ethylacetoaetato)titanium, mono-i-propoxy.tris(ethylacetoacetato) titanium, mono-n-butoxy.tris(ethylacetoacetato) titanium, mono-sec-butoxy.tris(ethylacetoacetato)titanium, mono-t-butoxy.tris(ethylacetoacetato)titanium, tetrakis (ethylacetoacetato)titanium, mono(acetylacetonato)tris (ethylacetoacetato) titanium, bis(acetylacetonato)bis(ethylacetoacetato)titanium, and tris(acetylacetonato)mono(ethylacetoacetato)titanium; zirconium chelate compounds such as triethoxy.mono(acetylacetonato)zirconium, tri-n-propoxy.mono(acetylacetonato) zirconium, tri-i-propoxy.mono(acetylacetonato)zirconium, tri-n-butoxy.mono(acetylacetonato)zirconium, tri-sec-butoxy.mono(acetylacetonato) zirconium, tri-t-butoxy.mono(acetylacetonato)zirconium, diethoxy.bis(acetylacetonato)zirconium, di-n-propoxy.bis(acetylacetonato)zirconium, di-i-propoxy.bis(acetylacetonato)zirconium, di-n-butoxy.bis(acetylacetonato)zirconium, di-sec-butoxy.bis(acetylacetonato)zirconium, di-t-butoxy.bis(acetylacetonato)zirconium, monoethoxy.tris(acetylacetonato)zirconium, mono-n-propoxy.tris(acetylacetonato) zirconium, mono-i-propoxy.tris(acetylacetonato) zirconium, mono-n-butoxy.tris(acetylacetonato)zirconium, mono-sec-butoxy.tris(acetylacetonato)zirconium, mono-t-butoxy.tris(acetylacetonato)zirconium, tetrakis(acetylacetonato)zirconium, triethoxy.mono(ethylacetoacetato)zirconium, tri-n-propoxy.mono(ethylacetoacetato)zirconium, tri-i-propoxy.mono(ethylacetoacetato) zirconium, tri-n-butoxy.mono(ethylacetoacetato)zirconium, tri-sec-butoxy.mono(ethylacetoacetato)zirconium, tri-t-butoxy.mono(ethylacetoacetato) zirconium, diethoxy.bis(ethylacetoacetato)zirconium, di-n-propoxy.bis(ethylacetoacetato)zirconium, di-i-propoxy.bis(ethylacetoacetato)zirconium, di-n-butoxy.bis(ethylacetoacetato) zirconium, di-sec-butoxy.bis(ethylacetoacetato) zirconium, di-t-butoxy.bis(ethylacetoacetato)zirconium, monoethoxy.tris(ethylacetoacetato)zirconium, mono-n-propoxy.tris(ethylacetoacetato)zirconium, mono-i-propoxy.tris(ethylacetoacetato) zirconium, mono-n-butoxy.tris(ethylacetoacetato)zirconium, mono-sec-butoxy.tris(ethylacetoacetato)zirconium, mono-t-butoxy.tris(ethylacetoacetato) zirconium, tetrakis(ethylacetoacetato)zirconium, mono(acetylacetonato)tris(ethylacetoacetato) zirconium, bis(acetylacetonato)bis(ethylacetoacetato)zirconium, and tris(acetylacetonato)mono(ethylacetoacetato)zirconium; and aluminum chelate compounds such as tris(acetylacetonato)aluminum and tris(ethylacetoacetato)aluminum. Of these, the chelate compounds of titanium or aluminum can be of note, of which the chelate compounds of titanium can be particularly of note. These metal chelate compounds may be used either singly or in combination II.I. Stirring the Solution In various aspects, the solution formed in the methods described herein can be mixed (or stirred) by any suitable means, e.g., mechanical stirring, mixer, sonicator, etc., for a suitable length of time and suitable temperature as understood by a person of ordinary skill in the art, for example, depending on the pH of the solution and/or the amount of acid or base present, etc. For example, the solution may be mixed at a temperature of about 17° C. to about 25° C. or about 20° C. to about 25° C. for ≥about 1 hour, ≥about 4 hours, ≥about 6 hours, ≥about 12 hours, ≥about 18 hours, ≥about 24 hours (1 day), ≥about 2 days, ≥about 4 days, ≥about 6 days, ≥about 7 days, ≥about 8 days, ≥about 10 days, ≥about 12 days, ≥about 14 days, ≥about 16 days, ≥about 18 days, or about 21 days. Additionally or alternatively, the solution may be mixed for about 1 hour to about 21 days, about 1 hour to about 16 days, about 4 hours to 14 days, about 6 hours to about 10 days, about 6 hours to about 6 days, about 6 hours to about 2 days, about 6 hours to about 24 hours or about 12 hours to about 24 hours. Preferably, the solution may be mixed for ≥about 24 hours (1 day), for example, about 24 hours (1 day) to 21 days, about 24 hours (1 day) to 16 days, about 24 hours (1 day) to 12 days, about 24 hours (1 day) to 10 days, or about 24 hours (1 day) to 7 days.

II.J. Curing the Solution

Additionally, the solution formed in the methods described herein is cured or aged for a suitable amount of time at a suitable temperature, for example, in an oven or an autoclave, to form a pre-product, which may be in gel form. In various embodiments, the solution may be cured for about 4 hours, at least about 6 hours, at least about 12 hours, at least about 18 hours, at least about 24 hours (1 day), at least about 30 hours, at least about 36 hours, at least about 42 hours, at least about 48 hours (2 days), at least about 54 hours, at least about 60 hours, at least about 66 hours, at least about 72 hours (3 days), at least about 96 hours (4 days), at least about 120 hours (5 days) or at least about 144 hours (6 days).

Additionally or alternatively, the solution formed in the methods described herein can be cured or aged for about 4 hours to about 144 hours (6 days), about 4 hours to about 120 hours (5 days), about 4 hours to about 96 hours (4 days), about 4 hours to about 72 hours (3 days), about 4 hours to about 66 hours, about 4 hours to about 60 hours, about 4 hours to about 54 hours, about 4 hours to about 48 hours (2 days), about 4 hours to about 42 hours, about 4 hours to about 36 hours, about 4 hours to about 30 hours, about 4 hours to about 24 hours (1 day), about 4 hours to about 18 hours, about 4 hours to about 12 hours, about 4 hours to about 6 hours, about 12 hours to about 144 hours (6 days), about 12 hours to about 120 hours (5 days), about 12 hours to about 96 hours (4 days), about 12 hours to about 72 hours (3 days), about 12 hours to about 66 hours, about 12 hours to about 60 hours, about 12 hours to about 54 hours, about 12 hours to about 48 hours (2 days), about 12 hours to about 42 hours, about 12 hours to about 36 hours, about 12 hours to about 30 hours, about 12 hours to about 24 hours (1 day), about 12 hours to about 18 hours, about 18 hours to about 144 hours (6 days), about 18 hours to about 120 hours (5 days), about 18 hours to about 96 hours (4 days), about 18 hours to about 72 hours (3 days), about 18 hours to about 66 hours, about 18 hours to about 60 hours, about 18 hours to about 54 hours, about 18 hours to about 48 hours (2 days), about 18 hours to about 42 hours, about 18 hours to about 36 hours, about 18 hours to about 30 hours, about 18 hours to about 24 hours (1 day), about 24 hours(1 day) to about 144 hours (6 days), about 24 (1 day) hours (1 day) to about 120 hours (5 days), about 24 hours (1 day) to about 96 hours (4 days), about 24 hours (1 day) to about 72 hours (3 days), about 24 hours (1 day) to about 66 hours, about 24 hours (1 day) to about 60 hours, about 24 hours (1 day) to about 54 hours, about 24 hours (1 day) to about 48 hours (2 days), about 24 hours (1 day) to about 42 hours, about 24 hours (1 day) to about 36 hours, about 24 hours (1 day) to about 30 hours, about 30 hours to about 144 hours (6 days), about 42 hours to about 120 hours (5 days), about 54 hours to about 96 hours (4 days), about 60 hours to about 72 hours (3 days), about 96 hours (4 days) to about 120 hours (5 days), or about 120 hours (5 days) to about 144 hours (6 days).

Additionally or alternatively, the solution formed in the methods described herein can be cured or aged at temperature of at least about 10° C., at least about 20° C., at least about 30° C., at least about 40° C., at least about 50° C., at least about 60° C., at least about 70° C., at least about 80° C., at least about 90° C., at least about 100° C., at least about 110° C., at least about 120° C. at least about 130° C., at least about 140° C., at least about 150° C., at least about 175° C., at least about 200° C., at least about 250° C., or about 300° C.

Additionally or alternatively, the solution formed in the methods described herein can be cured or aged at temperature of about 10° C. to about 300° C., about 10° C. to about 250° C., about 10° C. to about 200° C., about 10° C. to about 175° C., about 10° C. to about 150° C., about 10° C. to about 120° C., about 10° C. to about 100° C., about 10° C. to about 90° C., about 10° C. to about 80° C., about 10° C. to about 70° C., about 10° C. to about 60° C., about 10° C. to about 50° C., about 30° C. to about 300° C., about 30° C. to about 250° C., about 30° C. to about 200° C., about 30° C. to about 175° C., about 30° C. to about 150° C., about 30° C. to about 120° C., about 30° C. to about 100° C., about 30° C. to about 90° C., about 50° C. to about 300° C., about 50° C. to about 250° C., about 50° C. to about 200° C., about 50° C. to about 175° C., about 50° C. to about 150° C., about 50° C. to about 120° C., about 50° C. to about 100° C., about 50° C. to about 90° C., about 50° C. to about 80° C., about 70° C. to about 300° C., about 70° C. to about 250° C., about 70° C. to about 200° C., about 70° C. to about 175° C., about 70° C. to about 150° C., about 70° C. to about 120° C., about 70° C. to about 100° C., about 70° C. to about 90° C., about 70° C. to about 80° C., about 80° C. to about 300° C., about 80° C. to about 250° C., about 80° C. to about 200° C., about 80° C. to about 175° C., about 80° C. to about 150° C.,about 80° C. to about 120° C., about 80° C. to about 100° C., about 80° C. to about 90° C., about 90° C. to about 300° C., about 90° C. to about 250° C., about 90° C. to about 200° C., about 90° C. to about 175° C., about 90° C. to about 150° C., about 90° C. to about 120° C., about 90° C. to about 100° C., about 100° C. to about 300° C., about 100° C. to about 250° C., about 100° C. to about 200° C., about 100° C. to about 175° C., about 100° C. to about 150° C., about 100° C. to about 120° C., about 120° C. to about 200° C., about 120° C. to about 175° C., about 120° C. to about 150° C., about 130° C. to about 300° C., about 130° C. to about 250° C., about 130° C. to about 200° C., about 130° C. to about 175° C., or about 130° C. to about 150° C.

In an embodiment, the solution may be cured or aged for up to 144 hours at a temperature of about 50° C. to about 200° C.

In various aspects, adjusting the curing time and/or curing temperature of the solution formed in the methods described herein can affect the total surface area, microporous surface area, pore volume, pore radius and pore diameter of the organosilica material made. Thus, the porosity of the organosilica material may be adjusted by adjusting aging time and/or temperature.

II.K. Drying the Pre-Product

The methods described herein comprise drying the pre-product (e.g., a gel) to produce the organosilica material.

In some embodiments, the pre-product (e.g., a gel) formed in the method can be dried at a temperature ≥about 50° C., ≥about 70° C., ≥about 80° C., ≥about 100° C., ≥about 110° C., ≥about 120° C., ≥about 150° C., ≥about 200° C., ≥about 250° C., ≥about 300° C., ≥about 350° C., ≥about 400° C., ≥about 450° C., ≥about 500° C., ≥about 550° C., or ≥about 600° C.

Additionally or alternatively, the pre-product (e.g., a gel) formed in the methods described herein can be dried at temperature of about 50° C. to about 600° C., about 50° C. to about 550° C., about 50° C. to about 500° C., about 50° C. to about 450° C., about 50° C. to about 400° C., about 50° C. to about 350° C., about 50° C. to about 300° C., about 50° C. to about 250° C., about 50° C. to about 200° C., about 50° C. to about 150° C., about 50° C. to about 120° C., about 50° C. to about 110° C., about 50° C. to about 100° C., about 50° C. to about 80° C., about 50° C. to about 70° C., about 70° C. to about 600° C., about 70° C. to about 550° C., about 70° C. to about 500° C., about 70° C. to about 450° C., about 70° C. to about 400° C., about 70° C. to about 350° C., about 70° C. to about 300° C., about 70° C. to about 250° C., about 70° C. to about 200° C., about 70° C. to about 150° C., about 70° C. to about 120° C., about 70° C. to about 110° C., about 70° C. to about 100° C., about 70° C. to about 80° C., about 80° C. to about 600° C., about 80° C. to about 550° C., about 80° C. to about 500° C., about 80° C. to about 450° C., about 80° C. to about 400° C., about 80° C. to about 350° C., about 80° C. to about 300° C., about 80° C. to about 250° C., about 80° C. to about 200° C., about 80° C. to about 150° C., about 80° C. to about 120° C., about 80° C. to about 110° C., or about 80° C. to about 100° C.

Additionally or alternatively, the pre-product (e.g., a gel) formed in the methods described herein at the temperatures described above, may be dried for ≥about 6 hours, ≥about 12 hours, ≥about 18 hours, ≥about 24 hours (1 day), ≥about 30 hours, ≥about 36 hours, ≥about 42 hours, ≥about 48 hours (2 days), ≥3 days, ≥5 days, ≥7 days or about 10 days. For example, the pre-product (e.g., a gel) formed in the methods described herein at the temperatures described above, may be dried for about 6 hours to about 10 days, about 6 hours to 7 days, about 6 hours to 5 days, about 6 hours to about days, about 6 hours to about 48 hours (2 days), about 6 hours to about 42 hours, about 12 hours to about 36 hours or about 18 hours to about 30 hours.

In an embodiment, the pre-product (e.g., a gel) formed in the methods described herein can be dried at temperature from about 70° C. to about 200° C.

Additionally or alternatively, the pre-product (e.g., a gel) formed in the method can be dried in a $N_2$ and/or air atmosphere and/or under a vacuum.

II.L. Optional Further Steps

In some embodiments, the method can further comprise calcining the organosilica material to obtain a silica material. The calcining can be performed in air or an inert gas, such as nitrogen or air enriched in nitrogen. Calcining can take place at a temperature of at least about 300° C., at least about 350° C., at least about 400° C., at least about 450° C., at least about 500° C., at least about 550° C., at least about 600° C., or at least about 650° C., for example at least about 400° C. Additionally or alternatively, calcining can be performed at a temperature of about 300° C. to about 650° C., about 300° C. to about 600° C., about 300° C. to about 550° C., about 300° C. to about 400° C., about 300° C. to about 450° C., about 300° C. to about 400° C., about 300° C. to about 350° C., about 350° C. to about 650° C., about 350° C. to about 600° C., about 350° C. to about 550° C., about 350° C. to about 400° C., about 350° C. to about 450° C., about 350° C. to about 400° C., about 400° C. to about 650° C., about 400° C. to about 600° C., about 400° C. to about 550° C., about 400° C. to about 500° C., about 400° C. to about 450°

C., about 450° C. to about 650° C., about 450° C. to about 600° C., about 450° C. to about 550° C., about 450° C. to about 500° C., about 500° C. to about 650° C., about 500° C. to about 600° C., about 500° C. to about 550° C., about 550° C. to about 650° C., about 550° C. to about 600° C. or about 600° C. to about 650° C.

In some embodiments, the method can further comprise incorporating a catalyst metal within the pores of the organosilica material (or the silica form thereof). Exemplary catalyst metals can include, but are not limited to, a Group 6 element, a Group 8 element, a Group 9 element, a Group 10 element or a combination thereof. Exemplary Group 6 elements can include, but are not limited to, chromium, molybdenum, and/or tungsten, particularly including molybdenum and/or tungsten. Exemplary Group 8 elements can include, but are not limited to, iron, ruthenium, and/or osmium. Exemplary Group 9 elements can include, but are not limited to, cobalt, rhodium, and/or iridium, particularly including cobalt. Exemplary Group 10 elements can include, but are not limited to, nickel, palladium and/or platinum.

The catalyst metal can be incorporated into the organosilica material (or the silica form thereof) by any convenient method, such as by impregnation, by ion exchange, or by complexation to surface sites. The catalyst metal so incorporated may be employed to promote any one of a number of catalytic transformations commonly conducted in petroleum refining or petrochemicals production. Examples of such catalytic processes can include, but are not limited to, hydrogenation, dehydrogenation, aromatization, aromatic saturation, hydrodesulfurization, olefin oligomerization, polymerization, hydrodenitrogenation, hydrocracking, naphtha reforming, paraffin isomerization, aromatic transalkylation, saturation of double/triple bonds, and the like, as well as combinations thereof.

Thus, in another embodiment, a catalyst material comprising the organosilica material (or the silica form thereof) described herein is provided. The catalyst material may optionally comprise a binder or be self-bound. Suitable binders include, but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the binder may be silica-alumina, alumina and/or a zeolite, particularly alumina. Silica-alumina may be either naturally occurring or in the form of gelatinous precipitates or gels including mixtures of silica and metal oxides. It should be noted it is recognized herein that the use of a material in conjunction with a zeolite binder material, i.e., combined therewith or present during its synthesis, which itself is catalytically active may change the conversion and/or selectivity of the finished catalyst. It is also recognized herein that inactive materials can suitably serve as diluents to control the amount of conversion if the organosilica materials (or the silica form thereof) of the present disclosure are employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst. The catalysts described herein typically can comprise, in a composited form, a ratio of support material to binder material of about 100 parts support material to about zero parts binder material; about 99 parts support material to about 1 parts binder material; about 95 parts support material to about 5 parts binder material. Additionally or alternatively, the catalysts described herein typically can comprise, in a composited form, a ratio of support material to binder material ranging from about 90 parts support material to about 10 parts binder material to about 10 parts support material to about 90 parts binder material; about 85 parts support material to about 15 parts binder material to about 15 parts support material to about 85 parts binder material; about 80 parts support material to 20 parts binder material to 20 parts support material to 80 parts binder material, all ratios being by weight, typically from 80:20 to 50:50 support material: binder material, preferably from 65:35 to 35:65. Compositing may be done by conventional means including mulling the materials together followed by extrusion of pelletizing into the desired finished catalyst particles.

In some embodiments, the method can further comprise incorporating cationic metal sites into the network structure by any convenient method, such as impregnation or complexation to the surface, through an organic precursor, or by some other method. This organometallic material may be employed in a number of hydrocarbon separations conducted in petroleum refining or petrochemicals production. Examples of such compounds to be desirably separated from petrochemicals/fuels can include olefins, paraffins, aromatics, and the like.

Additionally or alternatively, the method can further comprise incorporating a surface metal within the pores of the organosilica material (or the silica form thereof). The surface metal can be selected from a Group 1 element, a Group 2 element, a Group 13 element, and a combination thereof. When a Group 1 element is present, it can preferably comprise or be sodium and/or potassium. When a Group 2 element is present, it can include, but may not be limited to, magnesium and/or calcium. When a Group 13 element is present, it can include, but may not be limited to, boron and/or aluminum.

One or more of the Group 1, 2, 6, 8-10 and/or 13 elements may be present on an exterior and/or interior surface of the organosilica material (or the silica form thereof). For example, one or more of the Group 1, 2 and/or 13 elements may be present in a first layer on the organosilica material and one or more of the Group 6, 8, 9 and/or 10 elements may be present in a second layer, e.g., at least partially atop the Group 1, 2 and/or 13 elements. Additionally or alternatively, only one or more Group 6, 8, 9 and/or 10 elements may be present on an exterior and/or interior surface of the organosilica material. The surface metal(s) can be incorporated into/onto the organosilica material by any convenient method, such as by impregnation, deposition, grafting, co-condensation, by ion exchange, and/or the like.

III. Methods of Preparing Compounds of Formula (Ia) and Formula (Ib)

A mixture of compounds of Formula (Ia) and (Ib) can be prepared by any methods known in the art. For example, a mixture of Formula (Ia) and (Ib) compounds, such as a mixture including 1,1,3,3,5,5 hexaethoxy-1,3,5 trisilacyclohexane (A) and, 1,1,3,3,5-pentaethoxy-5-((triethoxysilyl)methyl)-1,3,5-trisilacyclohexane (B), can be prepared via a Grignard reaction as described in Brondani, D. et al. *Tetrahedron Letters*, 34(13):2111-2114 and as shown below in reaction scheme (I).

Reaction Scheme (I)

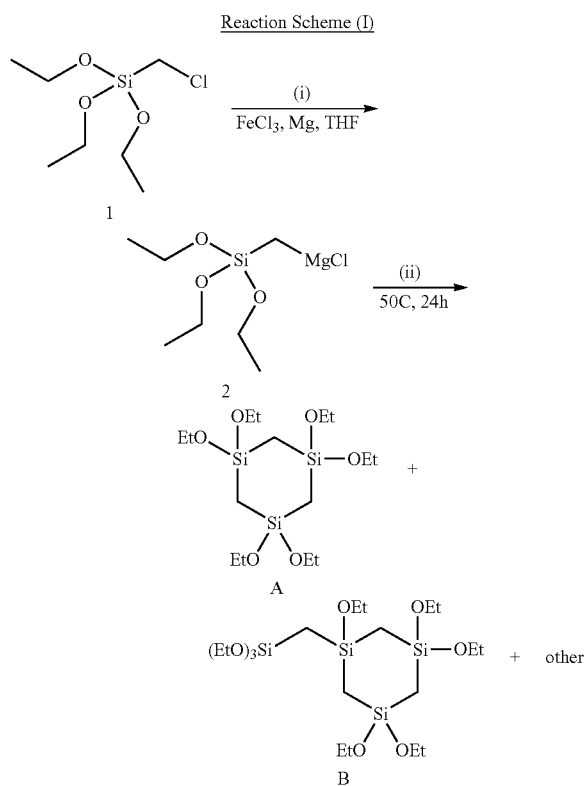

It was discovered that the yield of a Formula (Ia) compound (e.g., compound A) and a Formula (Ib) compound (e.g., compound B) as well as the ratio of a Formula (Ia) compound (e.g., compound A) to a Formula (Ib) compound (e.g., compound B) can be advantageously adjusted and/or tuned based on reaction time, reaction temperature and concentration of compound 1, for example, during step (ii) of reaction scheme (I). For example, longer reaction time and higher reaction temperature can favor generation of a Formula (Ib) compound (e.g., compound B). Additionally or alternatively, increased concentration of the compound 1 can also favor generation of a Formula (Ib) compound (e.g., compound B). As further described below, the ratio of a Formula (Ia) compound (e.g., compound A) to a Formula (Ib) compound (e.g., compound B) can affect the properties (e.g. average pore diameter, total surface area, etc.) of the resultant organosilica material obtained from using a starting mixture of a Formula (Ia) compound and a Formula (Ib) compound.

It is contemplated herein that compound 1 may be any suitable trialkoxy(chloromethyl)silane, for example, trimethoxy(chloromethyl)silane. It is also contemplated herein that during step (i), other than tetrahydrofuran (THF), suitable solvents that may be used include, but are not limited to dichloromethane, chloroform, ethers, such as dioxanes, methyl tert-butyl ether (MTBE), and the like. Additionally or alternatively, any suitable Grignard reaction initiator can be used in place of $FeCl_3$, for example, dichloroethane or iodine can be used as a Grignard reaction initiator.

In various aspects, reaction temperature, for example, during step (ii) of reaction scheme (I), can be ≥about 0.0° C., ≥about 5.0° C., ≥about 10° C., ≥about 15° C., ≥about 20° C., ≥about 25° C., ≥about 30° C., ≥about 35° C., ≥about 40° C., ≥about 45° C., ≥about 50° C., ≥about 55° C., ≥about 60° C., ≥about 65° C. or ≥about 70° C. Further, reaction temperature, for example, during step (ii) of reaction scheme (I), can be about 0.0° C. to about 70° C., 5.0° C. to about 65° C., 15° C. to about 60° C., about 15° C. to about 55° C., about 15° C. to about 50° C., about 20° C. to about 55° C., or about 20° C. to about 50° C.

Additionally or alternatively, reaction time, for example, during step (ii) of reaction scheme (I), can be ≥about 12 hours, ≥about 24 hours, ≥about 36 hours, ≥about 48 hours or ≥about 60 hours. Further, reaction time, for example, during step (ii) of reaction scheme (I), can be about 12 hours to about 60 hours, about 12 hours to about 48 hours, about 24 hours to about 60 hours, about 24 hours to about 48 hours, about 24 hours to about 36 hours, about 36 hours to about 60 hours, about 36 hours to about 48 hours, or about 48 hours to about 60 hours.

Additionally or alternatively, concentration of the Grignard reagent (e.g., compound 2) can be ≥about 0.050 mol/L, ≥about 0.10 mol/L, ≥about 0.50 mol/L, ≥about 1.0 mol/L, ≥about 2.5 mol/L, ≥about 5.0 mol/L, ≥about 7.5 mol/L, ≥about 10 mol/L, ≥about 12.5 mol/L, or ≥about 15 mol/L. Further, concentration of the Grignard reagent (e.g., compound 2) can be about 0.050 mol/L to about 15 mol/L, about 0.050 mol/L to about 12.5 mol/L, about 0.10 mol/L to about 15 mol/L, about 0.10 mol/L to about 12.5 mol/L, about 0.10 mol/L to about 10 mol/L, about 0.10 mol/L to about 7.5 mol/L, about 0.10 mol/L to about 5.0 mol/L, about 1.0 mol/L to about 15 mol/L, about 1.0 mol/L to about 12.5 mol/L, about 1.0 mol/L to about 10 mol/L, about 1.0 mol/L to about 7.5 mol/L, about 1.0 mol/L to about 5.0 mol/L, about 2.5 mol/L to about 15.0 mol/L, about 2.5 mol/L to about 12.5 mol/L, about 2.5 mol/L to about 10 mol/L, about 5.0 mol/L to about 12.5 mol/L or about 7.5 mol/L to about 12.5 mol/L.

In various embodiments, the starting material mixture provided in step a) is obtained by a Grignard reaction wherein a compound of formula $(RO)_3Si-CH_2-MgX$ in which X is selected from chloride or bromide is heated in a solvent to provide the starting material mixture comprising the at least one compound of Formula (Ia) and the at least one compound of Formula (Ib). In some embodiments, the starting material mixture obtained by the Grignard reaction is added into the acidic or basic aqueous mixture without any separation of the at least one compound of Formula (Ib) therefrom.

IV. Organosilica Material

Organosilica materials can be made by the methods described herein. In various embodiments, the organosilica material made by the methods described herein can be substantially single phase or one phase porous materials, meaning the organosilica material has one layer having an average pore diameter rather than a material having two layers. The two layer material may have a porous first layer and a second layer which has no porosity/is non-porous (for example, having no measurable pore diameter). Preferably, the organosilica material made by the methods described herein can be substantially single phase.

The organosilica materials made by the methods described herein can be polymers comprising independent siloxane units of Formula $[R^1R^2SiCH_2]_3$ (I), wherein each $R^1$ represents a hydroxyl group, a $C_1$-$C_4$ alkoxy group, or an oxygen atom bonded to a silicon atom of another siloxane unit and each $R^2$ represents a hydroxyl group, a $C_1$-$C_4$ alkoxy group, a $C_1$-$C_4$ alkyl group, or an oxygen atom bonded to a silicon atom of another siloxane.

In one embodiment, each $R^1$ can be a hydroxyl group.

Additionally or alternatively, each $R^1$ can be a $C_1$-$C_4$ alkoxy group, a $C_1$-$C_3$ alkoxy group, a $C_1$-$C_2$ alkoxy group, or a methoxy group.

Additionally or alternatively, each $R^1$ can be an oxygen atom bonded to a silicon atom of another siloxane unit.

Additionally or alternatively, each $R^1$ can be a hydroxyl group, a $C_1$-$C_2$ alkoxy group, or an oxygen atom bonded to a silicon atom of another siloxane unit.

Additionally or alternatively, each $R^2$ can be a hydroxyl group.

Additionally or alternatively, each $R^2$ can be a $C_1$-$C_4$ alkoxy group, a $C_1$-$C_3$ alkoxy group, a $C_1$-$C_2$ alkoxy group, or a methoxy group.

Additionally or alternatively, each $R^2$ can be a $C_1$-$C_4$ alkyl group, a $C_1$-$C_3$ alkyl group, a $C_1$-$C_2$ alkyl group, or a methyl group.

Additionally or alternatively, each $R^2$ can be an oxygen atom bonded to a silicon atom of another siloxane unit.

Additionally or alternatively, each $R^2$ can be a hydroxyl group, a $C_1$-$C_2$ alkoxy group, a $C_1$-$C_2$ alkyl group, or an oxygen atom bonded to a silicon atom of another siloxane unit.

Additionally or alternatively, each $R^1$ can be a hydroxyl group, a $C_1$-$C_2$ alkoxy group, or an oxygen atom bonded to a silicon atom of another siloxane unit and each $R^2$ can be a hydroxyl group, a $C_1$-$C_2$ alkyl group, a $C_1$-$C_2$ alkoxy group, or an oxygen atom bonded to a silicon atom of another siloxane unit.

Additionally or alternatively, each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane.

Additionally or alternatively, each $R^1$ can be a hydroxyl group, or an oxygen atom bonded to a silicon atom of another siloxane and each $R^2$ can be a hydroxyl group, or an oxygen atom bonded to a silicon atom of another siloxane.

In various embodiments, at least one, two or three of $R^1$ and/or $R^2$ can be a hydroxyl group, a $C_1$-$C_4$ alkoxy group, a $C_1$-$C_3$ alkoxy group, a $C_1$-$C_2$ alkoxy group, or a methoxy or ethoxy group, particularly, an ethoxy group, provided that at least one $R^1$ and/or $R^2$ is an oxygen atom bonded to a silicon atom of another siloxane.

In various embodiments, at least one, two or three of $R^1$ and/or $R^2$ can be an oxygen atom bonded to a silicon atom of another siloxane.

The organosilica material made from the methods described herein are a homopolymer comprising independent units of Formula I.

In an embodiment, the compound of Formula (Ia) comprising or being 1,1,3,3,5,5-hexaethoxy-1,3,5-trisilacyclohexane, and the compound of Formula (Ib) comprising or being 1,1,3,3,5-pentaethoxy-5-((triethoxysilyl)methyl)-1,3,5-trisilacyclohexane may be used in the methods described herein and the resulting organosilica material is a homopolymer comprising independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane.

In another particular embodiment, a compound of Formula (Ia), such as $[(EtO)_2SiCH_2]_3$ and a further compound, such as $[EtOCH_3SiCH_2]_3$, and a compound of Formula (Ib), such as 1,1,3,3,5-pentaethoxy-5-((triethoxysilyl)methyl)-1, 3,5-trisilacyclohexane, may be used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (I), wherein each $R^1$ can be a hydroxyl group, an ethoxy group, or an oxygen atom bonded to a silicon atom of another siloxane and each $R^2$ can be a methyl group.

If a compound of Formula (Ia), a compound of Formula (Ib), and a compound of Formula (IIa) are used in the methods described herein, the organosilica material made can be a copolymer comprising independent units of Formula I and independent units of Formula

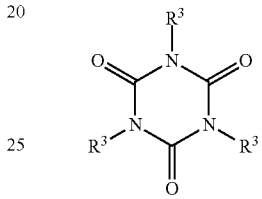

(II)

wherein each $R^3$ independently can be a $X^7OX^8X^9SiX^{10}$ group, wherein each $X^7$ can be a hydrogen atom, a $C_1$-$C_4$ alkyl group, or a bond to a silicon atom of another monomer unit; $X^8$ and $X^9$ each independently can be a hydroxyl group, a $C_1$-$C_4$ alkyl group, a $C_1$-$C_4$ alkoxy group, or an oxygen atom bonded to a silicon atom of another monomer unit; and each $X^{10}$ can be a $C_1$-$C_8$ alkylene group bonded to a nitrogen atom of the cyclic polyuria.

As used herein, and unless otherwise specified, "a bond to a silicon atom of another monomer" means the bond can advantageously displace a moiety (particularly an oxygen-containing moiety such as a hydroxyl, an alkoxy or the like), if present, on a silicon atom of the another monomer so there may be a bond directly to the silicon atom of the another monomer thereby connecting the two monomers, e.g., via a Si—O—Si linkage. For clarity, in this bonding scenario, the "another monomer" can be a monomer of the same type or a monomer of a different type.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIa), such as tris(3-trimethoxysilylpropyl)isocyanurate, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (II), wherein each $X^7$ can be a hydrogen atom, a methyl group, or a bond to a silicon atom of another monomer; $X^8$ and $X^9$ each independently can be a hydroxyl group, a methoxy group, or an oxygen atom bonded to a silicon atom of another monomer unit; and $X^{10}$ can be —$CH_2CH_2CH_2$— bonded to a nitrogen atom of the cyclic polyurea.

If a compound of Formula (Ia), a compound of Formula (Ib), and a compound of Formula (IIIa) are used in the methods described herein, the organosilica material made can be a copolymer comprising independent units of Formula I and independent units of Formula $Z^{16}OZ^{17}Z^{18}Z^{19}$ wherein each $Z^{16}$ can be a hydrogen atom or a $C_1$-$C_4$ alkyl group, or a bond to a silicon atom of another monomer; and $Z^{17}$, $Z^{18}$ and $Z^{19}$ each independently can be selected from the group consisting of a hydroxyl group, a $C_1$-$C_4$ alkyl group, a $C_1$-$C_4$ alkoxy group, a nitrogen-containing $C_1$-$C_{10}$ alkyl group, a nitrogen-containing heteroalkyl group, a nitrogen-containing optionally substituted heterocycloalkyl group and an oxygen atom bonded to a silicon atom of another monomer.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as tetraethyl orthosilicate (TEOS), are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; and $Z^{17}$, $Z^{18}$ and $Z^{19}$ each independently can be selected from the group consisting of a hydroxyl group, an ethoxy group, and an oxygen atom bonded to a silicon atom of another monomer.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as methyltriethoxysilane (MTES), are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{18}$ can be a methyl group.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as (N,N-dimethylaminopropyl)trimethoxysilane, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, a methyl group, or a bond to a silicon atom of another monomer; $Z^{17}$, $Z^{18}$ each independently can be selected from the group consisting of a hydroxyl group, a methoxy group, and an oxygen atom bonded to a silicon atom of another monomer; and $Z^{19}$ can be

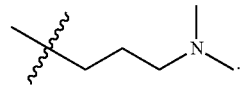 [SMILES: *CCCN(C)C]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as (N-(2-aminoethyl)-3-aminopropyltriethoxysilane, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{19}$ can be

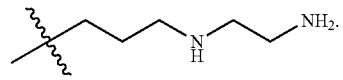 [SMILES: *CCCNCCN]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as 4-methyl-1-(3-triethoxysilylpropyl)-piperazine, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{19}$ can be

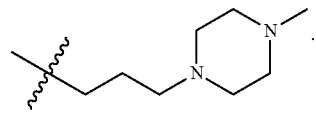 [SMILES: *CCCN1CCN(C)CC1]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as 4-(2-(triethoxysily)ethyl)pyridine, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{19}$ can be

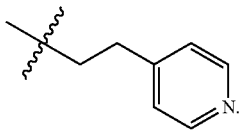

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as 1-(3-(triethoxysilyl)propyl)-4,5-dihydro-1H-imidazole, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{19}$ can be

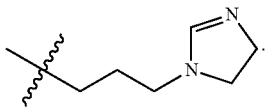 [SMILES: *CCCN1C=NCC1]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and a compound of Formula (IIIa), such as (3-aminopropyl)triethoxysilane, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (III), wherein each $Z^{16}$ can be a hydrogen atom, an ethyl group, or a bond to a silicon atom of another monomer; $Z^{17}$ and $Z^{18}$ each independently can be selected from the group consisting of a hydroxyl group, an ethoxy group, and an oxygen atom bonded to a silicon atom of another monomer; and each $Z^{19}$ can be

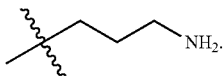 [SMILES: *CCCN]

If a compound of Formula (Ia), a compound of Formula (Ib), and a compound of Formula (IVa) are used in the methods described herein, the organosilica material made can be a copolymer comprising independent units of Formula I and independent units of Formula $Z^{20}Z^{21}Z^{22}Si—R^4—SiZ^{20}Z^{21}Z^{22}$ (IV), wherein each $Z^{20}$ independently can be a hydroxyl group, a $C_1$-$C_4$ alkoxy group, or an oxygen atom bonded to a silicon atom of another comonomer; $Z^{21}$ and $Z^{22}$ each independently can be a hydroxyl group, a $C_1$-$C_4$ alkoxy group, a $C_1$-$C_4$ alkyl group, or an oxygen atom bonded to a silicon atom of another monomer; and each $R^4$ can be selected from the group consisting of a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl and an optionally substituted $C_4$-$C_{20}$ heterocycloalkyl group.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as (1,2-bis(methyldiethoxysilyl)ethane, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (IV), wherein each $Z^{20}$ can be a hydroxyl group, an ethoxy group, or an oxygen atom bonded to a silicon atom of another comonomer; each $Z^{21}$ can be a hydroxyl group, an ethoxy group, or an oxygen atom bonded to a silicon atom of another monomer; each $Z^{22}$ can be methyl; and each $R^4$ can be —$CH_2CH_2$—.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as (bis(triethoxysilyl)methane, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen bonded to a silicon atom of another siloxane; and independent units of Formula (IV), wherein each $Z^{20}$ can be a hydroxyl group, an ethoxy group, or an oxygen atom bonded to a silicon atom of another comonomer; $Z^{21}$ and $Z^{22}$ can be each independently selected from the group consisting of a hydroxyl group, an ethoxy group, or an oxygen atom bonded to a silicon atom of another monomer; and each $R^4$ can be —$CH_2$—.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as 1,2-bis(triethoxysilyl)ethylene, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (IV), wherein each $Z^{20}$ can be a hydroxyl group, an ethoxy group, or an oxygen atom bonded to a silicon atom of another comonomer; $Z^{21}$ and $Z^{22}$ can be each independently selected from the group consisting of a hydroxyl group, an ethoxy group, or an oxygen atom bonded to a silicon atom of another monomer; and each $R^4$ can be —HC=CH—.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as NN'-bis[(3-trimethoxysilyl)propyl]ethylenediamine, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (IV), wherein each $Z^{20}$ can be a hydroxyl group, a methoxy group, or an oxygen atom bonded to a silicon atom of another comonomer; each $Z^{21}$ and $Z^{22}$ can be each independently selected from the group consisting of a hydroxyl group, a methoxy group, or an oxygen atom bonded to a silicon atom of another monomer; and each $R^4$ can be

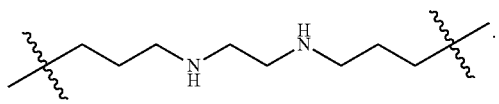 [SMILES: *CCCNCCNCCC*]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as bis[(methyldiethoxysilyl)propyl]amine, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (IV), wherein each $Z^{20}$ can be a hydroxyl group, an ethoxy group, or an oxygen atom bonded to a silicon atom of another comonomer; each $Z^{21}$ can be a hydroxyl group, an ethoxy group, or an oxygen atom bonded to a silicon atom of another monomer; $Z^{22}$ can be a methyl group; and each $R^4$ can be

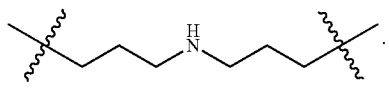 [SMILES: *CCCNCCC*]

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (IVa), such as bis[(methyldimethoxysilyl)propyl]-N-methylamine, are used in the methods described herein, the organosilica material made can be a copolymer comprising: independent units of Formula (I), wherein each $R^1$ can be a hydroxyl group, an ethoxy group, or an oxygen atom bonded to a silicon atom of another siloxane and each $R^2$ can be a hydroxyl group, an ethoxy group, or an oxygen atom bonded to a silicon atom of another siloxane; and independent units of Formula (IV), wherein each $Z^{20}$ can be a hydroxyl group, a methoxy group, or an oxygen atom bonded to a silicon atom of another comonomer; each $Z^{21}$ can be a hydroxyl group, a methoxy group, or an oxygen atom bonded to a silicon atom of another monomer; $Z^{22}$ can be a methyl group; and each $R^4$ can be

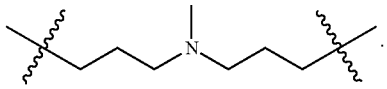 [SMILES: *CCCN(C)CCC*]

If a compound of Formula (Ia), a compound of Formula (Ib), and a compound of Formula (Va) are used in the methods described herein, the organosilica material made can be a copolymer comprising independent units of Formula I and independent units of Formula $M^3(OZ^{23})_3$ (V), wherein $M^3$ can be a Group 13 metal and each $Z^{23}$ independently can be a hydrogen atom, a $C_1$-$C_6$ alkyl group, or a bond to a silicon atom of another monomer.

In another embodiment, if a compound of Formula (Ia), such as $[(EtO)_2SiCH_2]_3$, a compound of Formula (Ib), such as 1,1,3,3,5-pentaethoxy-5-((triethoxysilyl)methyl)-1,3,5-trisilacyclohexane, and compound of Formula (Va), such as aluminum tri-sec-butoxide, are used in the methods described herein, the organosilica material made can be a copolymer comprising: independent units of Formula (I), wherein $R^1$ can be a hydroxyl group, an ethoxy group, or an oxygen atom bonded to a silicon atom of another siloxane and $R^2$ can be a hydroxyl group, an ethoxy group, or an oxygen atom bonded to a silicon atom of another siloxane; and independent units of Formula (V), wherein $M^{13}$ can be a Group 13 metal and $Z^{23}$ can be a hydrogen atom, a sec-butyl group, or a bond to a silicon atom of another monomer.

If a compound of Formula (Ia), a compound of Formula (Ib), and a compound of Formula (VIa) are used in the methods described herein, the organosilica material made can be a copolymer comprising independent units of Formula I and independent units of Formula $(Z^{24}O)_2$-$M^4$-O—Si$(OZ^{25})_3$ (VI), wherein $M^4$ represents a Group 13 metal and $Z^{24}$ and $Z^{25}$ each independently represent a hydrogen atom, a $C_1$-$C_6$ alkyl group, or a bond to a silicon atom of another monomer.

The organosilica materials made by the methods described herein can be characterized as described in the following sections.

IV.A. X-Ray Diffraction Peaks

The organosilica materials made by the methods described herein can exhibit powder X-ray diffraction patterns with one broad peak between about 1 and about 4 degrees 2θ, particularly one broad peak between about 1 and about 3 degrees 2θ. Additionally or alternatively, the organosilica materials can exhibit substantially no peaks in the range of about 0.5 to about 10 degrees 2θ, about 0.5 to about 12 degrees 2θ range, about 0.5 to about 15 degrees 2θ, about 0.5 to about 20 degrees 2θ, about 0.5 to about 30 degrees 2θ, about 0.5 to about 40 degrees 2θ, about 0.5 to about 50 degrees 2θ, about 0.5 to about 60 degrees 2θ, about 0.5 to about 70 degrees 2θ, about 2 to about 10 degrees 2θ, about 2 to about 12 degrees 2θ range, about 2 to about 15 degrees 2θ, about 2 to about 20 degrees 2θ, about 2 to about 30 degrees 2θ, about 2 to about 40 degrees 2θ, about 2 to about 50 degrees 2θ, about 2 to about 60 degrees 2θ, about 2 to about 70 degrees 2θ, about 3 to about 10 degrees 2θ, about 3 to about 12 degrees 2θ range, about 3 to about 15 degrees 2θ, about 3 to about 20 degrees 2θ, about 3 to about 30 degrees 2θ, about 3 to about 40 degrees 2θ, about 3 to about 50 degrees 2θ, about 3 to about 60 degrees 2θ, or about 3 to about 70 degrees 2θ.

IV.B. Silanol Content

The organosilica materials obtainable by the method of the present disclosure can have a silanol content that varies within wide limits, depending on the composition of the synthesis solution. The silanol content can conveniently be determined by solid state silicon NMR.

IV.C. Pore Size

The organosilica materials produced by the methods described herein may advantageously be in a mesoporous form. As indicated previously, the term mesoporous refers to solid materials having pores with a diameter within the range of from about 2 nm to about 50 nm. The average pore diameter of the organosilica material can be determined, for example, using nitrogen adsorption-desorption isotherm techniques within the expertise of one of skill in the art, such as the BET (Brunauer Emmet Teller) method.

The organosilica material can have an average pore diameter of ≥about 0.2 nm, ≥about 0.4 nm, ≥about 0.5 nm, ≥about 0.6 nm, ≥about 0.8 nm, ≥about 1.0 nm, ≥about 1.5 nm, ≥about 1.8 nm or less than about 2.0 nm. In an embodiment, the organosilica material can have an average pore diameter of ≥about 1.0 nm.

Additionally or alternatively, the organosilica material can advantageously have an average pore diameter within the mesopore range of ≥about 2.0 nm, ≥about 2.5 nm, ≥about 3.0 nm, ≥about 3.5 nm, ≥about 4.0 nm, ≥about 4.5 nm, ≥about 5.0 nm, ≥about 6.0 nm, ≥about 7.0 nm, ≥about 8 nm, ≥about 9 nm, ≥about 10 nm, ≥about 15 nm, ≥about 20 nm, ≥about 25 nm, ≥about 30 nm, ≥about 40 nm, ≥about 45 nm, or about 50 nm.

Additionally or alternatively, the organosilica material can have an average pore diameter of about 0.2 nm to about 50 nm, about 0.2 nm to about 40 nm, about 0.2 nm to about 30 nm, about 0.2 nm to about 25 nm, about 0.2 nm to about 20 nm, about 0.2 nm to about 15 nm, about 0.2 nm to about 10 nm, about 0.2 nm to about 7.0 nm, about 0.2 nm to about 5.0 nm, about 0.2 nm to about 3.0 nm, about 0.2 nm to about 1.0 nm, about 1.0 nm to about 50 nm, about 1.0 nm to about 40 nm, about 1.0 nm to about 30 nm, about 1.0 nm to about 25 nm, about 1.0 nm to about 20 nm, about 1.0 nm to about 17 nm, about 1.0 nm to about 15 nm, about 1.0 nm to about 10 nm, about 1.0 nm to about 7.0 nm, about 1.0 nm to about 6.0 nm, or about 1.0 nm to about 5.0 nm, about 1.0 nm to about 3.0 nm or about 1.0 nm to about 2.5 nm.

In particular, the organosilica material can advantageously have an average pore diameter in the mesopore range of about 2.0 nm to about 50 nm, about 2.0 nm to about 40 nm, about 2.0 nm to about 30 nm, about 2.0 nm to about 25 nm, about 2.0 nm to about 20 nm, about 2.0 nm to about 15 nm, about 2.0 nm to about 10 nm, about 2.0 nm to about 7.0 nm, about 2.0 nm to to about 5.0 nm, about 2.0 nm to about 4.0 nm, about 2.0 nm to about 3.0 nm, about 2.5 nm to about 50 nm, about 2.5 nm to about 40 nm, about 2.5 nm to about 30 nm, about 2.5 nm to about 25 nm, about 2.5 nm to about 20 nm, about 2.5 nm to about 15 nm, about 2.5 nm to about 10 nm, about 2.5 nm to about 7.0 nm, about 2.5 nm to about 5.0 nm, about 2.5 nm to about 4.0 nm, about 2.5 nm to about 3.0 nm, about 3.0 nm to about 50 nm, about 3.0 nm to about 40 nm, about 3.0 nm to about 30 nm, about 3.0 nm to about 25 nm, about 3.0 nm to about 20 nm, about 3.0 nm to about 18 nm, about 3.0 nm to about 15 nm, about 3.0 nm to about 10 nm, about 3.0 nm to about 7.0 nm, about 3.0 nm to about 5.0 nm, or about 3.0 nm to about 4.0 nm.

In some embodiments, the organosilica material produced by the methods described herein can have an average pore diameter of about 1.0 nm to about 30.0 nm, particularly about 1.0 nm to about 25.0 nm, particularly about 1.5 nm to about 25.0 nm, particularly about 2.0 nm to about 25.0 nm, particularly about 2.0 nm to about 20.0 nm, particularly about 2.0 nm to about 15.0 nm, or particularly about 2.0 nm to about 10.0 nm.

In some embodiments, the organosilica material produced herein may have a bimodal distribution of average pore diameter. That is the organosilica material may have two peaks instead of one peak along a measured average pore diameter. For example, when a ratio of a Formula (Ia) compound to a Formula (Ib) compound is between about 1:1 to about 5:1 (e.g., about 2:1 to about 5:1, about 2:1 to about 4:1, about 3:1 to about 5:1, about 3:1 to about 4:1), the organosilica material produced herein may have a bimodal distribution of average pore diameter, such as but not limited to an average pore diameter of about 2.5 to about 5.0 nm and about 12 nm to about 18 nm.

Using surfactant as a template to synthesize mesoporous materials can create highly ordered structure, e.g. well-defined cylindrical-like pore channels. In some circumstances, there may be no hysteresis loop observed from N2 adsorption isotherm. In other circumstances, when a method provided herein where no structure directing agent is used, the mesoporous materials can have less ordered pore structures, and a hysteresis loop may be observed from $N_2$ adsorption isotherm experiments. In such circumstances, without being bound by theory, the hysteresis can result from the lack of regularity in the pore shapes/sizes and/or from bottleneck constrictions in such irregular pores.

IV.D. Surface Area

The surface area of the organosilica material can be determined, for example, using nitrogen adsorption-desorption isotherm techniques within the expertise of one of skill in the art, such as the BET (Brunauer Emmet Teller) method. This method may determine a total surface area, an external surface area, and a microporous surface area. As used herein, and unless otherwise specified, "total surface area" refers to the total surface area as determined by the BET method. As used herein, and unless otherwise specified, "microporous surface area" refers to microporous surface are as determined by the BET method.

In various embodiments, the organosilica material can have a total surface area ≥about 50 $m^2/g$, ≥about 75 $m^2/g$, ≥about 100 $m^2/g$, ≥about 200 $m^2/g$, ≥about 300 $m^2/g$, ≥about 400 $m^2/g$, ≥about 500 $m^2/g$, ≥about 600 $m^2/g$, ≥about 700 $m^2/g$, ≥about 800 $m^2/g$, ≥≥about 900 $m^2/g$, ≥about 1,000 $m^2/g$, ≥about 1,100 $m^2/g$, ≥about 1,200 $m^2/g$, ≥about 1,300 $m^2/g$, ≥about 1,400 $m^2/g$, ≥about 1,500 $m^2/g$, ≥about 1,600 $m^2/g$, ≥about 1,700 $m^2/g$, ≥about 1,800 $m^2/g$, ≥about 1,900 $m^2/g$, ≥about 2,000 $m^2/g$, ≥about 2,100 $m^2/g$, ≥about 2,200 $m^2/g$, ≥about 2,300 $m^2/g$ or about 2,500 $m^2/g$.

Additionally or alternatively, the organosilica material may have a total surface area of about 50 $m^2/g$ to about 2,500 $m^2/g$, about 50 $m^2/g$ to about 2,000 $m^2/g$, about 50 $m^2/g$ to about 1,500 $m^2/g$, about 50 $m^2/g$ to about 1,200 $m^2/g$, about 50 $m^2/g$ to about 1,000 $m^2/g$, about 75 $m^2/g$ to about 2,500 $m^2/g$, about 75 $m^2/g$ to about 2,000 $m^2/g$, about 75 $m^2/g$ to about 1,500 $m^2/g$, about 75 $m^2/g$ to about 1,200 $m^2/g$, about 75 $m^2/g$ to about 1,000 $m^2/g$, about 100 $m^2/g$ to about 2,500 $m^2/g$, about 100 $m^2/g$ to about 2,200 $m^2/g$, about 100 $m^2/g$ to about 2,000 $m^2/g$, about 100 $m^2/g$ to about 1,500 $m^2/g$, about 100 $m^2/g$ to about 1,200 $m^2/g$, about 100 $m^2/g$ to about 1,000 $m^2/g$, about 100 $m^2/g$ to about 700 $m^2/g$, about 100 $m^2/g$ to about 500 $m^2/g$, about 100 $m^2/g$ to about 400 m²/g, about 100 m²/g to about 300 m²/g, about 200 m²/g to about 2,500 m²/g, about 200 m²/g to about 2,200 m²/g, about 200 m²/g to about 2,000 m²/g, about 200 m²/g to about 1,700 m²/g, about 200 m²/g to about 1,500 m²/g, about 200 m²/g to about 1,200 m²/g, about 200 m²/g to about 1,000 m²/g, about 200 m²/g to about 700 m²/g, about 200 m²/g to about 500 m²/g, about 200 m²/g to about 400 m²/g, about 500 m²/g to about 2,500 m²/g, about 500 m²/g to about 2,200 m²/g, about 500 m²/g to about 2,000 m²/g, about 500 m²/g to about 1,700 m²/g, about 500 m²/g to about 1,500 m²/g, about 500 m²/g to about 1,200 m²/g, about 500 m²/g to about 1,000 m²/g, or about 500 m²/g to about 700 m²/g.

In some embodiments, the organosilica material described herein may have a total surface area of about 50 m²/g to about 2,500 m²g, particularly about 75 m²/g to about 2,500 m²g, particularly about 75 m²/g to about 2,000 m²/g, particularly about 75 m²/g to about 1,500 m²/g, or particularly about 100 m²/g to about 1,500 m²/g.

IV.E. Pore Volume

The pore volume of the organosilica material made by the methods described herein can be determined, for example, using nitrogen adsorption-desorption isotherm techniques within to the expertise of one of skill in the art, such as the BET (Brunauer Emmet Teller) method.

In various embodiments, the organosilica material can have a pore volume ≥about 0.1 cm³/g, ≥about 0.2 cm³/g, ≥about 0.3 cm³/g, ≥about 0.4 cm³/g, ≥about 0.5 cm³/g, ≥about 0.6 cm³/g, ≥about 0.7 cm³/g, ≥about 0.8 cm³/g, ≥about 0.9 cm³/g, ≥about 1.0 cm³/g, ≥about 1.1 cm³/g, ≥about 1.2 cm³/g, ≥about 1.3 cm³/g, ≥about 1.4 cm³/g, ≥about 1.5 cm³/g, ≥about 1.6 cm³/g, ≥about 1.7 cm³/g, ≥about 1.8 cm³/g, ≥about 1.9 cm³/g, ≥about 2.0 cm³/g, ≥about 2.5 cm³/g, ≥about 3.0 cm³/g, ≥about 3.5 cm³/g, ≥about 4.0 cm³/g, ≥about 5.0 cm³/g, ≥about 6.0 cm³/g, ≥about 7.0 cm³/g, or about 10.0 cm³/g.

Additionally or alternatively, the organosilica material can have a pore volume of about 0.1 cm³/g to about 10.0 cm³/g, about 0.1 cm³/g to about 7.0 cm³/g, about 0.1 cm³/g to about 6.0 cm³/g, about 0.1 cm³/g to about 5.0 cm³/g, about 0.1 cm³/g to about 4.0 cm³/g, about 0.1 cm³/g to about 3.0 cm³/g, about 0.1 cm³/g to about 2.0 cm³/g, about 0.1 cm³/g to about 1.5 cm³/g, about 0.1 cm³/g to about 1.2 cm³/g, about 0.1 cm³/g to about 1.0 cm³/g, about 0.1 cm³/g to about 0.5 cm³/g, about 0.1 cm³/g to about 0.3 cm³/g, about 0.2 cm³/g to about 10.0 cm³/g, about 0.2 cm³/g to about 7.0 cm³/g, about 0.2 cm³/g to about 6.0 cm³/g, about 0.2 cm³/g to about 5.0 cm³/g, about 0.2 cm³/g to about 4.0 cm³/g, about 0.2 cm³/g to about 3.0 cm³/g, about 0.2 cm³/g to about 2.0 cm³/g, about 0.2 cm³/g to about 1.5 cm³/g, about 0.2 cm³/g to about 1.2, about 0.2 cm³/g to about 1.0 cm³/g, about 0.5 cm³/g to about 10.0 cm³/g, about 0.5 cm³/g to about 7.0 cm³/g, about 0.5 cm³/g to about 6.0 cm³/g, about 0.5 cm³/g to about 5.0 cm³/g, about 0.5 cm³/g to about 4.0 cm³/g, about 0.5 cm³/g to about 3.0 cm³/g, about 0.5 cm³/g to about 2.0 cm³/g, about 0.5 cm³/g to about 1.5 cm³/g, about 0.5 cm³/g to about 1.2 cm³/g or about 0.5 cm³/g to about 1.0 cm³/g.

V. Uses of the Organosilica Materials

The organosilica materials obtainable by the method of the present present disclosure find uses in several areas.

In certain embodiments, the organosilica material described herein can be used as adsorbents or support matrices for separation and/or catalysis processes.

V.A. Gas Separation Processes

In some cases, the organosilica materials can be used in a gas separation process as provided herein. The gas separation process can comprise contacting a gas mixture containing at least one contaminant with the organosilica material described herein as prepared according to the methods described herein.

In various embodiments, the gas separation process can be achieved by swing adsorption processes, such as pressure swing adsorption (PSA) and temperature swing adsorption (TSA). All swing adsorption processes typically have an adsorption step in which a feed mixture (typically in the gas phase) is flowed over an adsorbent to preferentially adsorb a more readily adsorbed component relative to a less readily adsorbed component. A component may be more readily adsorbed because of kinetic or equilibrium properties of the adsorbent. The adsorbent can typically be contained in a contactor that is part of the swing adsorption unit. The contactor can typically contain an engineered structured adsorbent bed or a particulate adsorbent bed. The bed can contain the adsorbent and other materials such as other adsorbents, mesopore filling materials, and/or inert materials used to mitigated temperature excursions from the heat of adsorption and desorption. Other components in the swing adsorption unit can include, but are not necessarily limited to, valves, piping, tanks, and other contactors. Swing adsorption processes are described in detail in U.S. Pat. Nos. 8,784,533; 8,784,534; 8,858,683; and 8,784,535, each of which are incorporated herein by reference. Examples of processes that can be used herein either separately or in combination are PSA, TSA, pressure temperature swing adsorption (PTSA), partial purge displacement swing adsorption (PPSA), PPTSA, rapid cycle PSA (RCPSA), RCTSA, RCPPSA and RCPTSA.

Swing adsorption processes can be applied to remove a variety of target gases, also referred to as "contaminant gas" from a wide variety of gas mixtures. Typically, in binary separation systems, the "light component" as utilized herein is taken to be the species or molecular component(s) not preferentially taken up by the adsorbent in the adsorption step of the process. Conversely in such binary systems, the "heavy component" as utilized herein is typically taken to be the species or molecular component(s) preferentially taken up by the adsorbent in the adsorption step of the process. However, in binary separation systems where the component(s) that is(are) preferentially adsorbed has(have) a lower molecular weight than the component(s) that is(are) not preferentially adsorbed, those descriptions may not necessarily correlate as disclosed above.

An example of gas mixture that can be separated in the methods described herein is a gas mixture comprising $CH_4$, such as a natural gas stream. A gas mixture comprising $CH_4$ can contain significant levels of contaminants such as $H_2O$, $H_2S$, $CO_2$, $N_2$, mercaptans, and/or heavy hydrocarbons. Additionally or alternatively, the gas mixture can comprise $NO_x$ and/or $SO_x$ species as contaminants, such as a waste gas stream, a flue gas stream and a wet gas stream. As used herein, the terms "$NO_x$," and "$NO_x$" species refers to the various oxides of nitrogen that may be present in waste gas, such as waste gas from combustion processes. The terms refer to all of the various oxides of nitrogen including, but not limited to, nitric oxide (NO), nitrogen dioxide ($NO_2$), nitrogen peroxide ($N_2O$), nitrogen pentoxide ($N_2O_5$), and mixtures thereof. As used herein, the terms "$SO_x$," and "$SO_x$ species," refers to the various oxides of sulfur that may be present in waste gas, such as waste gas from combustion processes. The terms refer to all of the various oxides of sulfur including, but not limited to, SO, $SO_2$, $SO_3$, $SO_4$, $S_7O_2$ and $S_6O_2$. Thus, examples of contaminants include, but are not limited to $H_2O$, $H_2S$, $CO_2$, $N_2$, mercaptans, heavy hydrocarbons, $NO_x$ and/or $SO_x$ species.

V.B. Catalyst Supports

The organosilica materials made according to the methods described herein can be used as support materials in various catalysts. In particular, the catalyst can comprise the organosilica materials as a support material where the organosilica material has at least one catalyst metal incorporated on the pore surface. The at least one catalyst metal may be a Group 8 metal, a Group 9 metal, a Group 10 metal, e.g., Pt, Pd, Ir, Rh, Ru or a combination thereof. The catalyst can further comprise a binder such as, but not limited to, active and inactive materials, inorganic materials, clays, ceramics, activated carbon, alumina, silica, silica-alumina, titania, zirconia, niobium oxide, tantalum oxide, or a combination thereof, particularly, silica-alumina, alumina, titania, or zirconia. These catalysts can be used for both hydrogenation and aromatic saturation of a feedstream.

In various embodiments, the hydrogenation process can be achieved by contacting a hydrocarbon feedstream comprising aromatics with a hydrogenation catalyst described herein in the presence of a hydrogen-containing treat gas in a first reaction stage operated under effective aromatics hydrogenation conditions to produce a reaction product with reduced aromatics content.

Hydrogen-containing treat gases suitable for use in a hydrogenation process can be comprised of substantially pure hydrogen or can be mixtures of other components typically found in refinery hydrogen streams. It is preferred that the hydrogen-containing treat gas stream contains little, more preferably no, hydrogen sulfide. The hydrogen-containing treat gas purity should be at least about 50% by volume hydrogen, preferably at least about 75% by volume hydrogen, and more preferably at least about 90% by volume hydrogen for best results. It is most preferred that the hydrogen-containing stream be substantially pure hydrogen Feedstreams suitable for hydrogenation by the hydrogenation catalyst described herein include any conventional hydrocarbon feedstreams where hydrogenation or aromatic saturation is desirable. Such feedstreams can include hydrocarbon fluids, diesel, kerosene, lubricating oil feedstreams, heavy coker gasoil (HKGO), de-asphalted oil (DAO), FCC main column bottom (MCB), and steam cracker tar. Such feedstreams can also include other distillate feedstreams, including wax-containing feedstreams such as feeds derived from crude oils, shale oils and tar sands. Synthetic feeds such as those derived from the Fischer-Tropsch process can also be aromatically saturated using the hydrogenation catalyst described herein. Typical wax-containing feedstocks for the preparation of lubricating base oils have initial boiling points of about 315 C or higher, and include feeds such as reduced crudes, hydrocrackates, raffinates, hydrotreated oils, atmospheric gas oils, vacuum gas oils, coker gas oils, atmospheric and vacuum residues, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more. Preferred lubricating oil boiling range feedstreams include feedstreams which boil in the range of 570-760° F. Diesel boiling range feedstreams include feedstreams which boil in the range of 480-660° F. Kerosene boiling range feedstreams include feedstreams which boil in the range of 350-617° F.

Hydrocarbon feedstreams suitable for use herein also contain aromatics and nitrogen- and sulfur-contaminants. Feedstreams containing up to 0.2 wt. % of nitrogen, based on the feedstream, up to 3.0 wt. % of sulfur, and up to 50 wt. % aromatics can be used in the present process In various embodiments, the sulfur content of the feedstreams can be below about 500 wppm, or below about 300 wppm, or below about 200 wppm, or below about 100 wppm, or below about 20 wppm. The pressure used during an aromatic hydrogenation process can be modified based on the expected sulfur content in a feedstream. Feeds having a high wax content typically have high viscosity indexes of up to 200 or more. Sulfur and nitrogen contents may be measured by standard ASTM methods D5453 and D4629, respectively.

Effective hydrogenation conditions may be considered to be those conditions under which at least a portion of the aromatics present in the hydrocarbon feedstream are saturated, preferably at least about 50 wt. % of the aromatics are saturated, more preferably greater than about 75 wt. %. Effective hydrogenation conditions can include temperatures of from 150° C. to 400° C., a hydrogen partial pressure of from 740 to 20786 kPa (100 to 3000 psig), a space velocity of from 0.1 to 10 liquid hourly space velocity (LHSV), and a hydrogen to feed ratio of from 89 to 1780 $m^3/m^3$ (500 to 10000 scf/B).

Additionally or alternatively, effective hydrogenation conditions may be conditions effective at removing at least a portion of the nitrogen and organically bound sulfur contaminants and hydrogenating at least a portion of said aromatics, thus producing at least a liquid lube boiling range product having a lower concentration of aromatics and nitrogen and organically bound sulfur contaminants than the lube boiling range feedstream.

Additionally or alternatively, effective hydrogenation conditions may be conditions effective at removing at least a portion of the nitrogen and organically bound sulfur contaminants and hydrogenating at least a portion of said aromatics, thus producing at least a liquid diesel boiling range product having a lower concentration of aromatics and nitrogen and organically bound sulfur contaminants than the diesel boiling range feedstream.

As stated above, in some instances, the hydrocarbon feedstream (e.g., lube oil boiling range) may be hydrotreated to reduce the sulfur contaminants to below about 500 wppm, particularly below about 300 wppm, particularly below about 200 wppm or particularly below about 100 wppm. In such an embodiment, the process may comprise at least two reaction stages, the first reaction state containing a hydrotreating catalyst operated under effective hydrotreating conditions, and the second containing a hydrogenation catalyst has described herein operated under effective hydrogenation conditions as described above. Therefore, in such an embodiment, the hydrocarbon feedstream can be first contacted with a hydrotreating catalyst in the presence of a hydrogen-containing treat gas in a first reaction stage operated under effective hydrotreating conditions in order to reduce the sulfur content of the feedstream to within the above-described range. Thus, the term "hydrotreating" as used herein refers to processes wherein a hydrogen-containing treat gas is used in the presence of a suitable catalyst that is active for the removal of heteroatoms, such as sulfur, and nitrogen. Suitable hydrotreating catalysts for use in the embodiments of the present disclosure are any conventional hydrotreating catalyst and includes those which are comprised of at least one Group 8 metal, preferably Fe, Co and Ni, more preferably Co and/or Ni, and most preferably Ni; and at least one Group 6 metal, preferably Mo and W, more preferably Mo, on a high surface area support material, preferably alumina. Additionally or alternatively, more than one type of hydrotreating catalyst can be used in the same reaction vessel. The Group 8 metal may typically be present in an amount ranging from about 2 to 20 wt. %, preferably from about 4 to 12 wt. %. The Group 6 metal can typically be present in an amount ranging from about 5 to 50 wt. %, preferably from about 10 to 40 wt. %, and more preferably from about 20 to 30 wt. %. All metals weight percents are "on support" as described above.

Effective hydrotreating conditions may be considered to be those conditions that can effectively reduce the sulfur content of the feedstream (e.g., lube oil boiling range) to within the above-described ranges. Typical effective hydrotreating conditions can include temperatures ranging from about 150° C. to about 425° C., preferably about 200° C. to about 370° C., more preferably about 230° C. to about 350° C. Typical weight hourly space velocities ("WHSV") may range from about 0.1 to about 20 $hr^{-1}$, preferably from about 0.5 to about 5 $hr^{-1}$. Any effective pressure can be utilized, and pressures can typically range from about 4 to about 70 atmospheres (405 to 7093 kPa), preferably 10 to 40 atmospheres (1013 to 4053 kPa). In an embodiment, said effective hydrotreating conditions may be conditions effective at removing at least a portion of said organically bound sulfur contaminants and hydrogenating at least a portion of said aromatics, thus producing at least a reaction product (e.g., liquid lube oil boiling range product) having a lower concentration of aromatics and organically bound sulfur contaminants than the lube oil boiling range feedstream.

The contacting of the hydrocarbon feedstream with the hydrotreating catalyst may produce a reaction product comprising at least a vapor product and a liquid product. The vapor product may typically comprise gaseous reaction products, such as $H_2S$, and the liquid reaction product may typically comprise a liquid hydrocarbon having a reduced level of nitrogen and sulfur contaminants. The total reaction product can be passed directly into the second reaction stage, but it may be preferred that the gaseous and liquid reaction products be separated, and the liquid reaction product conducted to the second reaction stage. Thus, in one embodiment, the vapor product and the liquid product may be separated, and the liquid product may be conducted to the second reaction stage. The method of separating the vapor product from the liquid product can be accomplished by any means known to be effective at separating gaseous and liquid reaction products. For example, a stripping tower or reaction zone can be used to separate the vapor product from the liquid product (e.g., liquid lube oil boiling range product). The liquid product thus conducted to the second reaction stage can have a sulfur concentration within the range of about 500 wppm, particularly below about 300 wppm, or particularly below about 200 wppm or particularly below about 100 wppm.

In still other embodiments, the hydrogenation catalysts described herein can be used in integrated hydroprocessing methods. In addition to the hydrofinishing and/or aromatic hydrogenation/saturation processes involving the hydrogenation catalyst described herein, an integrated hydroprocessing method can also include various combinations of hydrotreating, hydrocracking, catalytic dewaxing (such as hydrodewaxing), and/or solvent dewaxing. The scheme of hydrotreating followed by hydrofinishing described above represents one type of integrated process flow. Another integrated processing example is to have a dewaxing step, either catalytic dewaxing or solvent dewaxing, followed by hydroprocessing with the hydrogenation catalysts described herein. Still another example is a process scheme involving hydrotreating, dewaxing (catalytic or solvent), and then hydroprocessing with the hydrogenation catalysts described herein. Yet another example is hydroprocessing with the hydrogenation catalysts described herein followed by dewaxing (catalytic or solvent). Alternatively, multiple hydrofinishing and/or aromatic hydrogenation steps can be employed with hydrotreatment, hydrocracking, or dewaxing steps. An example of such a process flow is hydrofinishing, dewaxing (catalytic or solvent), and then hydrofinishing again, where at least one of the hydrofinishing steps may use a hydrogenation catalysts described herein. For processes involving catalytic dewaxing, effective catalytic dewaxing conditions can include temperatures of from 150° C. to 400° C., preferably 250° C. to 350° C., pressures of from 791 to 20786 kPa (100 to 3000 psig), preferably 1480 to 17338 kPa (200 to 2500 psig), liquid hourly space velocities of from 0.1 to 10 $hr^{-1}$, preferably 0.1 to 5 $hr^{-1}$ and hydrogen treat gas rates from 45 to 1780 $m^3/m^3$ (250 to 10000 scf/B), preferably 89 to 890 $m^3/m^3$ (500 to 5000 scf/B). Any suitable dewaxing catalyst may be used.

In embodiments where the product of an aromatic saturation process will be a lubricant base oil, the input feed should also have suitable lubricant base oil properties. For example, an input feed intended for use as a Group I or Group II base oil can have a viscosity index (VI) of at least about 80, preferably at least about 90 or at least about 95. An input feed intended for use as a Group I+ base oil can have a VI of at least about 100, while an input feed intended for use as a Group II+ base oil can have a VI of at least 110. The viscosity of the input feed can be at least 2 cSt at 100° C., or at least 4 cSt at 100° C., or at least 6 cSt at 100° C.

Additionally or alternatively, these catalysts can be used for olefin polymerization, hydrocarbon cracking, isomerization and/or alkylation.

V.C. Color Removal

In some cases, the organosilica materials can be used in a method for reducing impurities in a liquid hydrocarbon product. The method can comprise contacting a liquid hydrocarbon product with the organosilica material described herein and as prepared according to the methods described herein.

In various aspects, the impurities can be polar compounds and/or aromatic compounds. The polar compounds and/or aromatic compounds may cause discoloration of the liquid hydrocarbon. As used herein, "polar compound" refers to a compound that has portions of negative and/or positive charges forming negative and/or positive poles. While a polar compound does not carry a net electric charge, the electrons are unequally shared between the nuclei. Water is considered a polar compound in the present disclosure. Examples of polar compounds, include but are not limited to nitrogen-containing compounds (e.g., $N_2$, $NH_3$, $NO_2$, pyrrole, pyridine, quinoline, indazole, etc.) and sulfur-containing compounds (e.g., $SO_2$, $H_2S$, thiophene, benzothiophene, dibenzothiophene, etc.). Additionally or alternatively, the aromatic compound can be a single ring aromatic, a double ring aromatic and/or a multi-ring aromatic (e.g., 3 or more rings). Examples of single ring aromatic compounds include, but are not limited to, benzene, toulene, furan, pyrrole, thiophene, pyridine, pyrazine, pyrimidine, and triazine. Examples of double ring aromatic compounds include, but are not limited to, benzothiophene, purine, benzimidazole, indazole, naphthalene, quinoline, and quinoxaline. Examples of multi-ring aromatic compounds include, but are not limited to, anthracene, acridine, phenanthrene, tetracene, chrysene, triphenylene, pyrene, pentacene, coronene, and corannulene. In particular, multi-ring aromatics are removed from the liquid hydrocarbon.

Additionally or alternatively, the organosilica material can have a selectivity for multi-ring aromatics compared to single ring aromatics of at least about 1.1, at least about 1.2. at least about 1.4, at least about 1.5, at least about 1.6, at least about 1.8, at least about 2.0, at least about 2.5, at least about 3.0, or at least about 4.0. Additionally or alternatively, the organosilica material can have a selectivity for multi-ring aromatics compared to single ring aromatics of at least about 1.1 to about 4.0, at least about 1.1 to about 3.0, at least about 1.2 to about 2.5, at least about 1.1 to at least about 2.0, or at least about 1.1 to at least about 1.8.

Additionally or alternatively, the liquid hydrocarbon may comprise diesel fuel, jet fuel and/or gasoline. In particular, the liquid hydrocarbon may comprise diesel fuel. With regard to diesel fuel, color is one of the specifications for the final products. Color level of the liquid hydrocarbon product (e.g., diesel fuel) may be measured according to D6045 ASTM.

Thus, in various aspects, the liquid hydrocarbon product (e.g., diesel fuel) following contact with the organosilica material as described herein may have a color level as measured according to D6045 ASTM of ≤about 4.0, ≤about 3.50, ≤about 3.0, ≤about 2.50, ≤about 2.0, ≤about 1.50, ≤about 1.0, or ≤about 0.1 or about 0.0. In particular, the liquid hydrocarbon product (e.g., diesel fuel) following contact with the organosilica material as described herein may have a color level as measured according to D6045 ASTM of ≤about 3.0 or ≤about 2.50.

Additionally or alternatively, the liquid hydrocarbon product (e.g., diesel fuel) following contact with the organosilica material as described herein may have a color level as measured according to D6045 ASTM of about 0.0 to about 4.0, about 0.0 to about 3.0, about 0.0 to about 2.0, about 0.0 to about 1.0, about 0.1 to about 4.0, about 0.1 to about 3.0, about 0.1 to about 2.0, about 0.0 to about 1.0, about 0.5 to about 4.0, about 0.5 to about 3.50, about 0.5 to about 3.0, about 0.5 to about 2.50, about 0.5 to about 2.0, about 0.5 to about 1.50, about 0.5 to about 1.0, about 1.0 to about 4.0, about 1.0 to about 3.50, about 1.0 to about 3.0, about 1.0 to about 2.50, about 1.0 to about 2.0, about 1.0 to about 1.50, about 1.50 to about 4.0, about 1.50 to about 3.50, about 1.50 to about 3.0, about 1.50 to about 2.50, about 1.50 to about 2.0, about 2.0 to about 4.0, about 2.0 to about 3.50, about 2.0 to about 3.0, or about 2.0 to about 2.50.

In some cases, discoloration in the liquid hydrocarbon product (e.g., diesel fuel) may be due to aromatic compounds (e.g., multi-ring aromatic) and/or polar compounds present in the liquid hydrocarbon product at various sulfur levels. Thus, the liquid hydrocarbon product (e.g., diesel fuel) prior to contact with the organosilica material described herein may comprise ≤about 50 ppm sulfur, ≤about 45 ppm sulfur, ≤about 40 ppm sulfur, ≤about 35 ppm sulfur, ≤about 30 ppm sulfur, ≤about 25 ppm sulfur, ≤about 20 ppm sulfur, ≤about 8 ppm sulfur, ≤about 15 ppm sulfur, ≤about 10 ppm sulfur, ≤about 8 ppm sulfur, ≤about 5 ppm sulfur, ≤about 3 ppm sulfur, ≤about 2 ppm sulfur, ≤about 1 ppm sulfur, or ≤about 0.1 ppm sulfur. Particularly, the liquid hydrocarbon product (e.g., diesel fuel) prior to contact with the organosilica material described herein may comprise ≤about 20 ppm sulfur or ≤about 10 ppm sulfur.

Additionally or alternatively, the liquid hydrocarbon product (e.g., diesel fuel) prior to contact with the organosilica material described herein may comprise about 0.1 ppm to about 50 ppm sulfur, about 0.1 ppm to about 40 ppm sulfur, about 0.1 ppm to about 30 ppm sulfur, about 0.1 ppm to about 25 ppm sulfur, about 0.1 ppm to about 20 ppm sulfur, about 0.1 ppm to about 16 ppm sulfur, about 0.1 ppm to about 12 ppm sulfur, about 0.1 ppm to about 10 ppm sulfur, about 0.1 ppm to about 5 ppm sulfur, about 0.1 ppm to about 3 ppm sulfur, about 0.1 ppm to about 1 ppm sulfur, about 1 ppm to about 50 ppm sulfur, about 1 ppm to about 40 ppm sulfur, about 1 ppm to about 30 ppm sulfur, about 1 ppm to about 25 ppm sulfur, about 1 ppm to about 20 ppm sulfur, about 1 ppm to about 16 ppm sulfur, about 1 ppm to about 12 ppm sulfur, about 1 ppm to about 10 ppm sulfur, about 1 ppm to about 5 ppm sulfur, about 1 ppm to about 3 ppm sulfur, about 5 ppm to about 50 ppm sulfur, about 5 ppm to about 40 ppm sulfur, about 5 ppm to about 30 ppm sulfur, about 5 ppm to about 25 ppm sulfur, about 5 ppm to about 20 ppm sulfur, about 5 ppm to about 16 ppm sulfur, about 5 ppm to about 12 ppm sulfur, about 5 ppm to about 10 ppm sulfur or about 5 ppm to about 7 ppm sulfur.

Additionally or alternatively, single ring aromatics, double ring aromatics or multi-ring aromatics, separately or together, may be removed from a liquid hydrocarbon product (e.g., diesel fuel) in an amount of less than about 1 wt. %, less than about 2 wt. %, less than about 4 wt. %, less than about 5 wt. %, less than about 6 wt. %, less than about 8 wt. %, or less than about 10 wt. %. In particular, multi-ring aromatics may be removed from a liquid hydrocarbon product (e.g., diesel fuel) in amount of less than about 1 wt. %.

Additionally or alternatively, single ring aromatics, double ring aromatics or multi-ring aromatics, separately or together, may be removed from a liquid hydrocarbon product (e.g., diesel fuel) in amount of about 1 wt. % to about 10 wt. %, about 1 wt. % to about 7.5 wt. %, about 1 wt. % to about 5 wt. %, about 1 wt. % to about 2.5 wt. %, about 2 wt. % to about 10 wt. %, about 2 wt. % to about 7.5 wt. %, about 2 wt. % to about 5 wt. %, about 3 wt. % to about 10 wt. %, about 3 wt. % to about 7.5 wt. %, about 3 wt. % to about 5 wt. %, about 4 wt. % to about 10 wt. %, about 4 wt. % to about 7.5 wt. %, about 4 wt. % to about 5 wt. %, about 5 wt. % to about 10 wt. %, about 5 wt. % to about 7.5 wt. %, about 6 wt. % to about 10 wt. %, about 6 wt. % to about 87.5 wt. %, or about 7.5 wt. % to about 10 wt. %.

In various aspects, a liquid hydrocarbon product (e.g., diesel fuel) may be contacted with the organosilica material described herein at a temperature of ≥about 10° C., ≥about 12° C., ≥about 14° C., ≥about 16° C., ≥about 18° C., ≥about 20° C., ≥about 22° C., ≥about 24° C., ≥about 26° C., ≥about 28° C., ≥about 30° C., ≥about 32° C., ≥about 34° C., ≥about 36° C., ≥about 38° C., ≥about 40° C., ≥about 45° C., ≥about 50° C., ≥about 55° C., ≥about 60° C., ≥about 65° C., ≥about 70° C., ≥about 75° C., or ≥about 80° C. In particular, a liquid hydrocarbon product (e.g., diesel fuel) may be contacted with the organosilica material described herein at a temperature about 10° C. to about 80° C., particularly about 12° C. to about 40° C., particularly about 14° C. to about 36° C., particularly about 18° C. to about 28° C. or particularly about 20° C. to about 28° C.

Additionally or alternatively, a liquid hydrocarbon product (e.g., diesel fuel) may be contacted with the organosilica material described herein at a temperature described above and at a pressure ≥about 2 psi, ≥about 4 psi, ≥about 5 psi, ≥about 6 psi, ≥about 8 psi, ≥about 10 psi, ≥about 12 psi, ≥about 14 psi, ≥about 16 psi, ≥about 18 psi, ≥about 20 psi, ≥about 25 psi, or ≥about 30 psi. In particular, a liquid hydrocarbon product (e.g., diesel fuel) may be contacted with the organosilica material described herein at a temperature described above and at a pressure of about 2 psi to about 30 psi, particularly about 4 psi to about 25 psi, particularly about 5 psi to about 16 psi or particularly about 6 psi to about 14 psi.

In various aspects, the organosilica material may be packed into a column and the liquid hydrocarbon product (e.g., diesel fuel) may be contacted therein. Additionally or alternatively, the liquid hydrocarbon product (e.g., diesel fuel) may be contacted with organosilica material following hydrotreatment of the liquid hydrocarbon product (e.g., diesel fuel).

In another embodiment, a method for improving color in a diesel fuel product is provided herein. The method comprises contacting the diesel fuel product with the organosilica material as described herein resulting in an improved color diesel fuel product. An "improved color diesel fuel product" refers to a diesel fuel product with a lower color level as measured according to D6045 ASTM following contact with the organosilica material as described herein. For example, if a diesel fuel product initially has a color level of 5 as measured according to D6045 ASTM prior to contact with the organosilica material, an improved color diesel fuel to product would have a color level of less than 5 as measured according to D6045 ASTM following contact with the organosilica material. In particular, the organosilica material may comprise units of Formula (I) and optionally units of Formula (II) and/or Formula (III).

In various aspects, the diesel fuel product may be contacted with the organosilica material as described herein at a temperature as described herein (e.g., about 18° C. to about 28° C.) and/or a pressure as described herein (e.g., about 5 psi to about 16 psi). Additionally or alternatively, the diesel fuel product may be contacted with the organosilica material following hydrotreatment of the diesel fuel. The organosilica material may be packed into a column.

The diesel fuel product may have a color level as measured according to D6045 ASTM prior to contact with the organosilica material of ≥about 3.0, ≥about 3.5, ≥about 4.0, ≥about 4.5, ≥about 5.0, ≥about 5.5, ≥about 6.0, ≥about 6.5, ≥about 7.0, ≥about 7.5, ≥about 8.0, ≥about 9.0, or ≥about 10.0. In particular, the diesel fuel product may have a color level as measured according to D6045 ASTM prior to contact with the organosilica material of ≥about 5.0. Additionally or alternatively, the diesel fuel product may have a color level as measured according to D6045 ASTM prior to contact with the organosilica material of about 3.0 to about 10.0, about 3.5 to about 10.0, about 4.0 to about 10 or about 5.0 to about 10.

Additionally or alternatively, the improved color diesel fuel product may have color as measured according to D6045 ASTM following contact with the organosilica material as described as described above, e.g., a color level as measured according to D6045 ASTM of ≤about 3.0, or ≤about 2.50.

VI. Further Embodiments

The present disclosure can additionally or alternately include one or more of the following embodiments.

Embodiment 1. A method for preparing an organosilica material, the method comprising:

(a) providing a starting material mixture comprising at least one compound of Formula [(RO)$_2$SiCH$_2$]$_3$ (Ia) and at least one compound of Formula [R'ROSiCH$_2$]$_3$ (Ib), wherein each R' independently represents an RO— group, an R group, or an (RO)$_3$Si—CH$_2$— group, at least one R' being (RO)$_3$Si—CH$_2$—; and R represents a C$_1$-C$_4$ alkyl group, preferably a methyl or ethyl group, more preferably an ethyl group;

(b) adding the starting material mixture into an acidic or basic aqueous mixture such that the resulting solution contains essentially no structure directing agent (c) curing the solution to produce a pre-product, for example, for up to 144 hours at a temperature of about 50° C. to about 200° C.; and (d) drying the pre-product to obtain an organosilica material which is a polymer comprising independent siloxane units of Formula [R'R$^2$SiCH$_2$]$_3$ (I), wherein each R$^1$ represents a hydroxyl group, a C$_1$-C$_4$ alkoxy group, or an oxygen atom bonded to a silicon atom of another siloxane unit and each R$^2$ represents a hydroxyl group, a C$_1$-C$_4$ alkoxy group, a C$_1$-C$_4$ alkyl group, or an oxygen atom bonded to a silicon atom of another siloxane, wherein the organosilica material has an average pore diameter greater than about 1.0 nm, for example, from 2.0 nm to about 25 nm.

Embodiment 2. The method of embodiment 1, wherein the ratio between Formula (Ia) and Formula (Ib) is about 1:10 to about 20:1, preferably 1:1 to 20:1, more preferably 1:1 to 10:1.

Embodiment 3. The method of embodiment 1 or 2, wherein the at least one compound of Formula (Ia) is 1,1,3,3,5,5-hexaethoxy-1,3,5-trisilacyclohexane and/or the at least one compound of Formula (Ib) is 1,1,3,3,5-pentaethoxy-5-((triethoxysilyl)methyl)-1,3,5-trisilacyclohexane.

Embodiment 4. The method of any one of the previous embodiments, wherein each R$^1$ represents a hydroxyl group, a C$_1$-C$_2$ alkoxy group, or an oxygen atom bonded to a silicon atom of another siloxane unit and each R$^2$ represent a hydroxyl group, a C$_1$-C$_2$ alkyl group, a C$_1$-C$_2$ alkoxy group, or an oxygen atom bonded to a silicon atom of another siloxane unit.

Embodiment 5. The method of any one of the previous embodiments, wherein each R$^1$ represents a hydroxyl group, an ethoxy group, or an oxygen atom bonded to a silicon atom of another siloxane and each R$^2$ represent a hydroxyl group, an ethoxy group, or an oxygen atom bonded to a silicon atom of another siloxane.

Embodiment 6. The method of any one of the previous embodiments, further comprising adding to the acidic or basic aqueous mixture at least one compound selected from the group consisting of:

(i) a further compound of Formula (Ia);
(ii) a further compound of Formula (Ib);
(iii) a cyclic compound of Formula

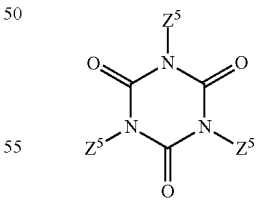

(IIa)

wherein each $Z^5$ is independently a $X^3OX^4X^5SiX^6$ group, wherein each $X^3$ represents a C$_1$-C$_4$ alkyl group; $X^4$ and $X^5$ each independently represent a C$_1$-C$_4$ alkyl group, or a C$_1$-C$_4$ alkoxy group; and each $X^6$ represents a C$_1$-C$_8$ alkylene group bonded to a nitrogen atom of the cyclic compound;

(iv) a compound of Formula $Z^6OZ^7Z^8Z^9Si$ (IIIa), wherein each $Z^6$ represents a C$_1$-C$_6$ alkyl group, and $Z^7$, $Z^8$ and $Z^9$ are each independently selected from the group consisting of a $C_1$-$C_6$ alkyl group, a $C_1$-$C_6$ alkoxy group, a nitrogen-containing $C_1$-$C_{10}$ alkyl group, a nitrogen-containing heteroaralkyl group, and a nitrogen-containing optionally substituted heterocycloalkyl group;

(v) compound of Formula $Z^{10}Z^{11}Z^{12}Si-Z^1-SiZ^{101}Z^{11}Z^{12}$ (IVa), wherein each $Z^{10}$ independently represents a $C_1$-$C_4$ alkoxy group; $Z^{11}$ and $Z^{12}$ each independently represent a $C_1$-$C_4$ alkoxy group, or a $C_1$-$C_4$ alkyl group; and each $Z^1$ is selected from the group consisting a $C_1$-$C_8$ alkylene group, a $C_2$-$C_8$ alkenylene group, a $C_2$-$C_8$ alkynylene group, a nitrogen-containing $C_1$-$C_{10}$ alkylene group, an optionally substituted $C_6$-$C_{20}$ aralkyl group and an optionally substituted $C_4$-$C_{20}$ heterocycloalkyl group;

(vi) a source of a trivalent metal oxide;

(vii) a silica-containing material; and (viii) a combination thereof.

Embodiment 7. The method of embodiment 6, wherein the at least one compound is a compound of Formula (IIa), wherein each $X^3$ represents a $C_1$-$C_2$ alkyl group; $X^4$ and $X^5$ each independently represent a $C_1$-$C_2$ alkyl group, or a $C_1$-$C_2$ alkoxy group; and each $X^6$ represents a $C_1$-$C_4$ alkylene group bonded to a nitrogen atom of the cyclic compound, preferably, wherein the at least one compound of Formula (IIa) is tris(3-trimethoxysilylpropyl)isocyanurate.

Embodiment 8. The method of embodiment 6, wherein the at least one compound is a compound of Formula (IIIa), wherein each $Z^6$ represents a $C_1$-$C_2$ alkyl group and $Z^7$, $Z^8$ and $Z^9$ are each independently a $C_1$-$C_2$ alkyl group, $C_1$-$C_2$ alkoxy group, a nitrogen-containing $C_3$-$C_{10}$ alkyl group, a nitrogen-containing $C_4$-$C_{10}$ heteroaralkyl group, or a nitrogen-containing optionally substituted $C_4$-$C_{10}$ heterocycloalkyl group, preferably wherein the compound of Formula (IIIa) is selected from the group consisting of tetraethyl orthosilicate, methyltriethoxysilane, (N,N-dimethylaminopropyl)trimethoxysilane, N-(2-aminoethyl)-3-aminopropyltriethoxysilane, 4-methyl-1-(3-triethoxysilylpropyl)-piperazine, 4-(2-(triethoxysily)ethyl)pyridine, 1-(3-(triethoxysilyl)propyl)-4,5-dihydro-1H-imidazole, and (3-aminopropyl)triethoxysilane.

Embodiment 9. The method of embodiment 6, wherein the at least one compound is a compound of Formula (IVa), wherein each $Z^{10}$ independently represents a $C_1$-$C_2$ alkoxy group; $Z^{11}$ and $Z^{12}$ each independently represent a $C_1$-$C_2$ alkoxy group, or a $C_1$-$C_2$ alkyl group; and each $Z^1$ is selected from the group consisting of a $C_1$-$C_4$ alkylene group, a $C_2$-$C_4$ alkenylene group, a $C_2$-$C_4$ alkynylene group, and a nitrogen-containing $C_4$-$C_{10}$ alkylene group, preferably wherein the compound of Formula (IVa) is selected from the group consisting of 1,2-bis(methyldiethoxysilyl)ethane, bis(triethoxysilyl)methane, 1,2-bis(triethoxysilyl)ethylene, N,N'-bis[(3-trimethoxysilyl)propyl]ethylenediamine, bis[(methyldiethoxysilyl)propyl]amine, and bis[(methyldimethoxysilyl)propyl]-N-methylamine.

Embodiment 10. The method of embodiment 6, wherein the at least one compound is a source of trivalent metal oxide, wherein the source of trivalent metal oxide is at least one of:

(i) a compound of Formula $M^1(OZ^{13})_3$ (Va), wherein $M^1$ represents a Group 13 metal and each $Z^{13}$ independently represents a $C_1$-$C_6$ alkyl group; or (ii) a compound of Formula $(Z^{14}O)_2M^2$-O-$Si(OZ^{15})_3$ (VIa), wherein $M^2$ represents a Group 13 metal and $Z^{14}$ and $Z^{15}$ each independently represent a $C_1$-$C_6$ alkyl group.

Embodiment 11. The method of embodiment 6 or 10, wherein the source of trivalent metal oxide is a compound of Formula (Va), wherein $M^1$ is Al or B and each $Z^{13}$ independently represents a $C_1$-$C_4$ alkyl group, preferably wherein the source of a trivalent metal oxide is selected from the group consisting of aluminum trimethoxide, aluminum triethoxide, aluminum isopropoxide, and aluminum-tri-sec-butoxide.

Embodiment 12. The method of embodiment 6 or 10, wherein the source of trivalent metal oxide is a compound of Formula (VIa), wherein $M^2$ is Al or B; and $Z^{14}$ and $Z^{15}$ each independently represent a $C_1$-$C_4$ alkyl group.

Embodiment 13. The method of any one of the previous embodiments, wherein the aqueous basic mixture comprises a base and has a pH from about 8 to about 14, preferably wherein the base is ammonium hydroxide or a metal hydroxide.

Embodiment 14. The method of any one of embodiments 1 to 12, wherein the aqueous acidic mixture comprises an acid and has a pH from about 0.01 to about 6.0, preferably wherein the acid is an inorganic acid, preferably wherein the inorganic acid is hydrochloric acid.

Embodiment 15. The method of any one of the previous embodiments, The method of any one of the previous claims, wherein the pre-product is dried at a temperature of about 70° C. to about 200° C.

Embodiment 16. The method of any one of the previous embodiments, wherein the organosilica material has one or more of the following: (i) an average pore diameter of about 2.0 nm to about 25.0 nm; (ii) a total surface area of about 50 $m^2$/g to about 2500 $m^2$/g; and (iii) a pore volume of about 0.1 $cm^3$/g to about 3.0 $cm^3$/g.

Embodiment 17. The method of any one of the previous embodiments, wherein the ratio between Formula (Ia) and Formula (Ib) is about 1:1 to about 5:1 and the organosilica material has a bimodal distribution of average pore diameter.

Embodiment 18. The method of any one of the previous embodiments, wherein the organosilica material is single phase.

Embodiment 19. The method of any one the previous embodiments, wherein the starting material mixture provided in step a) is obtained by a Grignard reaction wherein a compound of formula $(RO)_3Si-CH_2-MgX$ in which X is selected from chloride or bromide is heated in a solvent to provide the starting material mixture comprising the at least one compound of Formula (Ia) and the at least one compound of Formula (Ib).

Embodiment 20. The method of embodiment 19, wherein the starting material mixture obtained by the Grignard reaction is used in step b) without any separation of the at least one compound of Formula (Ib) therefrom.

Embodiment 21. An organosilica material prepared according to any one of the previous embodiments.

Embodiment 22. Use of the organosilica material of embodiment 21 for reducing impurities in a liquid hydrocarbon product; for improving color of a diesel fuel product; for gas separation; or as a catalyst support material for use in an aromatics hydrogenation process, olefin polymerization, hydrocarbon cracking, isomerization or alkylation.

EXAMPLES

The following examples are merely illustrative, and do not limit this disclosure in any way.

General Methods

Small Angle X-Ray Diffraction Analysis

X-ray powder diffraction (XRD) patterns were collected on a PANalytical X'pert diffractometer equipped with an accessory for low angle measurements. XRD analyses were recorded using the Cu Kα (=1.5405980 Å) line in the 2θ range from 0.5 to 10° with a step size of 0.0167° and a counting time of 1.2 s.

Solid-State (SS) NMR Measurements

The $^{29}$Si MAS NMR spectra were recorded on a Varian InfinityPlus™-400 spectrometer (operating at 9.4 T) and a Varian InfinityPlus™-500 spectrometer (operating at 11.74 T), corresponding to $^{29}$Si Larmor frequencies of 79.4 MHz and 99.2 MHz, respectively, with a 7.5 mm MAS probe heads using 5 kHz spinning, 4.0 μs 90° pulses, and at least 60 s recycle delay, with proton decoupling during data acquisition. The $^{29}$Si chemical shifts are referenced with respect to an external tetramethyl silane ($\delta_{Si}$=0.0 ppm). The $^{13}$C CPMAS NMR spectra were recorded on a Varian InfinityPlus™-500 spectrometer corresponding to $^{13}$C Larmor frequency of 125 MHz, with 1.6 mm MAS probe head using 40 kHz spinning, $^1$H-$^{13}$C cross-polarization (CP) contact time of at least 1 ms, a recycle delay of at least 1 s, with proton decoupling during data acquisition. The $^{13}$C chemical shifts are referenced with respect to an external tetramethyl silane ($\delta_C$=0.0 ppm). The $^{27}$Al MAS NMR spectra were recorded on a Varian InfinityPlus™-500 corresponding to $^{27}$Al Larmor frequency of 130.1 MHz using a 4 mm MAS probe head using 12 kHz spinning, with a π/12 radian pulse length, with proton decoupling during data acquisition, and a recycle delay of 0.3 s. The chemical shifts are referenced with respect to an external solution of Al(H$_2$O)$_6^{3+}$ ($\delta_{Al}$=0.0 ppm). All NMR spectra were recorded at room temperature using air for spinning.

Nitrogen Porosimetry

The nitrogen adsorption/desorption analyses was performed with different instruments, e.g. Micromeritics™ TriStar 3000, Micromeritics™ TriStar II 3020 and Quantachrome Instruments Autosorb™-1. All the samples were pre-treated at 120° C. in vacuum for 4 hours before collecting the N$_2$ isotherm. The analysis program calculated the experimental data and report BET surface area (total surface area), microporous surface area (S), total pore volume, pore volume for micropores, average pore diameter (or radius), etc.

Example 1

Organosilica Material Syntheses Using Mixture of Formula (Ia) and Formula (Ib) Compounds in Basic Aqueous Media 1A. Synthesis Using 1,1,3,3,5,5-hexaethoxy-1,3,5-trisilacyclohexane and 1,1,3,3,5-pentaethoxy-5-((triethoxysilyl)methyl)-1,3,5-trisilacyclohexane in Basic Aqueous Medium—Without Surfactant A solution with 1.5 g of 30% NH$_4$OH and 2.0 g deionized water (DI) water was made. The pH of the solution was 12.5. To the solution, 1.0 g of a Starting Mixture 1 (see Example 2, for details) containing 1,1,3,3,5,5-hexaethoxy-1,3,5-trisilacyclohexane (A) and 1,1,3,3,5-pentaethoxy-5-((triethoxysilyl)methyl)-1,3,5-trisilacyclohexane (B) having a ratio of A:B of 7:1 was added, producing a solution, which was stirred for 7 days at room temperature (20-25° C.). The solution was transferred to an oven and cured at 90° C. for 1 day to produce a gel. The gel was dried at 120° C. in a vacuum for 1 day. This produced Sample 1 as a solid gel, which was converted to white powder after grinding. No surface directing agent or porogen were used in this preparation.

XRD Analysis

XRD was performed on Sample 1. The XRD pattern of Sample 1 is shown in FIG. 1.

Nitrogen Adsorption/Desorption Analysis

Figure 2:
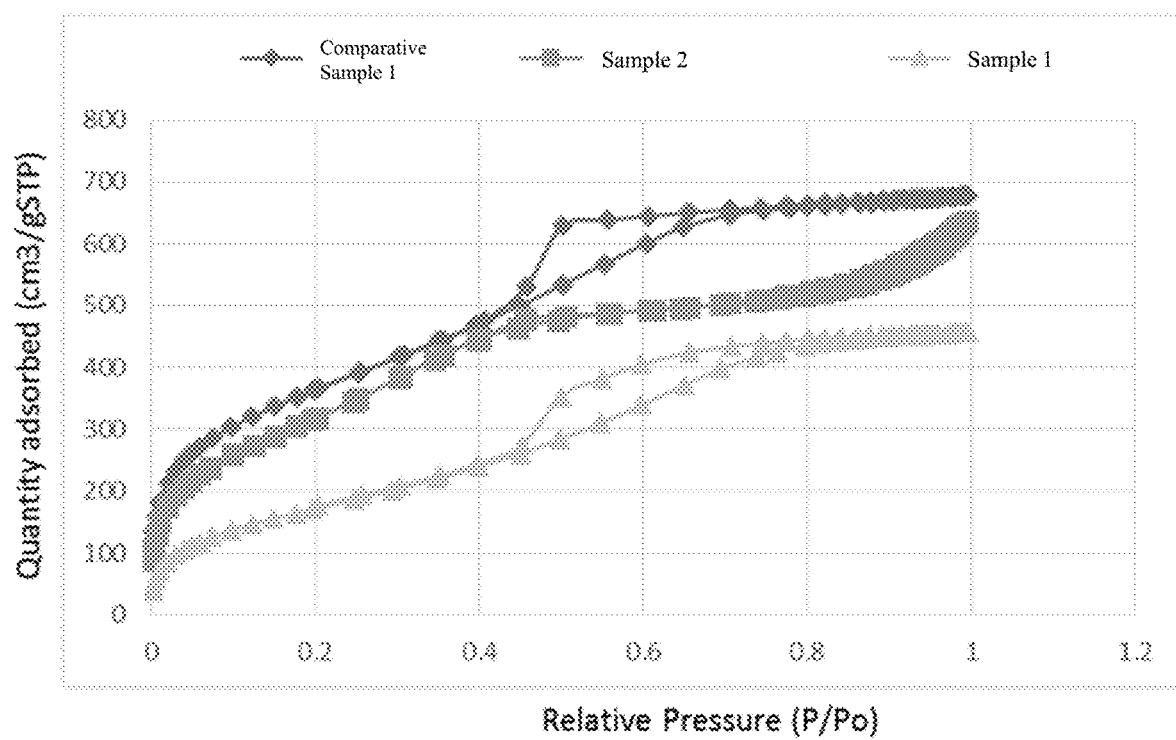
FIG. 2 illustrates the nitrogen adsorption/desorption analysis for Sample 1, Sample 2 and Comparative Sample 1.
Figure 3:
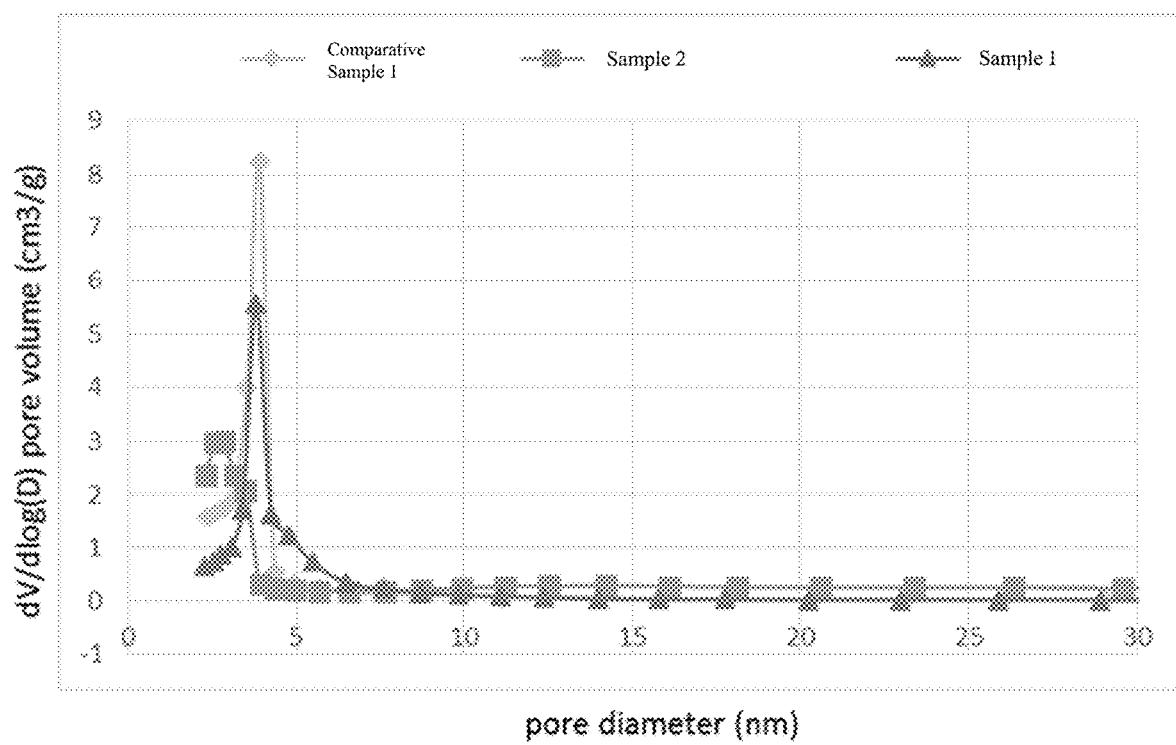
FIG. 3 illustrates a BET pore diameter distribution for Sample 1, Sample 2 and Comparative Sample 1.

Nitrogen adsorption/desorption analysis was performed on Sample 1. The surface area and average pore diameter obtained by the nitrogen adsorption/desorption analysis for Sample 1 are shown below in Table 1 and FIGS. 2 and 3.

SS-NMR-Analysis

Figure 4:
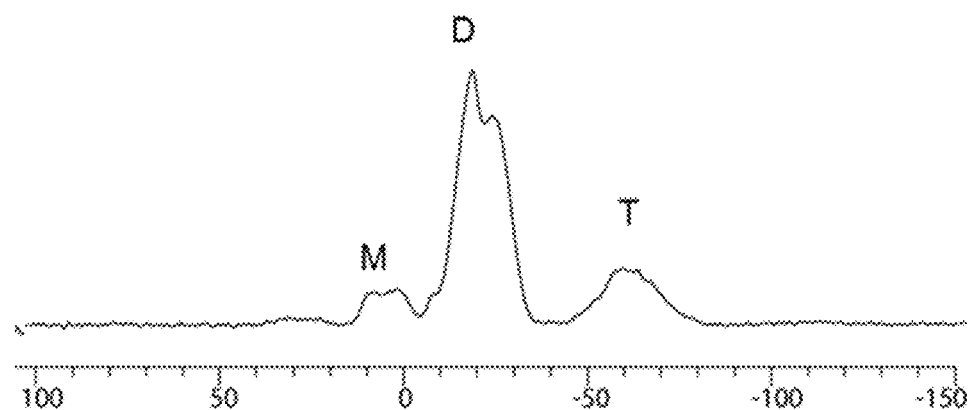
FIG. 4 illustrates a $^{29}$Si MAS NMR spectrum for Sample 1.

Sample 1 was characterized with $^{29}$Si MAS NMR with the results as shown in FIG. 4.

1B. Synthesis Using 1,1,3,3,5,5-hexaethoxy-1,3,5-trisilacyclohexane and 1,1,3,3,5-pentaethoxy-5-((triethoxysilyl)methyl)-1,3,5-trisilacyclohexane in Basic Aqueous Medium—With Surfactant Alternative Embodiment Cetyltrimethylammonium bromide (CTMABr, 0.64 g, Aldrich) was dissolved in a mixture of 6.21 g NH$_4$OH (30 wt. %) and 7.92 g DI water. To the solution, 1.0 g of a Starting Mixture 1 containing 1,1,3,3,5,5-hexaethoxy-1,3,5-trisilacyclohexane (A) and 1,1,3,3,5-pentaethoxy-5-((triethoxysilyl)methyl)-1,3,5-trisilacyclohexane (B) having a ratio of A:B of 7:1 was added, producing a solution, which was stirred for 1 day at 20-25° C. Afterwards, the solution was cured at 90° C. in an oven for one day and then dried at 120° C. under vacuum for a day. The surfactant, CTMABr, was removed by extraction. In 24 g HCl (36 wt. %) and 180 g methanol, the solid was added and stirred for 3 days. The solid was then collected by filtration, washed with methanol and DI water, and dried at 120° C. under vacuum resulting in Sample 2.

XRD Analysis

XRD was performed on Sample 2. The XRD pattern of Sample 2 is shown in FIG. 1.

Nitrogen Adsorption/Desorption Analysis

Nitrogen adsorption/desorption analysis was performed on Sample 2. The surface area and average pore diameter obtained by the nitrogen adsorption/desorption analysis for Sample 2 are shown below in Table 1 and FIGS. 2 and 3.

1C. Comparative Synthesis Using Pure 1,1,3,3,5,5-hexaethoxy-1,3,5-trisilacyclohexane in Basic Aqueous Medium—Without Surfactant A solution with 18.6 g of 30% NH$_4$OH and 23.76 g deionized water (DI) water was to made. The pH of the solution was 12.55. To the solution, 3.0 g of 1,1,3,3,5,5-hexaethoxy-1,3,5-trisilacyclohexane ([(EtO)$_2$SiCH$_2$]$_3$) was added, producing a mixture having the molar composition:

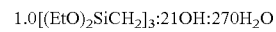
1.0[(EtO)$_2$SiCH$_2$]$_3$:21OH:270H$_2$O and stirred for 1 day at room temperature (20-25° C.). The solution was transferred to an autoclave and aged at 80° C.-90° C. for 1 day to produce a gel. The gel was dried at 80° C. in a vacuum to remove most of the water and then fully dried at 110° C. for three hours. This produced Comparative Sample 1 as a clear solid, which was converted to white powder after grinding. No surface directing agent or porogen were used in this preparation.

XRD Analysis

XRD was performed on Comparative Sample 1. The XRD pattern of Comparative Sample 1 is shown in FIG. 1.

Nitrogen Adsorption/Desorption Analysis

Nitrogen adsorption/desorption analysis was performed on Comparative Sample 1. The surface area and average pore diameter obtained by the nitrogen adsorption/desorption analysis for Comparative Sample 1 are shown below in Table 1 and FIGS. 2 and 3.

1D. Synthesis Using 1,1,3,3,5,5-hexaethoxy-1,3,5-trisilacyclohexane and 1,1,3,3,5-pentaethoxy-5-((triethoxysilyl)methyl)-1,3,5-trisilacyclohexane in Basic Aqueous Medium—Without Surfactant A solution with 1.5 g of 30% NH$_4$OH and 2.0 g deionized water (DI) water was made. The pH of the solution was 12.5. To the solution, 1.0 g of a Starting Mixture 1 containing 1,1,3,3,5,5-hexaethoxy-1,3,5-trisilacyclohexane (A) and 1,1,3,3,5-pentaethoxy-5-((triethoxysilyl)methyl)-1,3,5-trisilacyclohexane (B) having a ratio of A:B of 7:1 was added, producing a solution, which was stirred for 12 hours at room temperature (20-25° C.). The solution was transferred to an oven and cured at 90° C. for 1 day to produce a gel. The gel was dried at 120° C. in a vacuum for 1 day. This produced Sample 2a as a solid gel with two distinct layers. Two layers were separated and converted to white powder after grinding. No surface directing agent or porogen were used in this preparation.

Nitrogen Adsorption/Desorption Analysis

Nitrogen adsorption/desorption analysis was performed on Sample 2a, which revealed that Sample 2a's top or upper layer had a surface area of 1165 m$^2$/g and an average pore diameter of 3.9 nm whereas a bottom or lower layer had no BET surface, which indicated that a non-porous material was formed in the bottom or layer.

The surface area and average pore diameter obtained by the nitrogen adsorption/desorption analysis for Sample 1, Sample 2, Sample 2a, and Comparative Sample 1 are shown below in Table 1.

TABLE 1

| Material | BET area (m$^2$/g) | Average pore diameter (nm) |
| --- | --- | --- |
| Comparative Sample 1 | 1136 | 3.5 |
| Sample 2a | | |
| Top Layer | 1165 | 3.9 |
| Bottom Layer | 0.45 | 0 |
| Sample 1 | 806 | 4.3 |
| Sample 2 | 1139 | 3.44 |

These results show that starting with a mixture of Formula (Ia) and Formula (Ib) compounds result in organosilica materials (Samples 1 and 2) similar to those made with pure 1,1,3,3,5,5-hexaethoxy-1,3,5-trisilacyclohexane (Comparative Sample 1).

Example 2

Organosilica Material Syntheses Using Varying Ratios of 1,1,3,3,5,5-hexaethoxy-1,3,5-trisilacyclohexane and 1,1,3,3,5-pentaethoxy-5-((triethoxysilyl)methyl)-1,3,5-trisilacyclohexane in Basic Aqueous Media

Example 2a

Preparation of Varying Ratios of Starting Mixtures of 1,1,3,3,5,5-hexaethoxy-1,3,5-trisilacyclohexane and 1,1,3,3,5-pentaethoxy-5-((triethoxysilyl)methyl)-1,3,5-trisilacyclohexane A solution of 70 ml 0.5 wt. % FeCl$_3$ in dry tetrahydrofuran (THF) was added to 7 g Mg turnings and stirred until a grey colored mixture was visible, and this mixture was kept under an inert atmosphere. A solution of chloromethyl triethoxysilane in varying concentrations in dry THF was slowly added to the mixture to form a Grignard reagent, ((triethoxysilyl)methyl)magnesium chloride, in varying concentrations and stirred for varying time and at varying temperatures as shown below in Table 1. THF was removed under vacuum and dry hexanes were added to the residue. The residue was also filtered and hexanes were removed under vacuum to obtain Starting Mixtures 1-7 of 1,1,3,3,5,5-hexaethoxy-1,3,5-trisilacyclohexane (A) and 1,1,3,3,5-pentaethoxy-5-((triethoxysilyl)methyl)-1,3,5-trisilacyclohexane (B) in varying ratios and yields as shown in Table 2. The ratios of A:B were calculated by standard gas chromatography methods.

TABLE 2

| Starting Mixture | Reaction Temperature, Reaction Time, Grignard Reagent Concentration | Ratio of A:B | Combined Yield of A and B |
| --- | --- | --- | --- |
| Starting Mixture 1 | 50° C., 24 hours, 1 mol/L | 7:1 | 70% |
| Starting Mixture 2 | 22° C., 24 hours, 1 mol/L | 6:1 | 82% |
| Starting Mixture 3 | 50° C., 24 hours, 0.1 mol/L | 7:1 | 43% |
| Starting Mixture 4 | 50° C., 48 hours, 0.1 mol/L | 7:1 | 68% |
| Starting Mixture 5 | 50° C., 24 hours, 2 mol/L | 4:1 | 60% |
| Starting Mixture 6 | 50° C., 24 hours, 5 mol/L | 4:1 | 56% |
| Starting Mixture 7 | 50° C., 24 hours, 11 mol/L | 3.7:1 | 60% |

Figure 5:
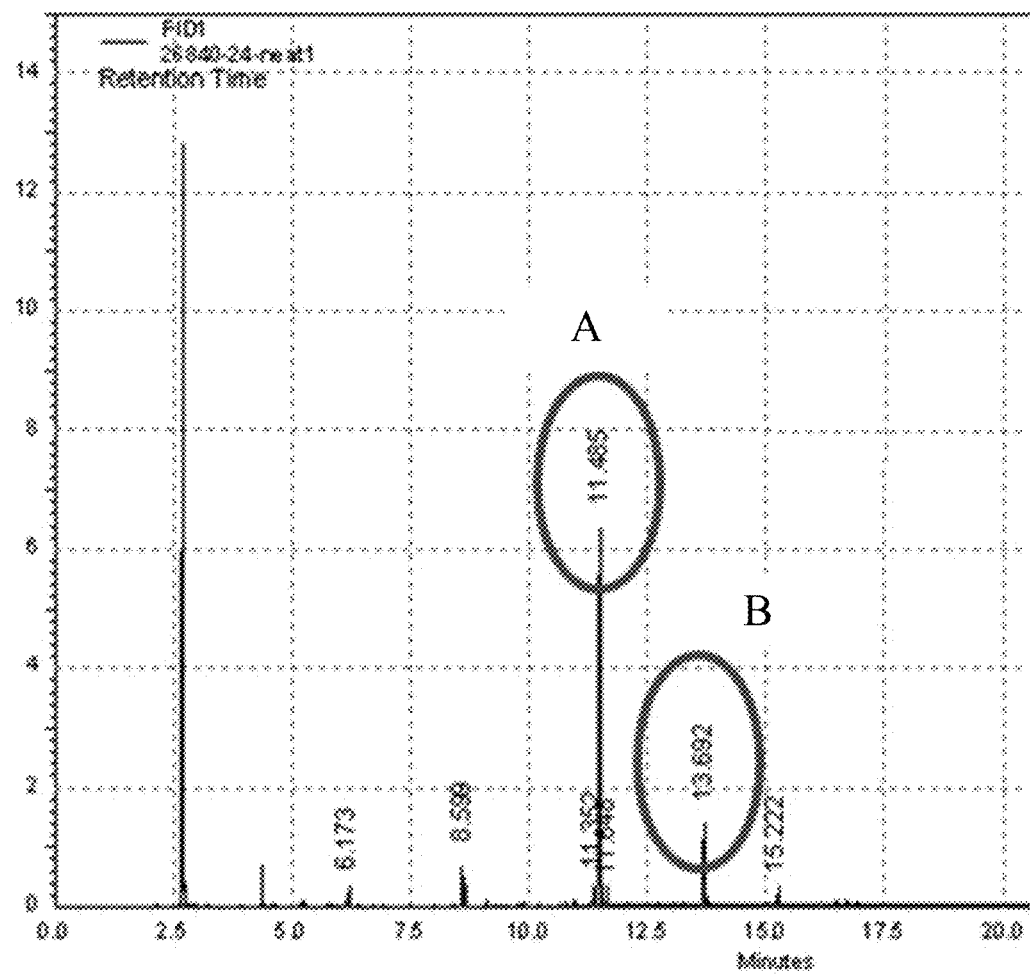
FIG. 5 illustrates gas chromatography trace for Starting Mixture 1.

As shown in Table 2, increasing concentration of the Grignard reagent resulted in lower combined yield of A and B; thus, the ratio of A:B decreases with increasing concentration of Grignard reagent. Lower temperature slowed down the reaction, so longer reaction time was needed to complete the reaction, but overall yield of A and B was increased as shown in Starting Mixture 2. A gas chromatography trace of the resultant A and B mixture produced in Starting Mixture 1 is shown in FIG. 5.

Example 2a

Organosilica Material Syntheses Using Starting Mixtures 2-7 in Basic Aqueous Media Without Surfactant Organosilica materials were prepared as described in Example 1a, except with Starting Mixtures 2-7 of 1,1,3,3,5,5-hexaethoxy-1,3,5-trisilacyclohexane (A) and 1,1,3,3,5-pentaethoxy-5-((triethoxysilyl)methyl)-1,3,5-trisilacyclohexane (B) from Table 2 above to obtain Samples 3-6 and 8-10 as shown in Table 3 below. Sample 7 was prepared as described in Example 1a, except using Starting Mixture 4 and pure [(EtO)$_2$SiCH$_2$]$_3$, as shown in Table 3 below.

Nitrogen Adsorption/Desorption Analysis

Figure 6:
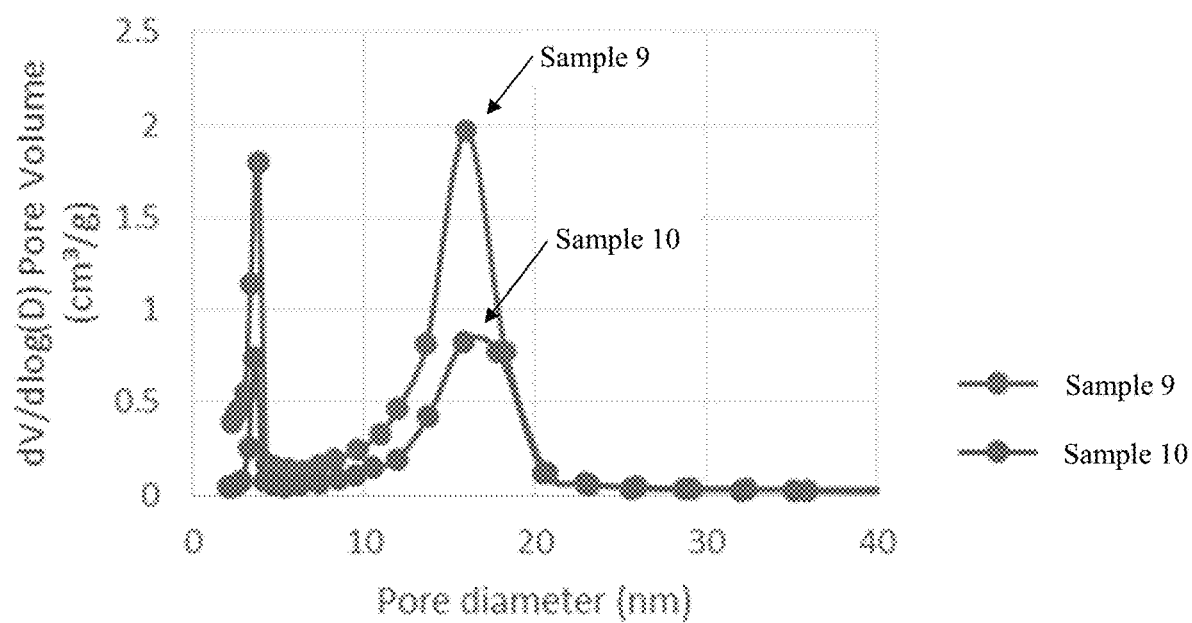
FIG. 6 a BET pore diameter distribution for Sample 9 and Sample 10.

Nitrogen adsorption/desorption analysis was performed on Samples 3-10. The surface area and average pore diameter obtained by the nitrogen adsorption/desorption analysis for Samples 3-10 are shown below in Table 3 and FIG. 6 (only Samples 9 and 10). As shown in FIG. 6, Samples 9 and 10 exhibited a bimodal distribution of pore diameter.

TABLE 3

| Material | Starting Material (ratio A:B) | BET area ($m^2/g$) | Average pore diameter (nm) |
|---|---|---|---|
| Sample 3 | Starting Mixture 2 (6:1) | 631 | 4.48 |
| Sample 4 | Starting Mixture 3 (7:1) | 1165 | 3.9 |
| Sample 5 | Starting Mixture 4 (7:1) | 1204 | 3.55 |
| Sample 6 | Starting Mixture 2 (6:1) and Starting Mixture 4 (7:1) (1:1 weight ratio of Starting Mixture 2 to Start Mixture 4) | 559 | 5.30 |
| Sample 7 | Starting Mixture 4 (7:1) and pure [(EtO)$_2$SiCH$_2$]$_3$ (1:1 weight ratio of Starting Mixture 4 to pure [(EtO)$_2$SiCH$_2$]$_3$) | 1055 | 3.88 |
| Sample 8 | Starting Mixture 5 (4:1) | 504 | 6.88 |
| Sample 9 | Starting Mixture 6 (4:1) | 201 | 3.9, 14.6 |
| Sample 10 | Starting Mixture 7 (3.7:1) | 90.5 | 3.9, 16 |

Hydrothermal Stability Study of Sample 7

Sample 7 underwent steaming with water at 140° C. for 3 days to obtain Steamed Sample 7. Nitrogen adsorption/desorption analysis was performed on Sample 7 and Steamed Sample 7. The surface area, pore volume, and average pore diameter obtained by the nitrogen adsorption/desorption analysis for Sample 7 and Steamed Sample 7 are shown below in Table 4.

TABLE 4

| Material | BET ($m^2/g$) | SA (micro, $m^2/g$) | Pore Volume (cc/g) | Average pore diameter (nm) |
|---|---|---|---|---|
| Sample 7 | 1055 | 0 | 1.02 | 3.88 |
| Steamed Sample 7 | 1204 | 0 | 1.37 | 4.55 |

Example 3

Organosilica Material Synthesis Using 1,1,3,3,5,5-hexaethoxy-1,3,5-trisilacyclohexane and 1,1,3,3,5-pentaethoxy-5-((triethoxysilyl)methyl)-1,3,5-trisilacyclohexane with Silica in Basic Aqueous Medium—Without Surfactant A solution with 4.0 g of 30% NH$_4$OH, 4.0 g DI water, and 4.0 g LUDOX® HS-40 was made. The pH of the solution was 12.4. To the solution, 2.0 g of Starting Mixture 4 containing 1,1,3,3,5,5-hexaethoxy-1,3,5-trisilacyclohexane and 1,1,3,3,5-pentaethoxy-5-((triethoxysilyl)methyl)-1,3,5-trisilacyclohexane was added, producing a solution, which was to stirred for 1 day at room temperature (20-25° C.). The solution was transferred to an autoclave and aged at 90° C. for 1 day to produce a gel. The gel was dried at 120° C. under a vacuum for 1 day. This produced Sample 11 as a solid gel, which was converted to white powder after grinding. No surface directing agent or porogen were used in this preparation.

Nitrogen Adsorption/Desorption Analysis

Nitrogen adsorption/desorption analysis was performed on Sample 11 showing a mesoporous organosilica material with larger pore size as shown in Table 5 below.

TABLE 5

| Material | BET ($m^2/g$) | Pore Volume ($cm^3/g$) | Average pore diameter (nm) |
|---|---|---|---|
| Sample 11 | 379 | 0.68 | 7.2 |

Example 4

Organosilica Material Synthesis Using 1,1,3,3,5,5-hexaethoxy-1,3,5-trisilacyclohexane and 1,1,3,3,5-pentaethoxy-5-((triethoxysilypmethyl)-1,3,5-trisilacyclohexane with tris(3-trimethoxysilylpropyl) isocyanurate in Basic Aqueous Medium—Without Surfactant A solution with 3.11 g of 30% NH$_4$OH and 3.96 g DI water was made. To the solution, 1.0 g of tris(3-trimethoxysilylpropyl)isocyanurate and 1.0 g of Starting Mixture 4 containing 1,1,3,3,5,5-hexaethoxy-1,3,5-trisilacyclohexane and 1,1,3,3,5-pentaethoxy-5-((triethoxysilyl)methyl)-1,3,5-trisilacyclohexane was added, producing a solution, which was stirred for 1 day at room temperature (20-25° C.). The solution was transferred to an oven and cured at 90° C. for 1 day to produce a gel. The gel was dried at 120° C. under a vacuum for 1 day. This produced Sample 12 as a solid gel, which was converted to white powder after grinding. No surface directing agent or porogen were used in this preparation.

Nitrogen Adsorption/Desorption Analysis

Nitrogen adsorption/desorption analysis was performed on Sample 12 showing a mesoporous organosilica material with larger pore size as shown in Table 6 below.

TABLE 6

| Material | BET ($m^2/g$) | Pore Volume ($cm^3/g$) | Average pore diameter (nm) |
|---|---|---|---|
| Sample 12 | 534 | 0.84 | 6.3 |

The invention claimed is:

1. A method for preparing an organosilica material, the method comprising:
   (a) providing a starting material mixture comprising at least one compound of Formula [(RO)$_2$SiCH$_2$]$_3$ (Ia) and at least one compound of Formula [R'ROSi CH$_2$]$_3$ (Ib), wherein each R' independently represents an RO— group, an R group, or an (RO)$_3$Si—CH$_2$— group, at least one R' being (RO)$_3$Si—CH$_2$—; and R represents a C1-C4 alkyl group;
   (b) adding the starting material mixture into an acidic or basic aqueous mixture wherein the weight ratio between Formula (Ia) and Formula (Ib) is about 1:1 to about 5:1 such that the resulting solution contains essentially no structure directing agent;

(c) curing the solution to produce a pre-product; and (d) drying the pre-product to obtain the organosilica material which is a polymer comprising:

independent siloxane units of Formula $[R^1R^2SiCH_2]_3$ (I), wherein each $R^1$ represents a hydroxyl group, a C1-C4 alkoxy group, or an oxygen atom bonded to a silicon atom of another siloxane unit and each $R^2$ represents a hydroxyl group, a C1-C4 alkoxy group, a C1-C4 alkyl group, or an oxygen atom bonded to a silicon atom of another siloxane, wherein the organosilica material having a total surface area of about 50 $m^2/g$ to about 2500 $m^2/g$ and an average pore diameter greater than about 1.0 nm.

2. The method of claim 1, wherein R represents a methyl or ethyl group.

3. The method of claim 1, wherein the at least one compound of Formula (Ia) is 1,1,3,3,5,5-hexaethoxy-1,3,5-trisilacyclohexane and/or the at least one compound of Formula (Ib) is 1, 1,3,3,5-pentaethoxy-5-((triethoxysilyl)methyl)-1,3,5-trisilacyclohexane.

4. The method of claim 1, wherein the aqueous basic mixture comprises a base and has a pH from about 8 to about 14 and wherein the base is ammonium hydroxide or a metal hydroxide.

5. The method of claim 1, wherein the aqueous acidic mixture comprises an acid and has a pH from about 0.01 to about 6.0 and wherein the acid is an inorganic acid.

6. The method of claim 1, wherein the solution is mixed for about 1 day to about 14 days.

7. The method of claim 1, wherein the solution is cured for up to 144 hours at a temperature between 50° C. and 200° C.

8. The method of claim 1, wherein the pre-product is dried at a temperature of about 70° C. to about 200° C.

9. The method of claim 1, wherein the organosilica material has an average pore diameter of about 2.0 nm to about 25.0 nm.

10. The method of claim 1, wherein the organosilica material has a pore volume of about 0.1 $cm^3/g$ to about 3.0 $cm^3/g$.

11. The method of claim 1, wherein the organosilica material has a bimodal distribution of average pore diameter.

12. An organosilica material prepared according to providing a starting material mixture comprising at least one compound of Formula $[(RO)_2SiCH_2]_3$ (Ia) and at least one compound of Formula $[R'ROSi CH_2]_3$ (Ib), wherein each R' independently represents an RO— group, an R group, or an $(RO)_3Si$—$CH_2$— group, at least one R' being $(RO)_3Si$—$CH_2$—; and R represents a C1-C4 alkyl group; adding the starting material mixture into an acidic or basic aqueous mixture wherein the weight ratio between Formula (Ia) and Formula (Ib) is about 1:1 to about 5:1 such that the resulting solution contains essentially no structure directing agent; curing the solution to produce a pre-product; and drying the pre-product to obtain the organosilica material which is a polymer comprising independent siloxane units of Formula $[R^1R^2SiCH_2]_3$ (I), wherein each $R^1$ represents a hydroxyl group, a C1-C4 alkoxy group, or an oxygen atom bonded to a silicon atom of another siloxane unit and each $R^2$ represents a hydroxyl group, a C1-C4 alkoxy group, a C1-C4 alkyl group, or an oxygen atom bonded to a silicon atom of another siloxane, wherein the organosilica material having a total surface area of about 50 $m^2/g$ to about 2500 $m^2/g$ and an average pore diameter greater than about 1.0 nm.

13. The method of claim 1, wherein the starting material mixture provided in step a) is obtained by a Grignard reaction wherein a compound of formula $(RO)_3Si$— $CH_2$— MgX in which X is selected from chloride or bromide is heated in a solvent to provide the starting material mixture comprising the at least one compound of Formula (Ia) and the at least one compound of Formula (Ib).

14. The method of claim 13, wherein the starting material mixture obtained by the Grignard reaction is used in step b) without any separation of the at least one compound of Formula (Ib) therefrom.

\* \* \* \* \*